United States Patent
Ma et al.

(10) Patent No.: US 12,109,548 B2
(45) Date of Patent: Oct. 8, 2024

(54) SUPERHYDROPHOBIC COVALENT ORGANIC FRAMEWORK MATERIALS

(71) Applicant: University of South Florida, Tampa, FL (US)

(72) Inventors: Shengqian Ma, Tampa, FL (US); Qi Sun, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 1122 days.

(21) Appl. No.: 16/961,152

(22) PCT Filed: Jan. 12, 2019

(86) PCT No.: PCT/US2019/013395
§ 371 (c)(1),
(2) Date: Jul. 9, 2020

(87) PCT Pub. No.: WO2019/140340
PCT Pub. Date: Jul. 18, 2019

(65) Prior Publication Data
US 2020/0360892 A1   Nov. 19, 2020

Related U.S. Application Data

(60) Provisional application No. 62/616,853, filed on Jan. 12, 2018.

(51) Int. Cl.
B01J 20/26   (2006.01)
B01J 20/22   (2006.01)
B01J 20/28   (2006.01)
B01J 20/32   (2006.01)

(52) U.S. Cl.
CPC .......... B01J 20/226 (2013.01); B01J 20/262 (2013.01); B01J 20/28009 (2013.01); B01J 20/28026 (2013.01); B01J 20/28045 (2013.01); B01J 20/3212 (2013.01); B01J 20/3217 (2013.01); B01J 20/3278 (2013.01); B01J 20/3293 (2013.01)

(58) Field of Classification Search
CPC .. B01J 20/226; B01J 20/262; B01J 20/28009; B01J 20/28026; B01J 20/28045; B01J 20/28007; B01J 20/3212; B01J 20/3217; B01J 20/3278; B01J 20/3293; B01J 20/28011; B01J 20/321; B01J 20/3268; B01J 2219/30491; C08J 9/405; C08J 9/0085; C08J 9/0076; C08J 2361/28
See application file for complete search history.

(56) References Cited

U.S. PATENT DOCUMENTS

| 6,015,609 | A | 1/2000 | Chaouk et al. |
| 8,828,532 | B2 | 9/2014 | Varshney et al. |
| 11,407,770 | B2 * | 8/2022 | Ma ................... B01J 20/28069 |

| 2014/0127416 | A1 * | 5/2014 | Tryon ............ C23C 4/08 427/580 |
| 2014/0319058 | A1 | 10/2014 | Taylor-Pashow et al. |
| 2015/0259493 | A1 | 9/2015 | Nederkoorn et al. |

FOREIGN PATENT DOCUMENTS

| CN | 103182324 A | 7/2013 |
| JP | 2002146059 A | 5/2002 |
| WO | 2017084809 A1 | 5/2017 |

OTHER PUBLICATIONS

Sun et al., "Integrating Superwettability within Covalent Organic Frameworks for Functional Coating", Jul. 12, 2018, Chem 4, pp. 1726-1739. (Year: 2018).*
International Search Report of related PCT/US2019/013395, mailed on Mar. 25, 2019, 3 pages.
Written Opinion of related PCT/US2019/013395, mailed on Mar. 25, 2019, 6 pages.
Filikci, Semra, et al. Selective dye uptake from aqueous industrial waste mixtures by novel covalent organic frameworks Abstracts of Papers, 250th ACS National Meeting & Exposition, Boston, MA, United States, Aug. 16-20, 2015, (Abstract Only 1 page).
Górka, Joanna, et al. "Sonochemical functionalization of mesoporous carbon for uranium extraction from seawater." Journal of Materials Chemistry A 1.9 (2013): 3016-3026.
Huang, N., et al. Tailor-Made Pore Surface Engineering in Covalent Organic Frameworks: Systematic Functionalization for Performance Screening. Journal of the American Chemical Society 2015 137 (22), 7079-7082 DOI: 10.1021/jacs.5b04300.
Sihn, Young Ho, et al. "Rapid extraction of uranium ions from seawater using novel porous polymeric adsorbents." RSC advances 6.51 (2016): 45968-45976.

(Continued)

*Primary Examiner* — Matthew E. Hoban
*Assistant Examiner* — Lynne Edmondson
(74) *Attorney, Agent, or Firm* — Quarles & Brady LLP

(57) ABSTRACT

A variety of superhyrdophobic porous materials are provided including a covalent organic framework having a plurality of perfluoroalkyl or perfluorheteroalkyl moieties covalently attached thereto. The materials can include a polymeric foam matrix made of a three-dimensional network of polymer fibers, and the covalent organic framework can be made encasing at least a portion of the polymer fibers. The covalent organic framework can be intertwined within the polymeric foam matrix such that the covalent organic framework encasing the portion of the polymer fibers is stable to mechanical compression of the polymeric foam matrix. Surfaces and other articles are provided including the superhyrdophobic porous materials are also provided, as are methods of making the superhyrdophobic porous materials, and methods of use for oil recovery among other things.

19 Claims, 55 Drawing Sheets

(56) References Cited

OTHER PUBLICATIONS

Ulasan, Mehmet, et al. Removal of organic solvents from aqueous waste mixtures by novel covalent organic frameworks Abstracts of Papers, 250th ACS National Meeting & Exposition, Boston, MA, United States, Aug. 16-20, 2015, (Abstract Only 1 page).

* cited by examiner

SUPERHYDROPHOBIC COVALENT ORGANIC FRAMEWORK MATERIALS

CROSS-REFERENCE TO RELATED APPLICATIONS

This application claims priority to, and the benefit of, U.S. provisional application entitled "SUPERHYDROPHOBIC COVALENT ORGANIC FRAMEWORK MATERIALS" having Ser. No. 62/616,853, filed Jan. 12, 2018, the contents of which are incorporated by reference in their entirety.

STATEMENT REGARDING FEDERALLY SPONSORED RESEARCH OR DEVELOPMENT

This invention was made with government support under 1706025 awarded by the National Science Foundation. The government has certain rights in the invention.

TECHNICAL FIELD

The present disclosure generally relates to porous materials and methods of making a using thereof.

BACKGROUND

The custom design of surfaces with controlled wettability properties has been attracting continuous attention from both academia and industry (Liu, et al., *ACC, Chem. Res.* 43, 368-377, 2010; Darmanin, et al., Adv. Mater. 25, 1378-1394, 2013; Li, Chem. Soc. Rev. 36, 1350-1368, 2007; Zhang, et al., Adv. Mater. 28, 6292-6321, 2016; Su, et al., J. Am. Chem. Soc. 138, 1727-1748, 2016; Xu, et al., Nat. Commun. 6, 8949, 2015; Huang, et al., Angew. Chem. Int. Ed. 55, 7379-7383, 2016). In particular, amphiphobic surfaces that repel water and compounds with low surface tension (oils, for example) are of great interest due to their various prospective applications, such as oil transportation, microfluidics, and nano-object manipulation (Bellanger, et al., *Chem. Rev.* 114, 2694-2716, 2014; Pan, et al., *J. Am. Chem. Soc.* 135, 578-581, 2013; Tuteja, et al., *Science* 318, 1618-1622, 2007; Kota, et al., *Adv. Mater.* 21, 665-669, 2009; Liu, et al., *Adv. Mater.* 21, 665-559, 2009; Xue, et al., *Adv. Mater.* 23, 4270-4273, 2011; Ionoy, et al., *Adv. Funct. Mater,* 16, 1153-1160, 2006; Xu, et al., *Angew. Chem. Int. Ed.* 54, 4527-4530, 2015). Albeit tremendous efforts have been devoted to creating such amphiphobic surfaces on a variety of substrates over the past several years, the impartment of amphiphobicity on porous materials, specifically single crystalline, has not yet been explored (Bellanger, et al., *Chem. Rev.* 114, 2694-2716, 2014; Pan, et al., *J. Am. Chem. Soc.* 135, 578-581, 2013; Tuteja, et al., *Science* 318, 1618-1622, 2007; Kota, et al., *Adv. Mater,* 21, 665-669, 2009; Liu, et al., *Adv. Mater.* 21, 665-559, 2009)

Organic porous materials have technological importance, with a myriad of functions and applications.[1,2] Covalent organic frameworks (COFs) as an emerging class of crystalline, porous materials built from organic linkers, have rapidly grown into a major area of chemical research over the last decade.[2-10] COFs represent the development of covalent chemistry "beyond the molecule" and into extended structures,[11,12] allowing for deliberate and precise preparation of new porous materials, which have recently come into the limelight for applications in catalysis,[13-18] as promising candidates for realizing new optoelectronic-device concepts,[19] as gas storage or separation materials,[20-22] as designable scaffolds for environmental remediation,[23] and many more are under development.[24-28] With respect to porous materials the pore environment is of central importance for many properties, given that the pore surface forms a microscopic interface with guest molecules and is a significant characteristic that determines the macroscopic nature of these materials.[29,30] In this sense, engineering the pore surface would bestow COFs with a tailor-made interface to meet specific application requirements.

Wetting is a ubiquitous phenomenon that can be observed anywhere from high tides on the beach to ion channels in cell membranes.[31-34] Controlling the wettability of solid materials presents a rational solution to combat failure related to water absorptivity and thus has attracted tremendous interest due to their potential in a broad range of fields.[35-47] Despite the availability of various skeletons for COFs, engineering superwettability properties into the pore surfaces remains in its infancy.[48] It can be envisioned that by imparting different superwettabilities onto COFs, novel interfacial functional systems could be generated and integrated into devices to expand the realm of possibilities for such materials to be used in tackling current and future challenges including energy, environment, and health.

There remains a need for improved porous materials that overcome the aforementioned deficiencies.

SUMMARY

A variety of superhydrophobic compositions are provided. The compositions include a covalent organic framework having a plurality of perfluoroalkyl or perfluoroheteroalkyl moieties covalently attached thereto. In some aspects, the covalent organic framework has a structure according to the following formula

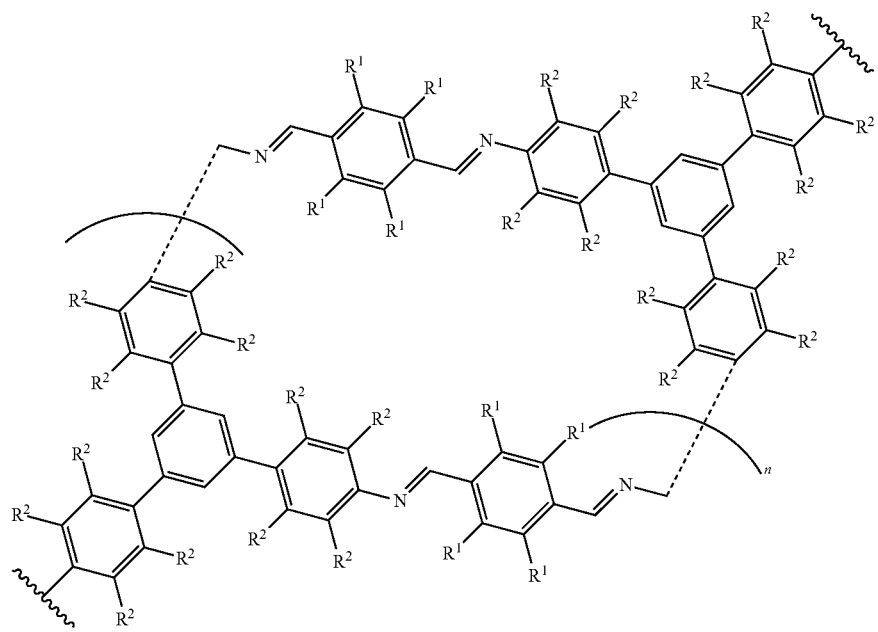

where each occurrence of $R^1$ and $R^2$ is independently a hydrogen, alkyl, alkenyl, heteroalkyl, alkoxy, perfluoroalkyl, partially fluorinated alkyl, perfluorheteroalkyl, or partially fluorinated heteroalkyl so long as at least one occurrence of $R^1$ or $R^2$ comprises a perfluoroalkyl, partially fluorinated alkyl, perfluorheteroalkyl, or partially fluorinated heteroalkyl, and where n is an integer from 2 to 12. In some aspects, each occurrence of $R^2$ is a hydrogen, and each occurrence of $R^1$ is independently a hydrogen or a -$LR^3$, where L is none or is an alkyl or thioalkyl, and where each occurrence of $R^3$ is a perfluoroalkyl. In some aspects, the perfluoralkyl has about 6 to 15 carbon atoms. In some aspects, the covalent organic framework has a structure according to the above formula where $R_1$ is hydrogen, alkenyl, or —$R_4SR_5B_1$, where $R_4$ is a $C_1$-$C_5$ alkyl, $R_5$ is a $C_1$-$C_3$ alkyl, and $B_1$ is a $C_6$-$C_{12}$ perflouoroalkyl; $R^2$ is a hydrogen; and n is 4 to 6. In some aspects, $R^4$ is $C_2$ alkyl, $R^5$ is $C_2$ alkyl, and $B^1$ is $C_8$ perfluoroalkyl.

The covalent organic framework can be almost impervious to water and/or can be superhydrophobic. In some aspects, the covalent organic framework exhibits a water adsorption capacity of about 50-80 milligrams water per gram of the covalent organic framework. In some aspects, a water contact angle on the covalent organic framework is about 150° or more.

The covalent organic framework can be highly oleophillic. In some aspects, the covalent organic framework exhibits a toluene adsorption capacity of about 500-800 milligrams toluene per gram of the covalent organic framework. In some aspects, a nitrobenzene contact angle on the covalent organic framework is about 10° or less.

The covalent organic framework can be incorporated into a variety of compositions. In some aspects, the composition includes a polymeric foam matrix having a three-dimensional network of polymer fibers; and a covalent organic framework encasing at least a portion of the polymer fibers. The polymeric foam matrix can include a foam selected from polyurethane foam, polyurea foam, polyvinyl chloride foam, polypropylene foam, polyethylene foam, polystyrene foam, polyvinyl acetate foam, and melamine foam. The covalent organic framework can be intertwined within the polymeric foam matrix such that the covalent organic framework encasing the portion of the polymer fibers is stable to mechanical compression of the polymeric foam matrix. The covalent organic framework can be intertwined within the polymeric foam matrix such that the polymeric foam matrix maintains about the same level of mechanical compressibility as the otherwise same polymeric foam matrix except without the covalent organic framework. The covalent organic framework can also be part of or form a surface coating. For example, in some aspects a droplet is provided having an aqueous central region surrounded by an outer surface of a covalent organic framework described herein. In some aspects, the aqueous central region includes a plurality of magnetic particles.

In some aspects, the compositions described herein have an oil absorption capacity of about 50 to 150 times the weight of the composition. The oil absorption capacity can be measured for one or more oils selected from $CHCl_3$, nitrobenzene, dimethylformamide, toluene, bromobenzene, ethanol, hexane, mineral oil, pump oil, soybean oil, and a mixture thereof.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 65A shows a photograph of COF-VF@foam and melamine foam after being placed on water. FIG. 65B shows a photograph of COF-VF@foam immersed in water by a force. FIG. 65C shows a photograph of the water contact angle on the surface of COF-VF@foam. FIG. 65D shows a photograph COF-VF@foam can separate underwater oil such as nitrobenzene from water (see also Movie S1). FIG. 65E is a graph of the absorption capacities of COF-VF@foam for various organic solvents and oils, as indicated by weight gain, FIG. 65F shows a graph of the weight gain during nitrobenzene absorption/squeezing cycles.

FIGS. 254-25B show characterizations of COF-V reacted with 1H,1H,2H,2H-perfluorodecanethiol with a F grafting amount of 2.4 wt. % in the resultant sample. (FIG. 25A) Nitrogen sorption isotherms measured at 77 K (inset: corresponding water contact angles) and (FIG. 25B) PXRD profile. The BET surface area of the sample was calculated to be as high as 1035 m2 g-1.

(FIG. 26A) Nitrogen sorption isotherms measured at 77 K (inset: corresponding water contact angles) and (FIG. 26B) PXRD profile. The BET surface area of the sample was calculated to be as high as 308 m2 g-1.

(FIG. 27A) Nitrogen sorption isotherms measured at 77 K (inset: corresponding water contact angles) and (FIG. 27B) PXRD profile. The BET surface area of the sample was calculated to be as high as 635 m2 g-1.

(FIG. 36A) pristine COF-VF and after treatment for 7 days under various conditions and (FIG. 36B) COF-VF after treatment for 2 days under humid HCl and $NH_3$ vapor atmosphere.

(FIG. 38A) pristine COF-V and after treatment in boiling water for 7 days as well as 12 M HCl and 14 M NaOH at room temperature for 24 hours and (FIG. 38B) COF-V after treatment for 12 hours under humid HCl and NH3 vapor atmosphere.

(FIG. 42A) SEM image and (FIG. 42B) XRD pattern of COF-V synthesized under the conditions listed below. 1,3,5-tris(4-aminophenyl)-benzene (4 mg) and 2,5-divinylterephthalaldehyde (3 mg) were dissolved in anisole (4.75 mL) and phenethanol (0.25 mL). After that, 0.5 mL of 6 M aqueous acetic acid was added and the tube was flash frozen at 77 K, evacuated, and sealed. The reaction mixture was then heated at 100° C. for 3 days to afford a yellow-brown precipitate which was isolated by filtration and washed with anhydrous tetrahydrofuran.

DETAILED DESCRIPTION

Figure 1:
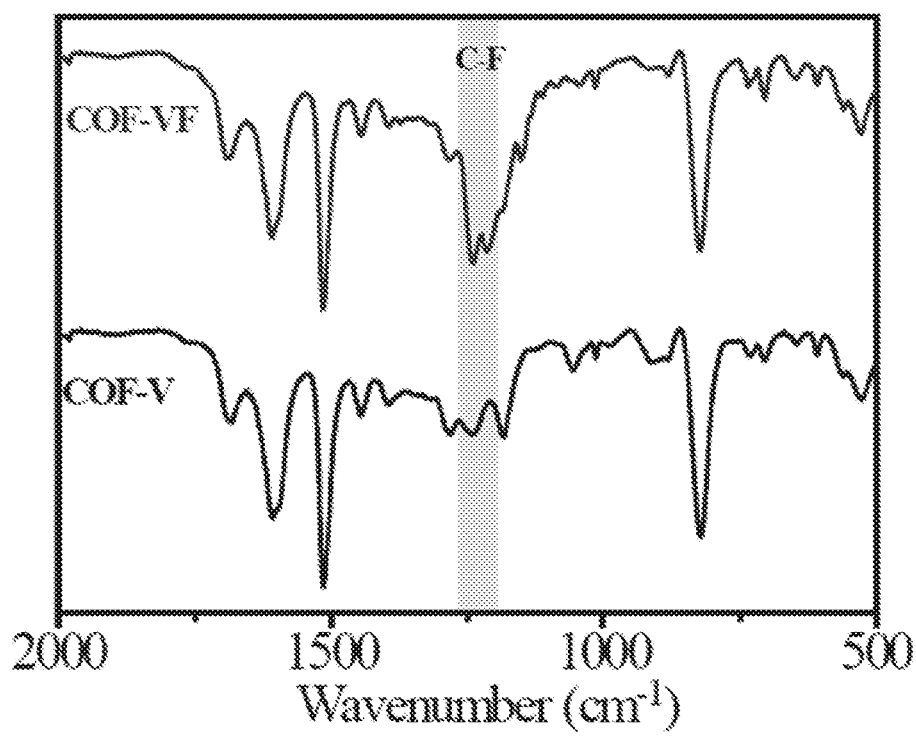
FIG. 1 shows FT-IR spectra of COF-V and COF-VF.
Figure 2A:
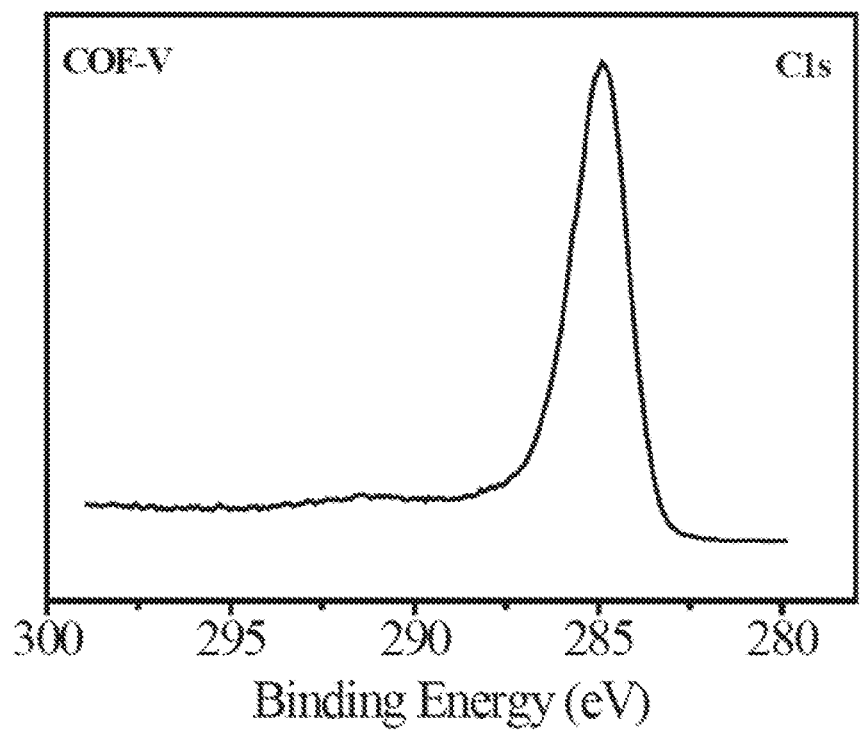
FIGS. 2A-2F show XPS spectra of COF-V and COF-VF including C1s XPS (FIG. 2A) and N1s XPS (FIG. 2C) of COF-V and C1s XPS (FIG. 2B), N1s XPS (FIG. 2D), F1s XPS (FIG. 2E), and S2p XPS (FIG. 2F) of COF-VF. The appearance of strong XPS signals of C1s at a relatively high binding energy, together with the F1s and S2p signals indicate that perfluoroalkyl groups are attached on COF-V.
Figure 2B:
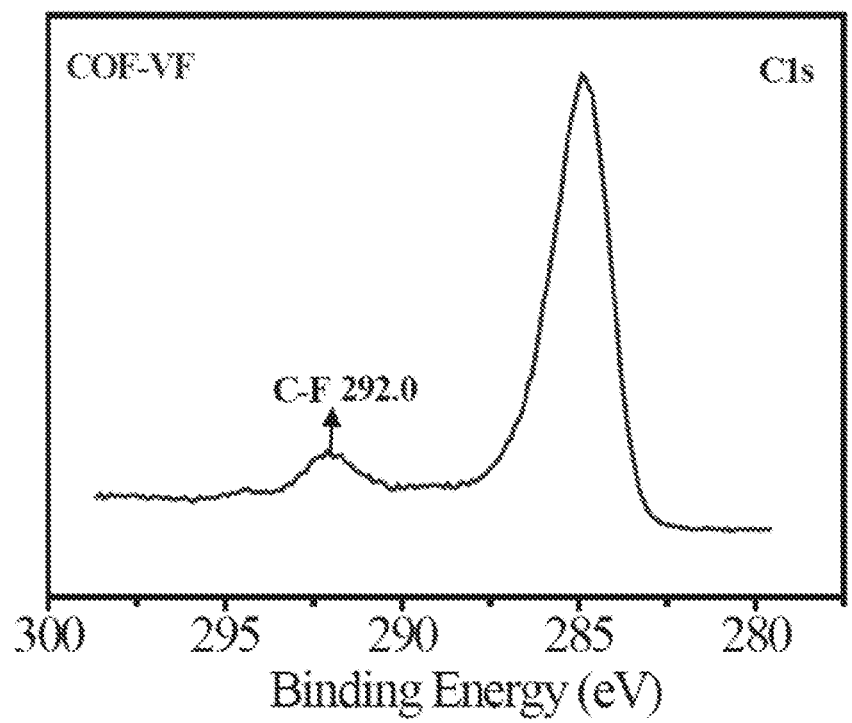
Figure 2C:
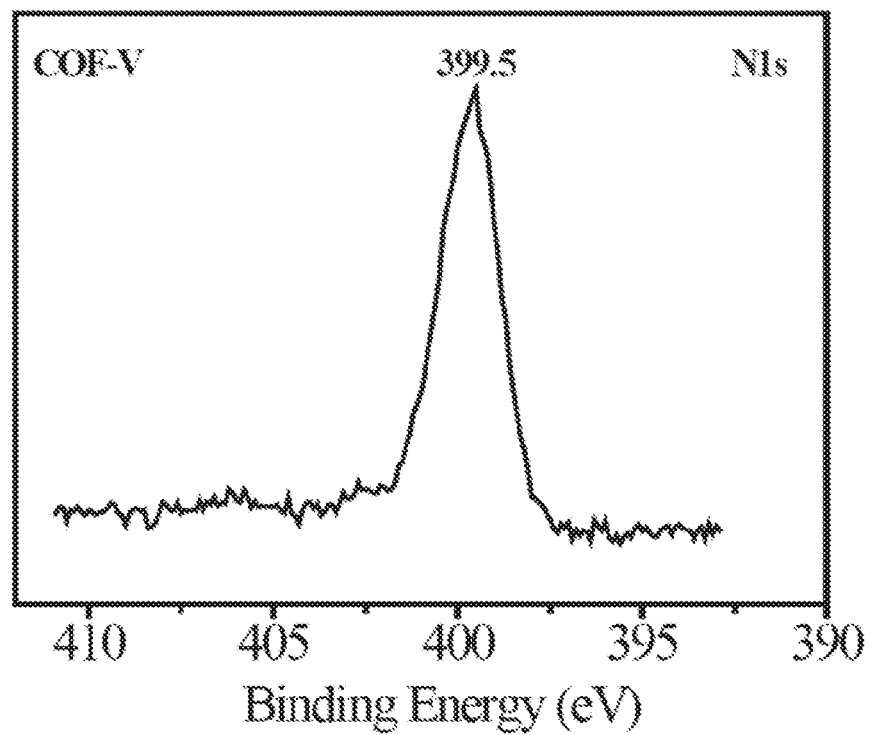
Figure 2D:
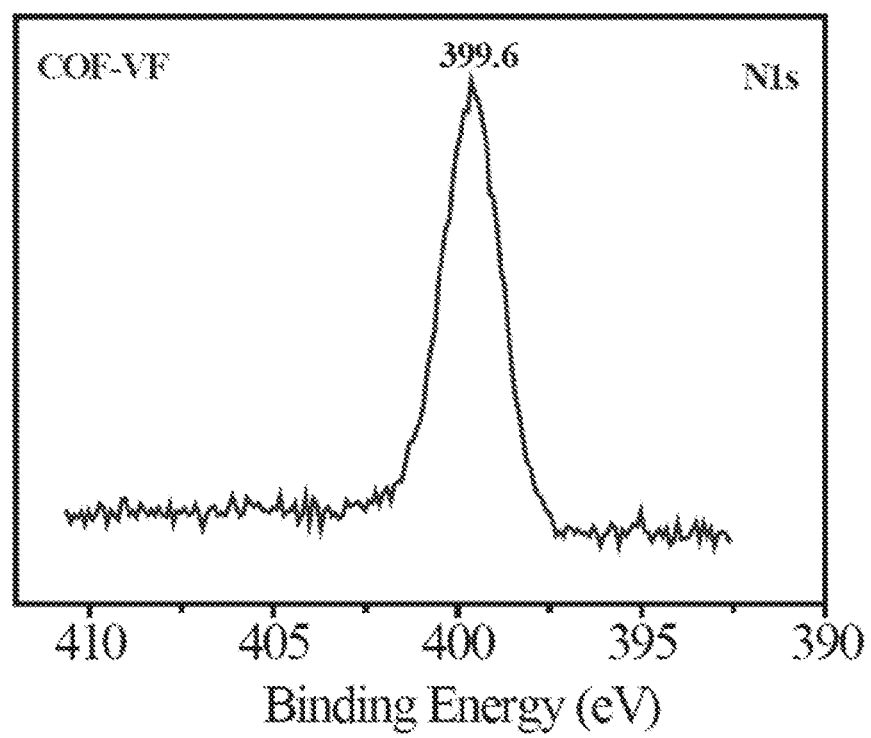
Figure 2E:
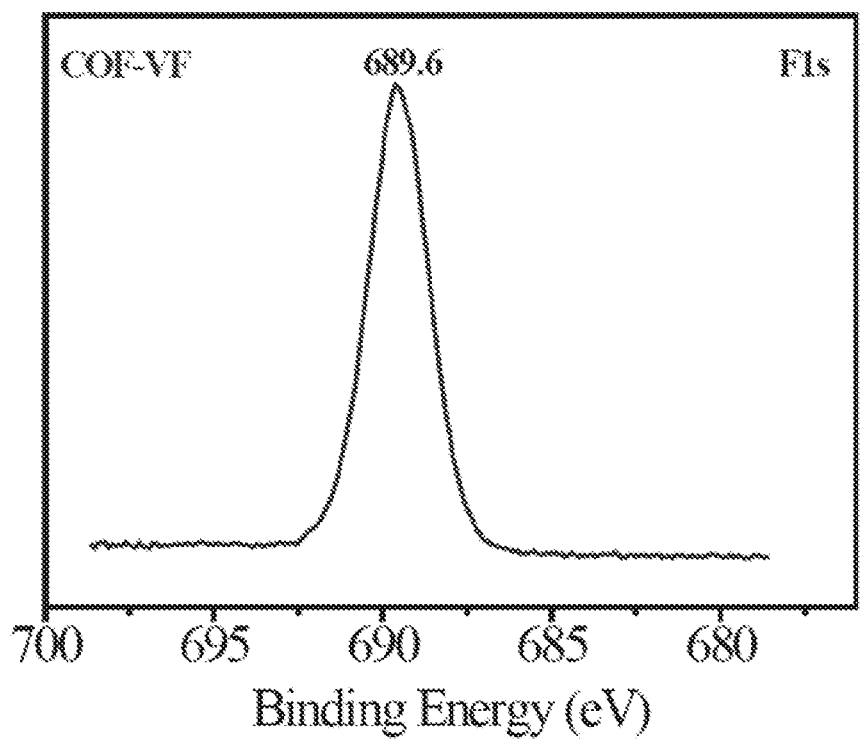
Figure 2F:
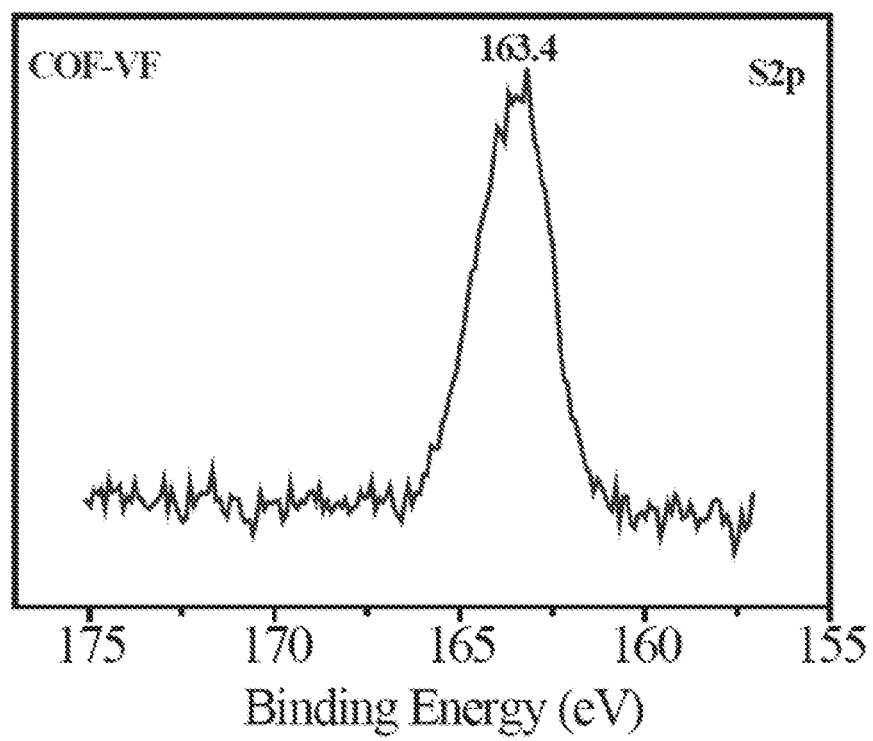

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z', In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "reactive coupling group" and "reactive functional group" are used interchangeably herein to refer to any chemical functional group capable of reacting with a second functional group under the given conditions to form a covalent bond. Those skilled in the art will recognize that some functional groups may react under certain conditions but not under others. Accordingly, some functional groups may be reactive coupling groups only certain conditions, e.g. under conditions where the groups react to form a covalent bond. The selection of reactive coupling groups is within the ability of the skilled artisan. Examples of reactive coupling groups can include primary amines (—$NH_2$) and amine-reactive linking groups such as isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters. Most of these conjugate to amines by either acylation or alkylation. Examples of reactive coupling groups can include aldehydes (—COH) and aldehyde reactive linking groups such as hydrazides, alkoxyamines, and primary amines. Examples of reactive coupling groups can include thiol groups (—SH) and sulfhydryl reactive groups such as maleimides, haloacetyls, and pyridyl disulfides. Examples of reactive coupling groups can include photoreactive coupling groups such as aryl azides or diazirines. Examples of reactive coupling groups can include click reactive coupling groups capable of forming covalent bonds through click reactions. Well-known reactions include the hetero-Diels-Alder reaction, the thiol-ene coupling, the Staudinger ligation, native chemical ligation, and the amidation reaction between thio acids or thio esters and sulfonyl azides (referred to as 'sulfo-click'). As used herein, the terms "sulfo-click" and "sulfo-click chemistry" are used to refer to a reaction between thio acids and sulfonyl azides containing molecules, creating a covalent bonds between the two molecules. Examples of sulfo-click chemistry are described in U.S. Patent Application Publication 2011/0130568 and POT Publication WO 2012/021486. The coupling reaction may include the use of a catalyst, heat, pH buffers, light, or a combination thereof.

The term "stable", as used herein, refers to compositions that are stable over time, stable under aqueous conditions, and/or stable under basic conditions. A composition is stable over time when, under standard operating conditions such as elevated temperatures and/or pressures, the composition does not change pore size by more than 1%, 2%, 5%, or 10% and/or does not change olefin uptake capacity by more than 1%, 2%, 5%, or 10% for a period of at least 1, 2, 10, 20, or 30 days. A composition is stable under aqueous conditions when it does not change pore size by more than 1%, 2%, 5%, or 10% and/or does not change olefin uptake capacity by more than 1%, 2%, 5%, or 10% after being exposed to an air environment with at least 60%, at least 70%, at least 80%, or at least 90% relative humidity for at least 12 hours or for at least 1, 2, 3, 4, 5, or 10 days. A composition is stable under basic conditions when it does not change pore size by more than 1%, 2%, 5%, or 10% and/or does not change olefin uptake capacity by more than 1%, 2%, 5%, or 10% after exposure to boiling 6M NaOH solution for a period of at least 120 minutes The term "alkyl" refers to the radical of saturated aliphatic groups (i.e., an alkane with one hydrogen atom removed), including straight-chain alkyl groups, branched-chain alkyl groups, cycloalkyl (alicyclic) groups, alkyl-substituted cycloalkyl groups, and cycloalkyl-substituted alkyl groups.

In preferred embodiments, a straight chain or branched chain alkyl has 30 or fewer carbon atoms in its backbone (e.g., $C_1$-$C_{30}$ for straight chains, and $C_3$-$C_{30}$ for branched chains), preferably 20 or fewer, more preferably 15 or fewer, most preferably 10 or fewer. Likewise, preferred cycloalkyls have 3-10 carbon atoms in their ring structure, and more preferably have 5, 6, or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In preferred embodiments, the "alkylthio" moiety is represented by one of —S-alkyl, —S-alkenyl, and —S-alkynyl. Representative alkylthio groups include methylthio, ethylthio, and the like. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

Hydrophobic Porous Materials

A variety of superhydrophobic compositions are provided. The compositions include a covalent organic framework having a plurality of perfluoroalkyl or perfluoroheteroalkyl moieties covalently attached thereto. In some aspects, the covalent organic framework has a structure according to the following formula

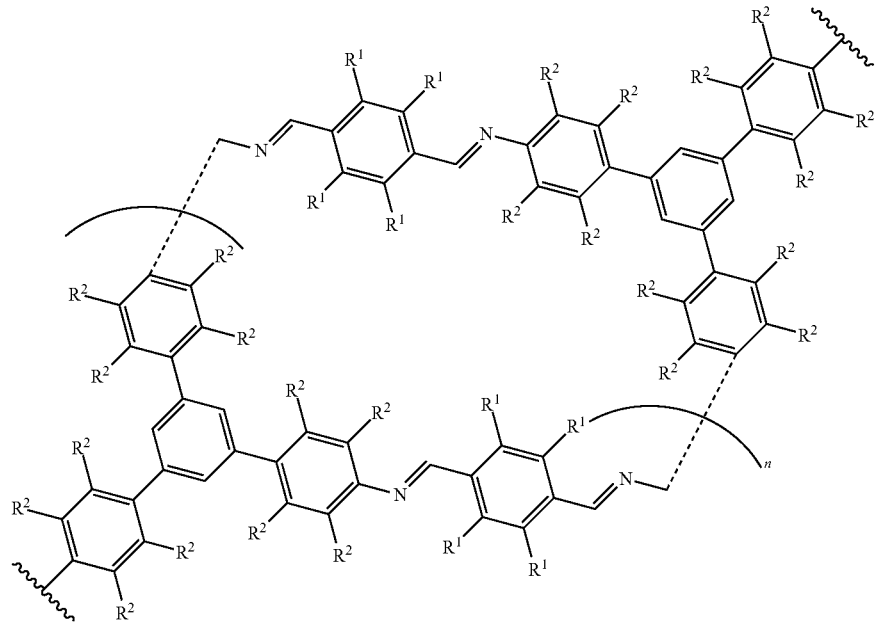

where each occurrence of $R^1$ and $R^2$ is independently a hydrogen, alkyl, alkenyl, heteroalkyl, alkoxy, perfluoroalkyl, partially fluorinated alkyl, perfluorheteroalkyl, or partially fluorinated heteroalkyl so long as at least one occurrence of $R^1$ or $R^2$ comprises a perfluoroalkyl, partially fluorinated alkyl, perfluorheteroalkyl, or partially fluorinated heteroalkyl, and where n is an integer from 2 to 12. In some aspects, each occurrence of $R^2$ is a hydrogen, and each occurrence of $R^1$ is independently a hydrogen or a -$LR^3$, where L is none or is an alkyl or thioalkyl, and where each occurrence of $R^3$ is a perfluoroalkyl. In some aspects, n is an integer from about 2 to about 12, about 3 to 10, or about 3 to 8. In some aspects, n is 2, 3, 4, 5, 6, 7, 8, 9, 10, 11, or 12. In some aspects, the perfluoroalkyl has about 6 to 15 carbon atoms. In some aspects, the covalent organic framework has a structure according to the above formula where $R_1$ is hydrogen, alkenyl, or —$R_4SR_5B_1$, where $R_4$ is a $C_1$-$C_5$ alkyl, $R_5$ is a $C_1$-$C_3$ alkyl, and $B_1$ is a $C_3$-$C_{12}$ perflouoroalkyl; $R^2$ is a hydrogen; and n is 4 to 6. In some aspects, $R^4$ is $C_2$ alkyl, $R^5$ is $C_2$ alkyl, and $B^1$ is $C_8$ perfluoroalkyl.

The perfluoroalkyl, partially fluorinated alkyl, perfluorheteroalkyl, or partially fluorinated heteroalkyl moiety can be a linear or branched chain alkyl group having from 7 to 20, 8 to 20, 9 to 20, or 10 to 20 carbon atoms, one or more heteroatoms such as S, and can be partially or completely fluorinated. The moieties can include a reactive coupling group capable of reacting with a reactive coupling group on the outer covalent organic framework to form a covalent bond.

The covalent organic framework can be almost impervious to water and/or can be superhydrophobic. In some aspects, the covalent organic framework exhibits a water adsorption capacity of about 50-80 milligrams water per gram of the covalent organic framework. In some aspects, a water contact angle on the covalent organic framework is about 150° or more.

The covalent organic framework can be highly oleophillic. In some aspects, the covalent organic framework exhibits a toluene adsorption capacity of about 500-800 milligrams toluene per gram of the covalent organic framework. In some aspects, a nitrobenzene contact angle on the covalent organic framework is about 10° or less.

The covalent organic framework can be incorporated into a variety of compositions. In some aspects, the composition includes a polymeric foam matrix having a three-dimensional network of polymer fibers; and a covalent organic framework encasing at least a portion of the polymer fibers. The polymeric foam matrix can include a foam selected from polyurethane foam, polyurea foam, polyvinyl chloride foam, polypropylene foam, polyethylene foam, polystyrene foam, polyvinyl acetate foam, and melamine foam. The covalent organic framework can be intertwined within the polymeric foam matrix such that the covalent organic framework encasing the portion of the polymer fibers is stable to mechanical compression of the polymeric foam matrix. The covalent organic framework can be intertwined within the polymeric foam matrix such that the polymeric foam matrix maintains about the same level of mechanical compressibility as the otherwise same polymeric foam matrix except without the covalent organic framework. The covalent organic framework can also be part of or form a surface coating. For example, in some aspects a droplet is provided having an aqueous central region surrounded by an outer surface of a covalent organic framework described herein. In some aspects, the aqueous central region includes a plurality of magnetic particles.

In some aspects, the compositions described herein have an oil absorption capacity of about 50 to 150 times the weight of the composition. The oil absorption capacity can be measured for one or more oils selected from $CHCl_3$, nitrobenzene, dimethylformamide, toluene, bromobenzene, ethanol, hexane, mineral oil, pump oil, soybean oil, and a mixture thereof.

EXAMPLES

It should be emphasized that the embodiments described herein of the present disclosure are merely possible examples of implementations, and are set forth only for a clear understanding of the principles of the disclosure. Many variations and modifications may be made to the—described embodiments of the disclosure without departing substantially from the spirit and principles of the disclosure. All such modifications and variations are intended to be included herein within the scope of this disclosure.

Example 1: Imparting Superwettability on Covalent Organic Frameworks Via Pore Surface Engineering Covalent organic frameworks (COFs) have attracted growing interest by virtue of their well-defined pores and tunable functionality. Despite the availability of various skeletons for COFs, pore surface wettability control remains undeveloped, which may expand their overall versatility. Here, we contribute an effective strategy to impart superwettabilities on COFs as demonstrated by chemically coating the pore surface to confer them with superhydrophobicity. Taking advantage of the controllable modification, the resultant COF retains the porosity and crystallinity of the pristine COF. Benefiting from the bulk superhydrophobicity of the COF and the feasible synthesis, they can be used as a coat or in-situ integrated within various substrates, which renders them superhydrophobic. Given the modular nature, this protocol is compatible with the development of various specific wettabilities in COFs, which constitutes a step for expanding the scope of the COFs' applications and provides many opportunities for the processing of advanced materials and devices Chemicals Commercially available reagents were purchased in high purity and used without purification. Solvents were purified according to standard laboratory methods.

Material Synthesis

Synthesis of 1,3,5-tris-(4-aminophenyl)benzene

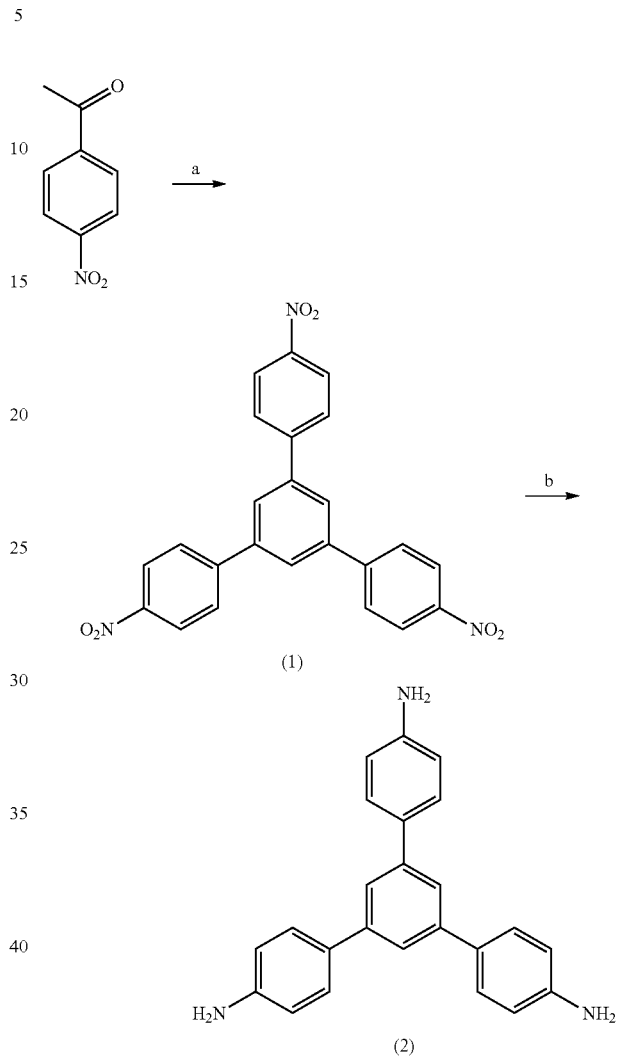

Reagent: (a) $CF_3SO_3H$; (b) $NH_2NH_2$, Pd/C 1,3,5-Tris(4-nitrophenyl)benzene (1) and 1,3,5-tris-(4-aminophenyl)benzene (2) were synthesized according to the literature.

Synthesis of 2,5-divinylterephthalaldehyde

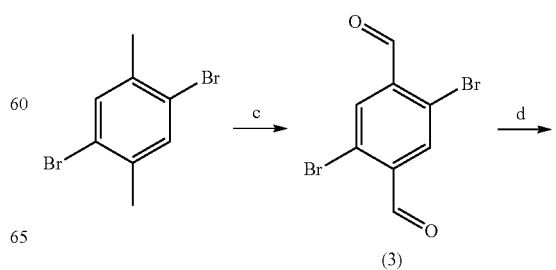

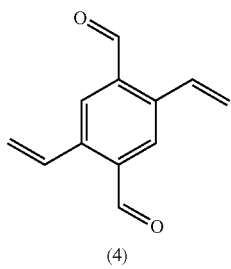

(4)

Reagent: (c) CH₃COOH, (CH₃CO)₂O, H₂SO₄, CrO₃; (d) Pd(PPh₃)₄, potassium vinyltrifluoroborate 2,5-dibromobenzene-1,4-dicarbaldehyde (3) and 2,5-divinylterephthalaldehyde (4) were synthesized according to the literature.

Synthesis of COF-V: COF-V was synthesized according to the literature.[23]

Synthesis of COF-VF: To the mixture of COF-V (100 mg) and a catalytic amount of azobisisobutyronitrile (AIBN), 10 v/v % 1H,1H,2H,2H-perfluorodecanethiol trifluorotoluene solution (10 mL) was introduced. After being stirred at 60° C. for 2 h, the title product was isolated by filtration, washed with acetone, and dried under vacuum at 50° C.

Figure 17A:
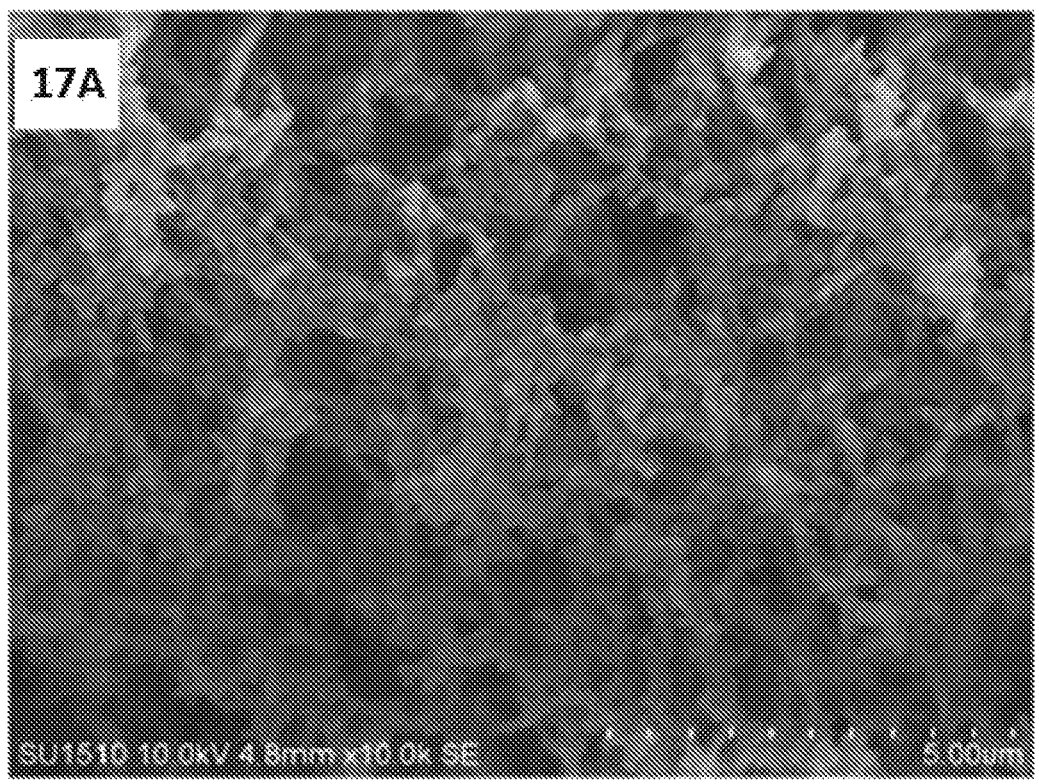
FIGS. 17A-17B show morphology and crystallinity characterization including SEM image (FIG. 17A) and XRD pattern (FIG. 17B) of COF-V synthesized under the conditions listed below. 1,3,5-tris(4-aminophenyl)-benzene (4 mg) and 2,5-divinylterephthalaldehyde (3 mg) were dissolved in anisole (4.75 mL) and phenethanol (0.25 mL). After that, 0.5 mL of 6 M aqueous acetic acid was added and the tube was flash frozen at 77 K, evacuated, and sealed. The reaction mixture was then heated at 100° C. for 3 days to afford a yellow-brown precipitate which was isolated by filtration and washed with anhydrous tetrahydrofuran.
Figure 17B:
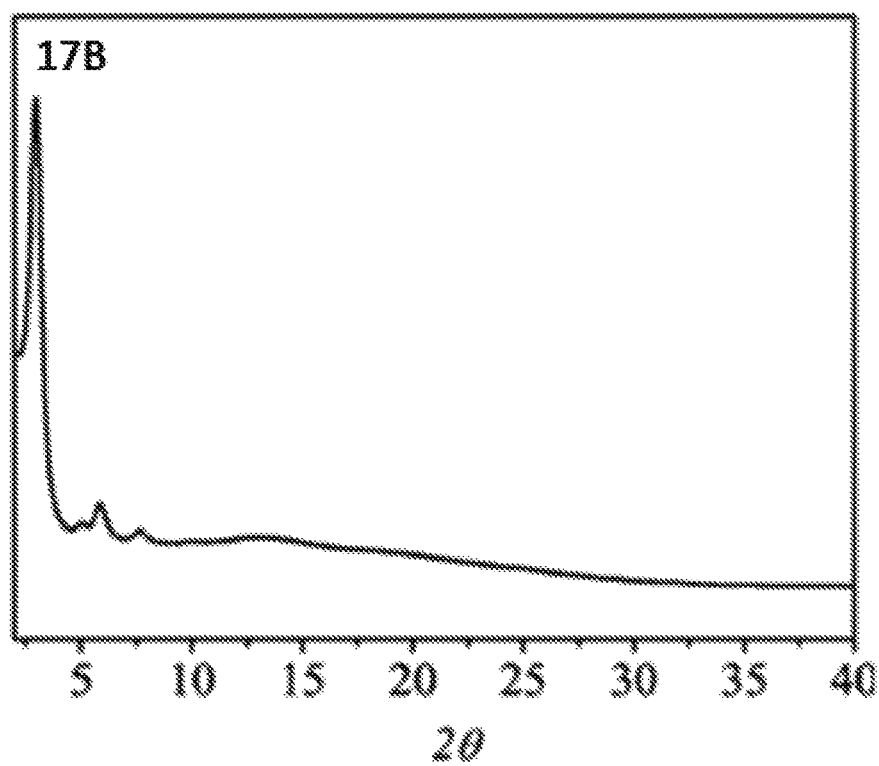
Figure 18:
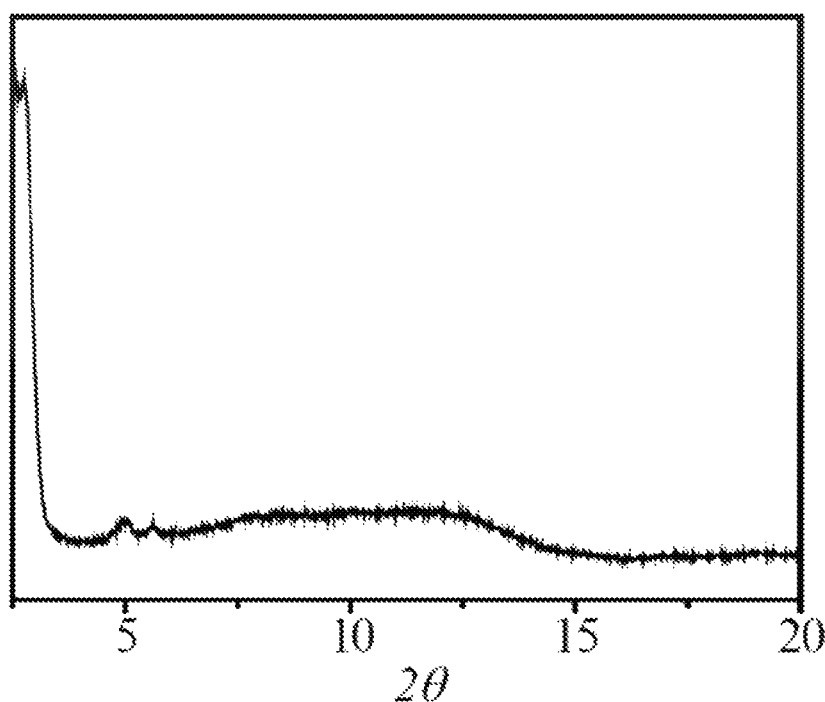
FIG. 18 shows the XRD pattern of finely grinded COF-VF@Foam.

Synthesis of COF-VF@Foam: Melamine foam (ca. 3 mg) was soaked in a mixture of 1,3,5-tris(4-aminophenyl)-benzene (4 mg) and 2,5-divinylterephthalaldehyde (3 mg) in anisole (4.75 mL) and phenethanol (0.25 mL) for 24 h. After that, 0.5 mL of 6 M aqueous acetic acid was added and the tube was flash frozen at 77 K, evacuated, and sealed. The reaction mixture was heated at 100° C. for 3 days and the resultant foam was washed thoroughly with acetone and dried under vacuum. The dried foam was then soaked in 10 v/v % 1H,1H,2H,2H-perfluorodecanethiol trifluorotoluene solution (10 mL) with a catalytic amount of azobisisobutyronitrile (AIBN) and heated at 60° C. for 24 h. The title product was isolated, washed with acetone, and dried under vacuum at 50° C. The COF weight percent in the resultant COF-VF@Foam is around 10 wt % calculated based on the mass increase after introducing the COF material. Note: To homogeneously integrate COF-V with melamine foam, we modified the COF-V synthesis conditions. Under these conditions, the system is homogeneous before heating, which is essential for the yielded COF-V crystals to uniformly wrap the foam fibers. The SEM image and XRD pattern of COF-V synthesized under the conditions aforementioned in the absence of melamine foam are shown in FIGS. 17A-17B for comparison. To test the crystallinity of COF-VF component on COF-VF@Foam, XRD of the fine grinded composite was tested, which exhibits obvious diffraction peaks, thus indicting the crystallinity of COF-VF component on COF-VF@Foam (FIG. 18). The relatively weak peaks observed can be reasonably attributed to that COF-VF only takes up a very small fraction of COF-VF@Foam composite.

Characterization

IR spectra were recorded on a Nicolet Impact 410 FTIR spectrometer. ICP-OES was performed on a Perkin-Elmer Elan DRC II Quadrupole. X-ray photoelectron spectroscopy (XPS) spectra were performed on a Thermo ESCALAB 250 with Al Kα irradiation at θ=90° for X-ray sources, and the binding energies were calibrated using the Cis peak at 284.9 eV. ¹H NMR spectra were recorded on a Bruker Avance-400 (400 MHz) spectrometer. Chemical shifts are expressed in ppm downfield from TMS at δ=0 ppm, and J values are given in Hz. ¹³C and ¹⁹F cross-polarization magic-anglespinning (CP-MAS) was recorded on a Varian infinity plus 400 spectrometer equipped with a magic-angle spin probe in a 4-mm ZrO₂ rotor. Powder X-ray diffraction (PXRD) data were collected on a Bruker AXS D8 Advance A25 Powder X-ray diffractometer (40 kV, 40 mA) using Cu Kα (λ=1.5406 Å) radiation. The gas adsorption isotherms were collected on a surface area analyzer, ASAP 2020. The N₂ sorption isotherms were measured at 77 K using a liquid N₂ bath. Scanning electron microscopy (SEM) images were collected using a Hitachi SU 1510. Photographs of water and organic compounds on the surface of the samples in the pressed pellet form were measured with SL200KB (USA KNO Industry, Co.), equipped with a charge-coupled device camera. Water adsorption and desorption isotherms were obtained via SMS Instruments DVS Advantage. The balance has a sensitivity of 0.1 mg. These isotherms were measured at 298 K by monitoring the weight change of the sample as a function of relative humidity of water. The relative humidity of water was stepped up from 0 to 98% with an increment of 10% in each step and then was stepped down to 0%. Real-time weight, temperature, and relative humidity were recorded. Toluene adsorption isotherms were measured via Micromeritics 3Flex. These isotherms were collected at 298 K by monitoring the volume change.

Results and Discussion

Figure 19A:
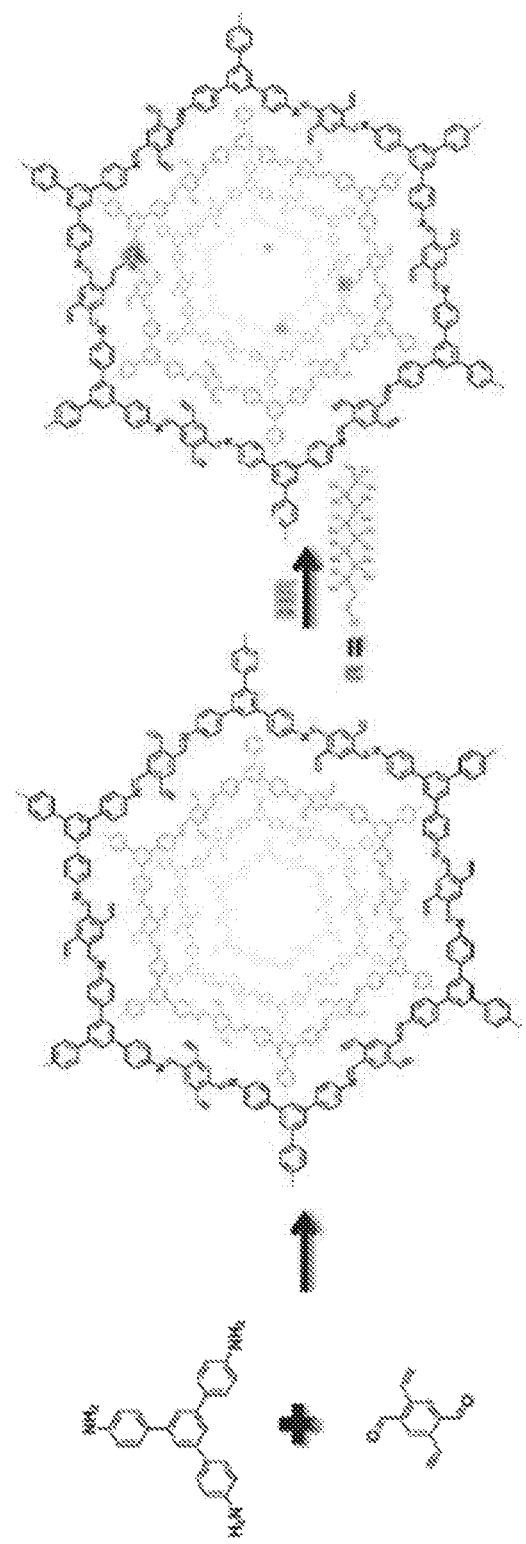
FIGS. 19A-19D depict the a synthetic scheme of COF-V through the condensation of 1,3,5-tris(4-aminophenyl)-benzene and 2,5-divinylterephthalaldehyde and pore surface engineering by thiol-ene reaction with 1H,1H,2H,2H-perfluorodecanethiol (FIG. 19A), graphic views of the slipped AA stacking structure of COF-V (FIGS. 19B-19C), and a graphic view of COF-VF (FIG. 19D).
Figure 19B:
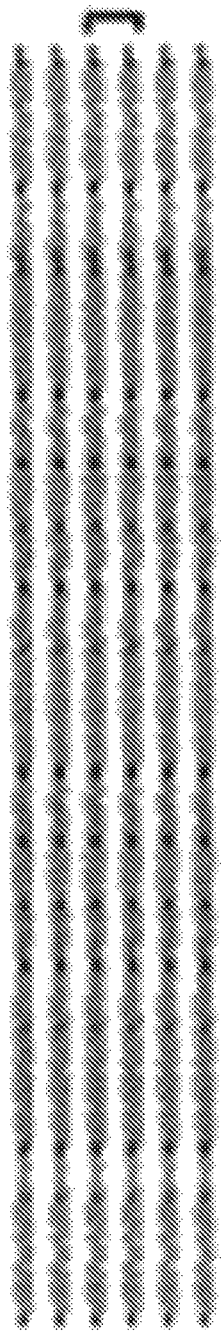
Figure 19C:
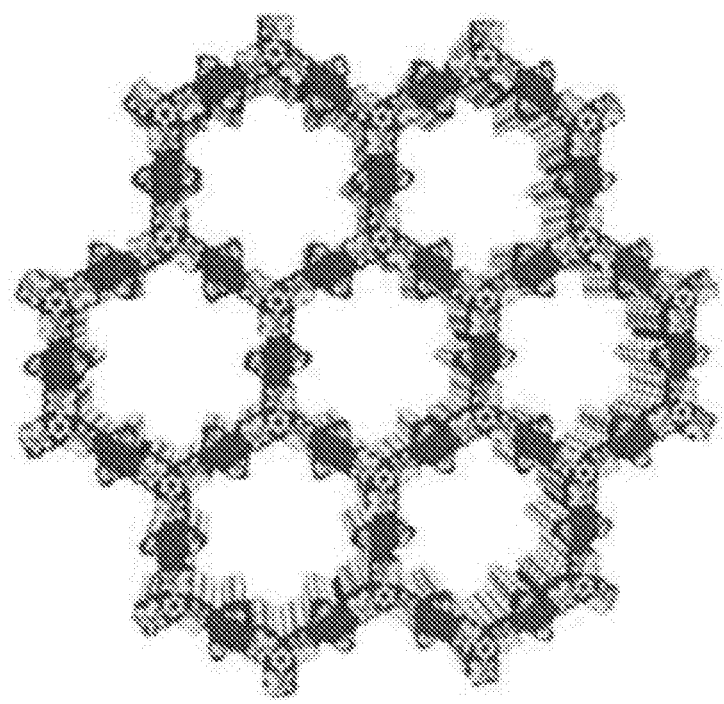
Figure 19D:
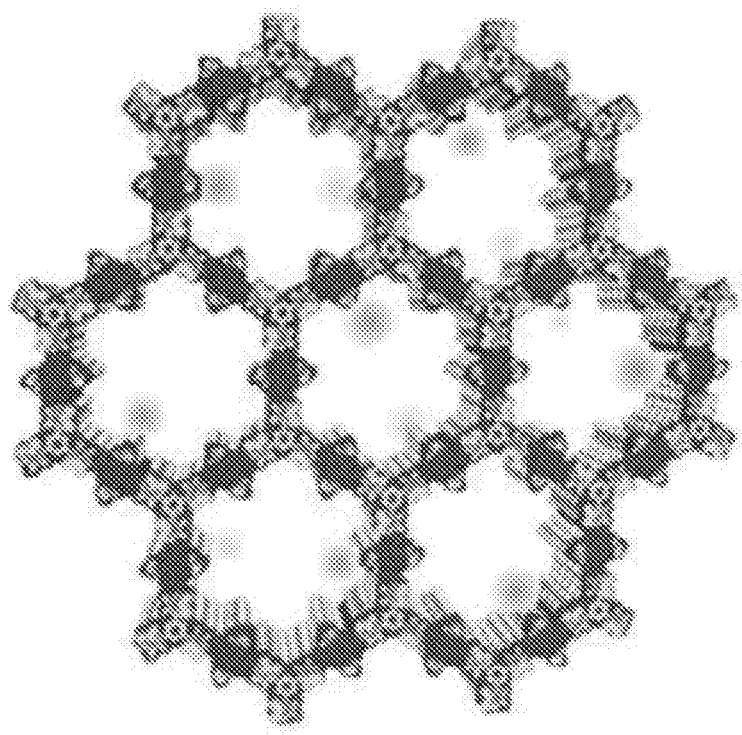

To test the feasibility of pore channel engineering for controlling the wettability of COFs, a COF bearing the vinyl functionality synthesized from the condensation between 1,3,5-tris(4-aminophenyl)-benzene and 2,5-divinylterephthalaldehyde, which was developed by our group, was selected for proof of principle due to its excellent chemical stability, large pore size, and abundant high reactivity vinyl groups for potential chemical transformations (FIGS. 19A-19D).[23] Given the low surface free energy of fluorinated compounds,[51] especially for the long chain ones, in conjugation with the facility and controllability of the thiol-ene click reaction,[51] 1H,1H,2H,2H-perfluorodecanethiol was chosen to modify the pore surface of COF-V to manipulate the wettability. Since the enhancement of hydrophobicity, by increasing the grafting degree of fluorinated compounds, is at the expense of both porosity and crystallinity of the material, reaction conditions were screened to achieve the trade-off between hydrophobicity and the retention of intrinsic properties of the COF. Under optimal synthetic conditions, reacting COF-V with a 10 v/v % 1H,1H,2H,2H-perfluorodecanethioltrifluorotoluene solution in the presence of a catalytic amount of azobisisobutyronitrile (AIBN) for 2 h, resulted in the desired material (COF-VF, FIG. 19A).

Figure 3A:
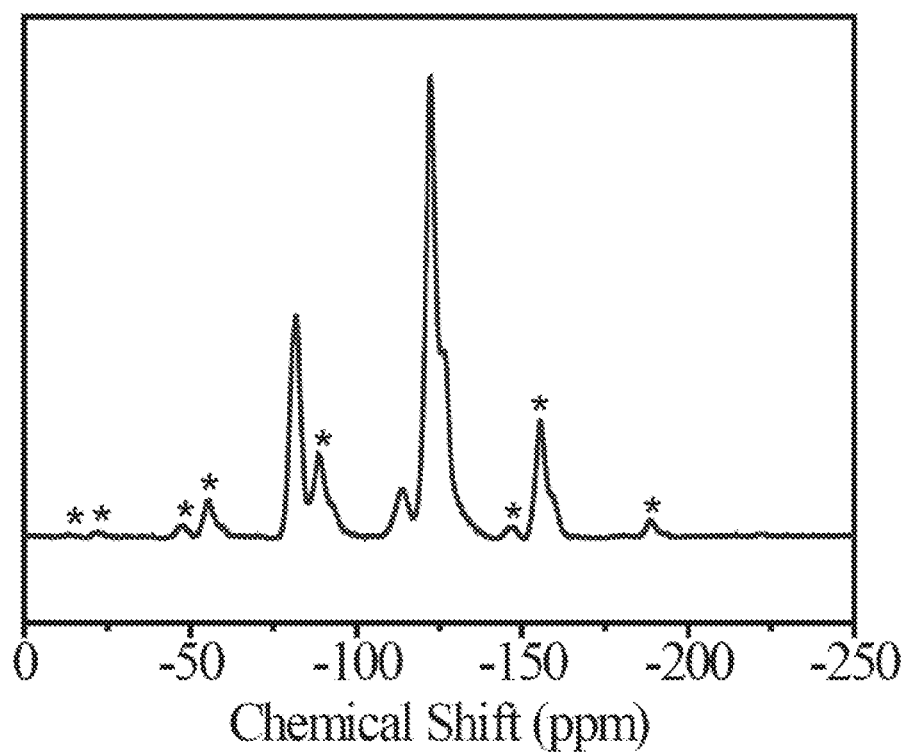
FIGS. 3A-3B show $^{19}F$ MAS NMR spectrum of COF-VF (FIG. 3A) and liquid $^{19}F$ NMR spectrum (FIG. 3B) of 1H,1H,2H,2H-perfluorodecanethiol. The chemical shift of F species in COF-VF is similar to that of the 1H,1H,2H,2H-perfluorodecanethiol compound. * side bands.
Figure 3B:
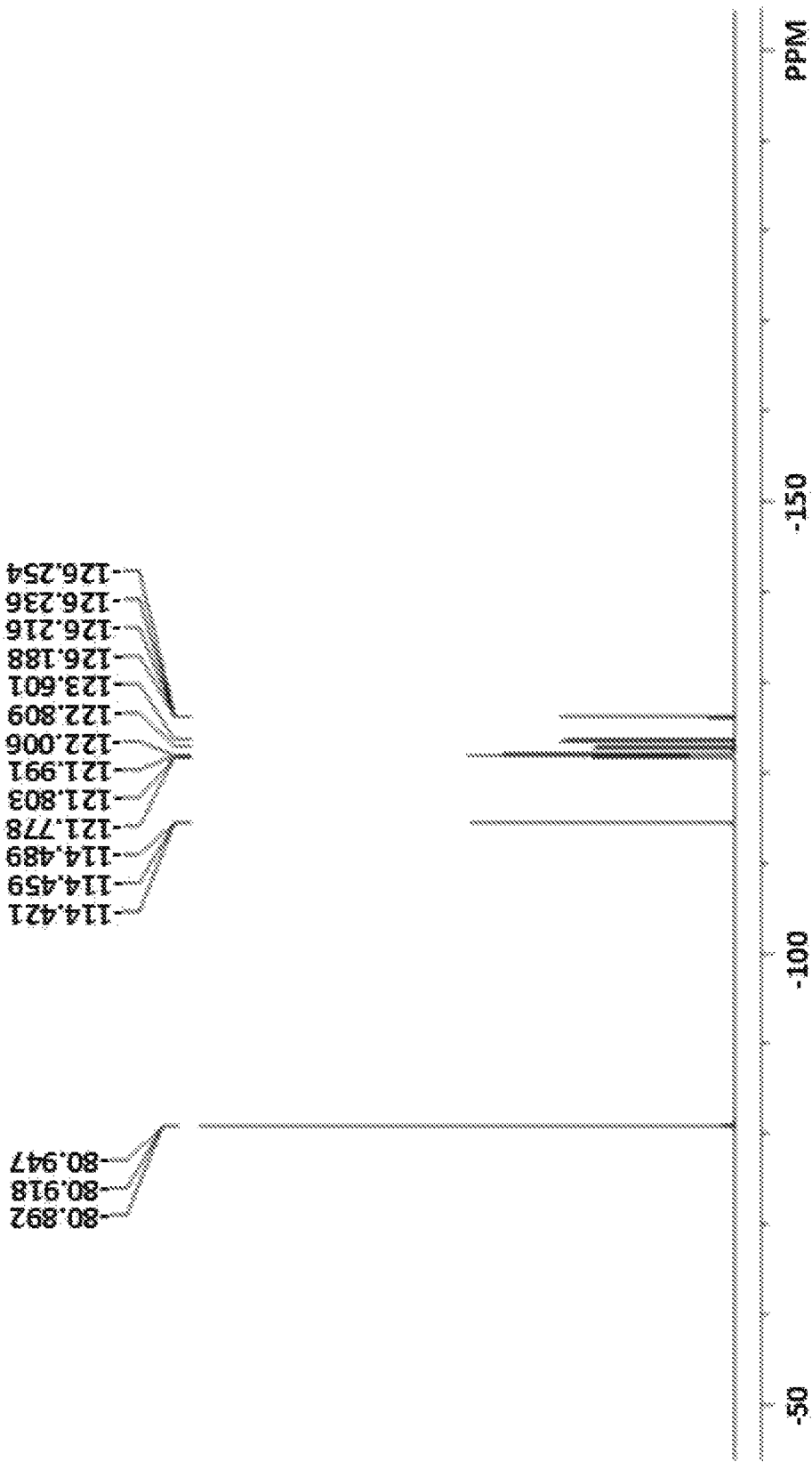
Figure 4:
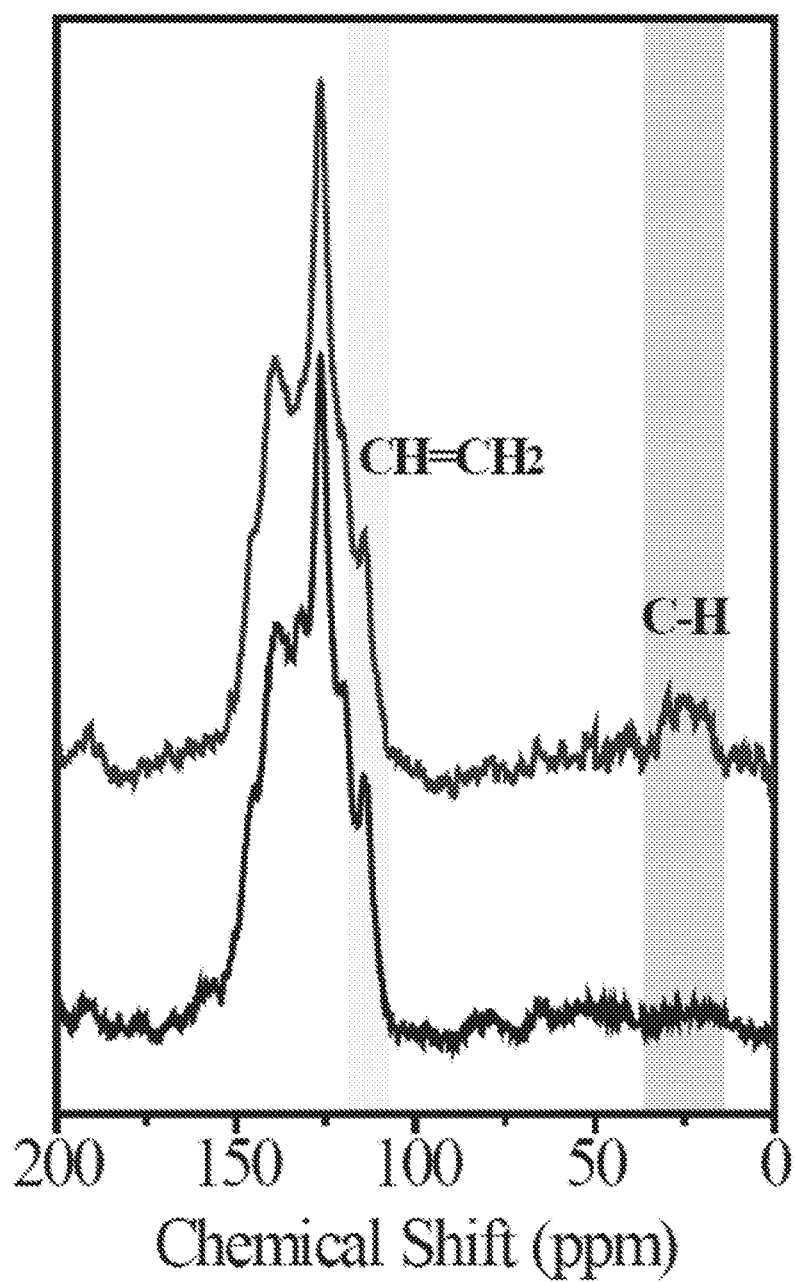
FIG. 4 shows $^{13}$C MAS NMR spectra of COF-V (lower) and COF-VF (upper). The appearance of a noticeable peak at 26.3 ppm attributed to the alkyl carbon species from the reacted vinyl groups, as compared with the pristine COF-V, confirms the covalent bond formation between vinyl groups on COF-V and 1H,1H,2H,2H-perfluorodecanethiol. However, the relative intensity of the peak ascribed to the vinyl group did not change obviously in comparison with that in COF-V, suggesting that only a small part of the vinyl groups participate in the reaction.
Figure 20A:
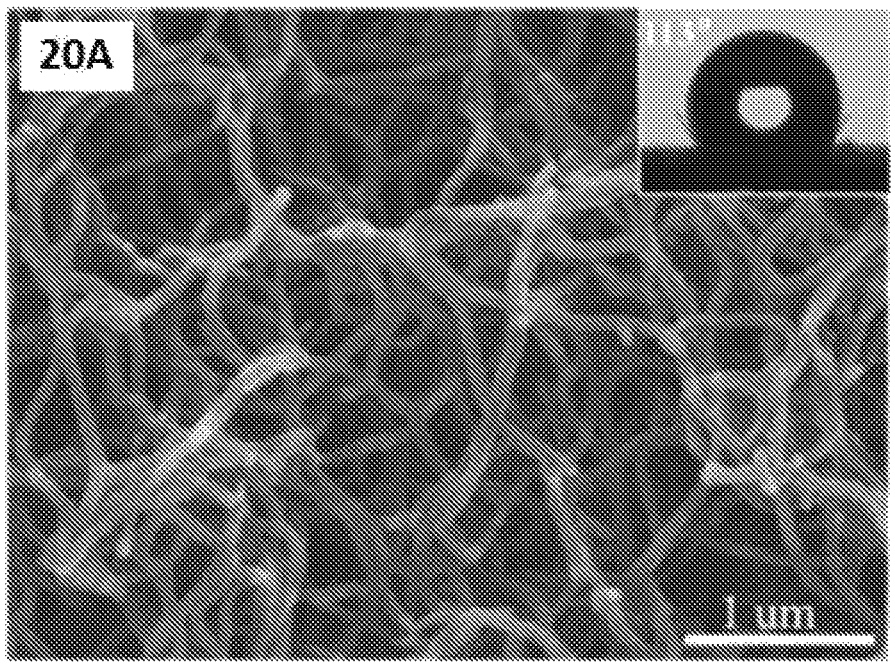
FIGS. 20A-20B show SEM images for COF-V and COF-VF, respectively (insets: corresponding water contact angles).
Figure 20B:
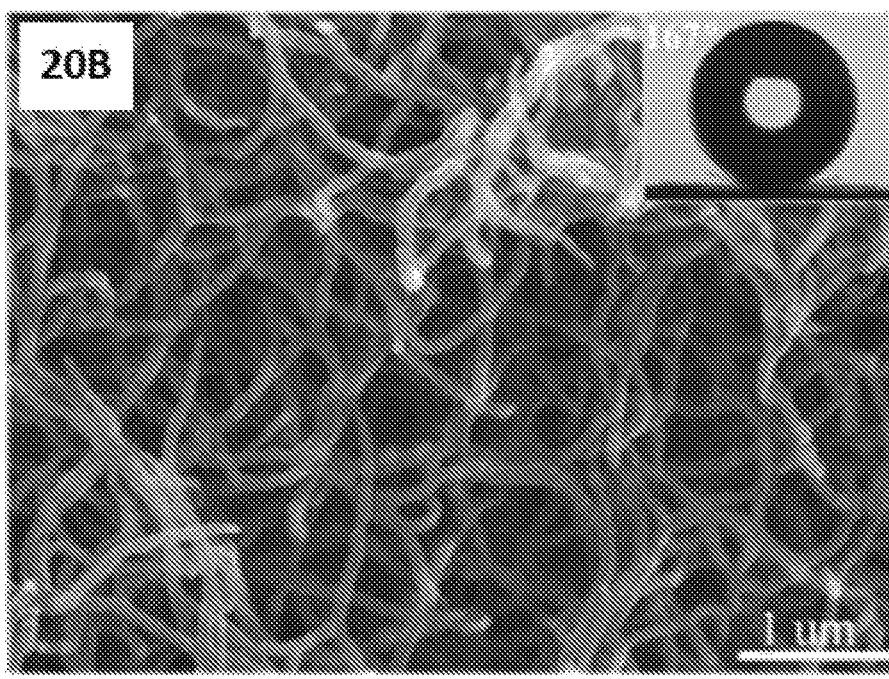

FIGS. 20A-20B show scanning electron microscopy (SEM) images of the COF materials before and after the pore surface modification, which reveal that no noticeable morphological changes occur and both of them show a large quantity of uniform nanofibers with diameters of about 80 nm. To examine the change of surface functionalities after chemical modification, Fourier transform infrared spectroscopy (FT-IR), X-ray photoelectron spectroscopy (XPS), EDX mapping, and solid-state NMR spectroscopy were performed. The appearance of new peaks at 1241 and 1212 cm⁻¹, which were assigned to the C—F stretching vibrations [51] together with the presence of the C—F (292.2 eV), as well as elements F (F1s at 689.6 eV) and S (S2p at 163.4 eV) signals in the FT-IR (FIG. 1) and XPS spectra of COF-VF (FIGS. 2A-2F), respectively, indicate the successful incorporation of perfluoroalkyl groups onto COF-V. The EDX mapping via SEM verifies the homogeneously distributed F, N, and S elements throughout COF-VF. To provide additional proof, solid-state NMR analyses were employed. As shown in FIG. 3A, $^{19}$F MAS NMR spectrum of COF-VF gives clear F signals with the same chemical shifts as those of 1H,1H,2H,2H-perfluorodecanethiol. In addition, the appearance of a noticeable peak at 26.3 ppm attributed to the alkyl carbon species from the reacted vinyl groups confirms the covalent bond formation between vinyl groups on COF-V and 1H,1H,2H,2H-perfluorodecanethiol. However, the relative intensity of the peak ascribed to the vinyl group did not change obviously in comparison with that in COF-V, suggesting that only a small part of the vinyl groups participate in the reaction (FIG. 4). To quantify the degree of post-synthetic modification, the content of F species in COF-VF was evaluated by elemental analysis. The results show that the weight percent of F species in COF-VF is 5.2 wt. %, which means about 4% of the vinyl groups are involved in the thiol-ene reaction.

Figure 5:
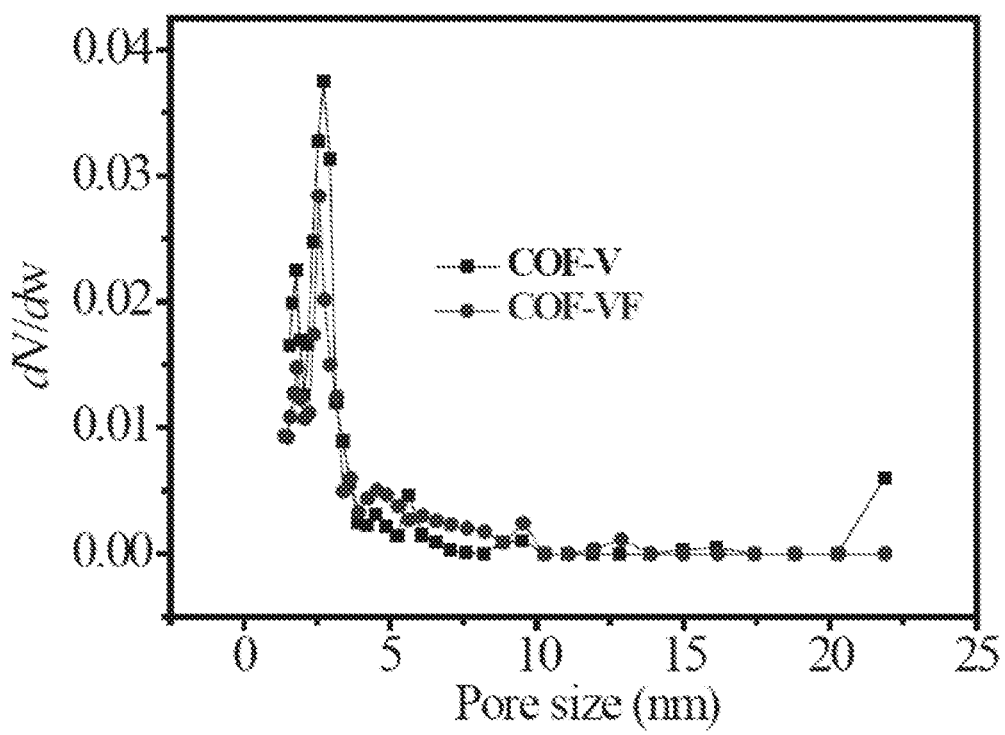
FIG. 5 shows a graph of pore size distribution of COF-V (squares) and COF-VF (circles), which was calculated based upon NLDFT.
Figure 20C:
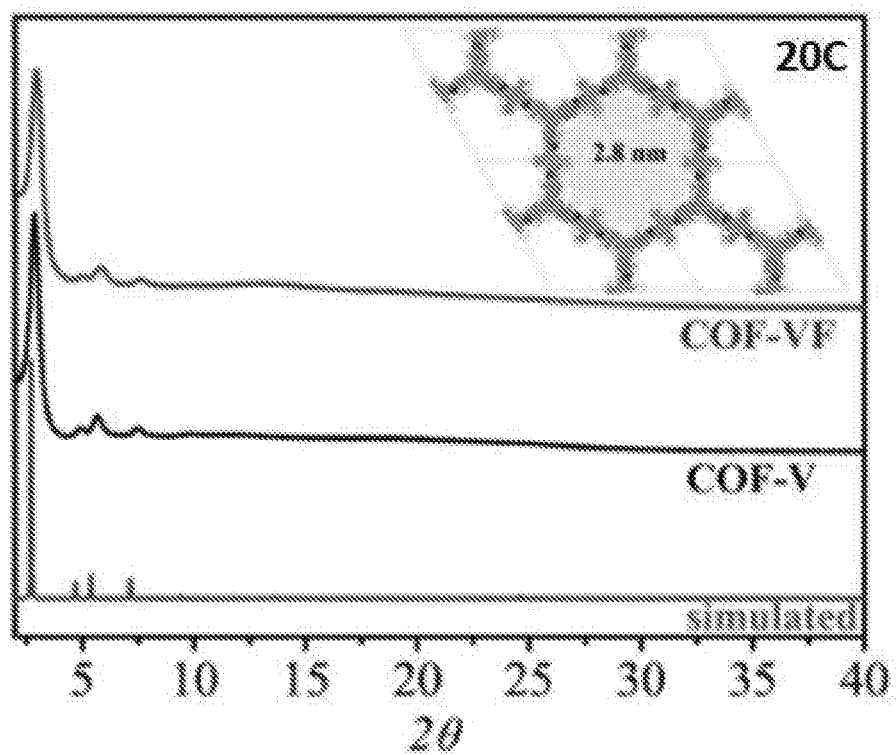
FIG. 20C shows PXRD profiles (inset: unit cell of the AA stacking mode of COF-V).
Figure 20D:
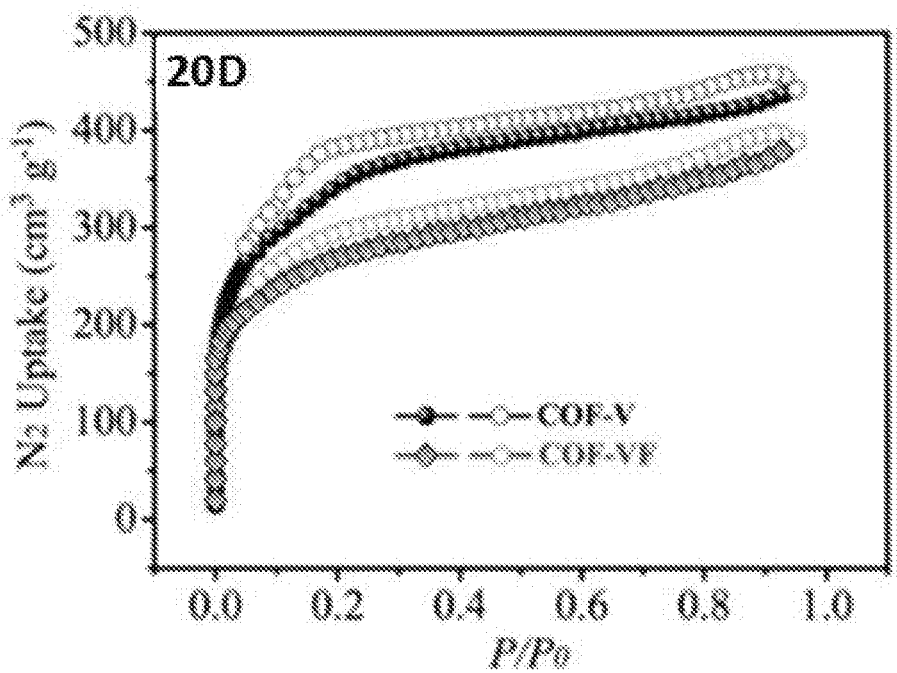
FIG. 20D shows nitrogen-sorption isotherms of COF-V (upper) and COF-VF (lower) measured at 77 K (solid symbols for adsorption and open symbols for desorption).
Figure 20E:
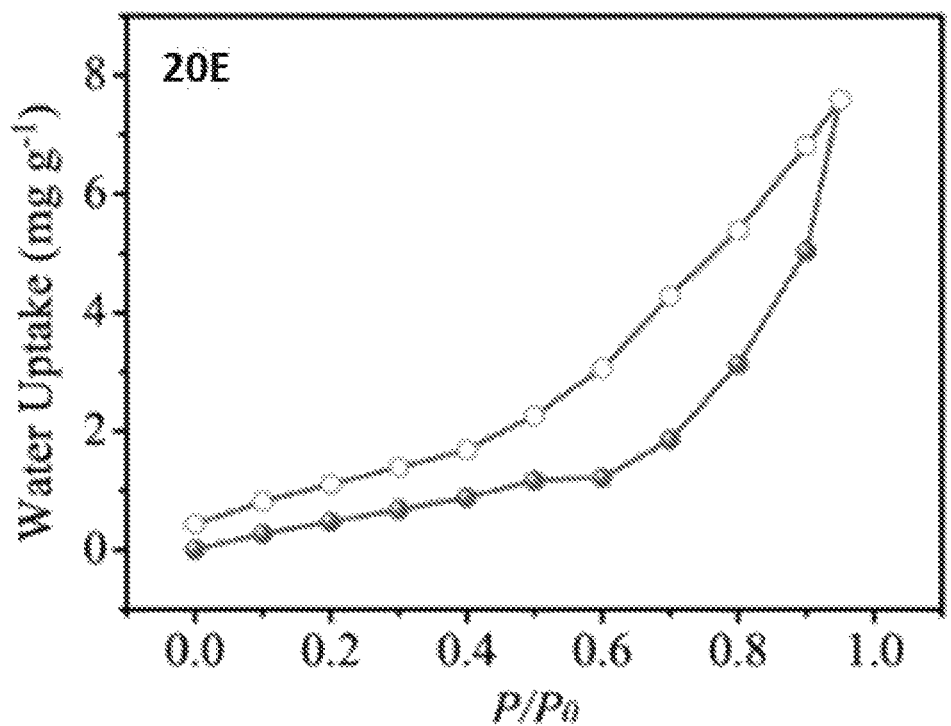
FIG. 20E shows water adsorption (solid symbols) and desorption (open symbols) isotherms of COF-VF collected at 298 K.
Figure 20F:
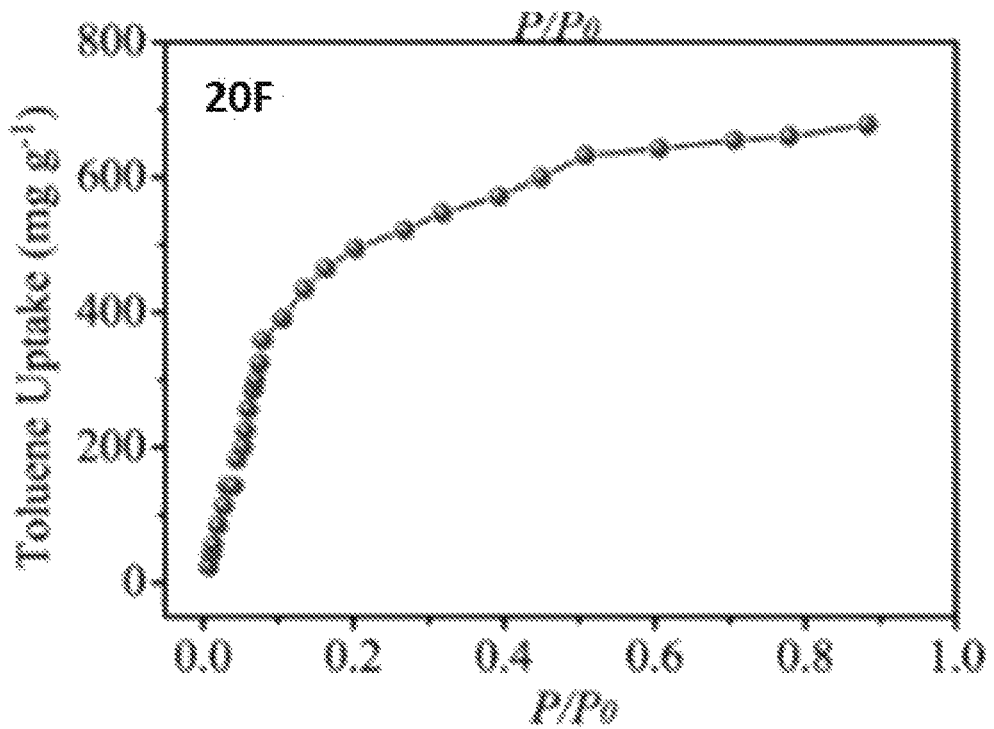
FIG. 20F shows toluene adsorption isotherm of COF-VF collected at 298 K.

To characterize the crystalline structure of COF-VF, powder X-ray diffraction (PXRD) measurements were carried out. COF-VF exhibits an intense peak at 2.8° along with some relatively weak peaks at 4.9°, 5.9°, 7.5°, and 24.9°, which agree well with the pristine pattern of COF-V, thus revealing the retention of crystallinity and structural integrity after introducing perfluoroalkyl groups (FIG. 20C). $N_2$ sorption isotherms collected at 77 K show that COF-V and COF-VF exhibit similar adsorption behavior (FIG. 20D). The BET surface area of COF-VF was calculated to be as high as 938 $m^2$ $g^{-1}$, rivaling that of COF-V (1152 $m^2$ $g^{-1}$), suggesting that the post-synthetic modification process has little effect on the pore structure of the pristine material, thereby still accessible for guest molecules (see also pore size distribution of these samples, FIG. 5).

Figure 6:
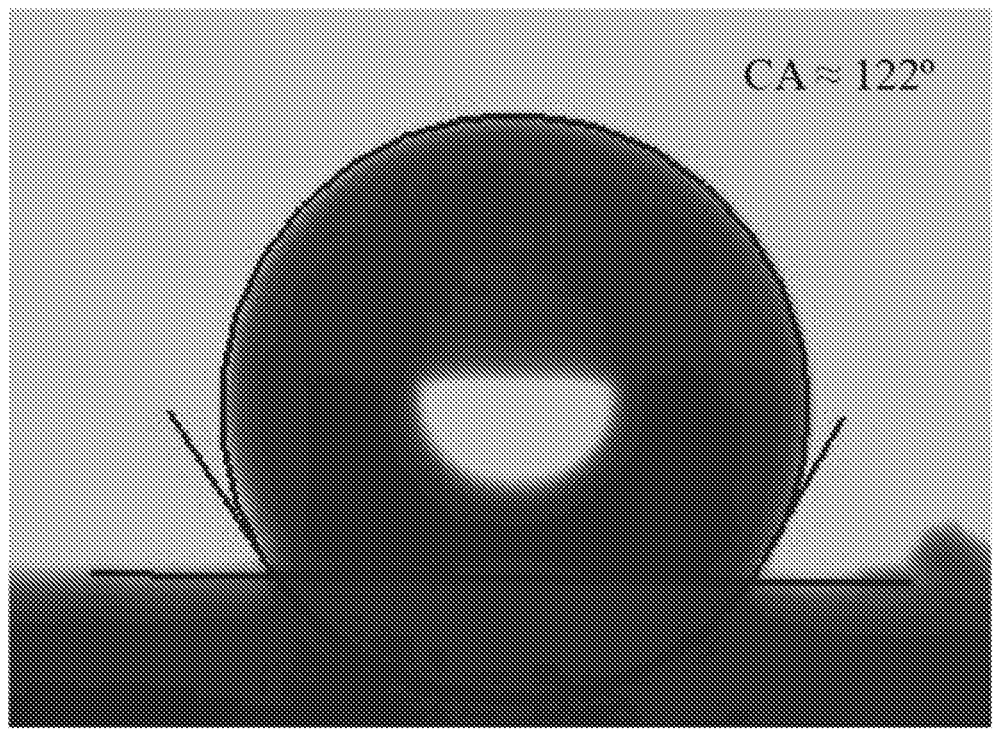
FIG. 6 shows a photograph of a water droplet on the pellet disk made from COF-V grafted with alkyl group, which was synthesized by treatment of COF-V and 1-dodecanethiol using the same procedure as that of COF-VF.
Figure 7:
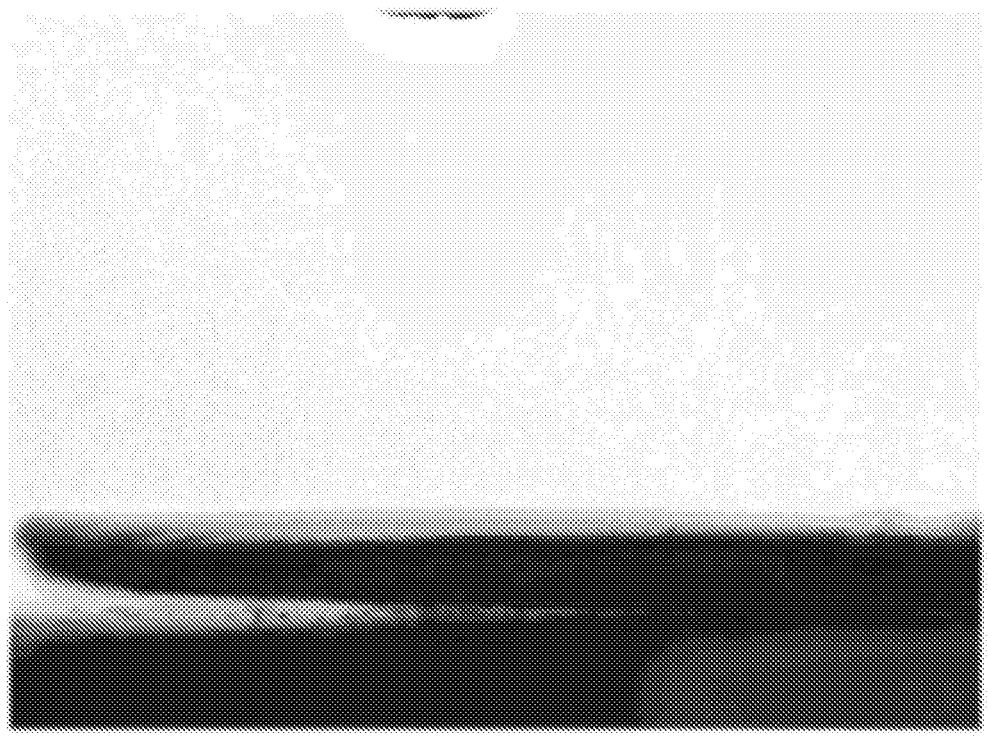
FIG. 7 shows a photograph of a nitrobenzene droplet on the pellet disk made from COF-VF. The nitrobenzene was quickly absorbed by COF-VF, thus indicating its superoleophilic property.
Figure 8:
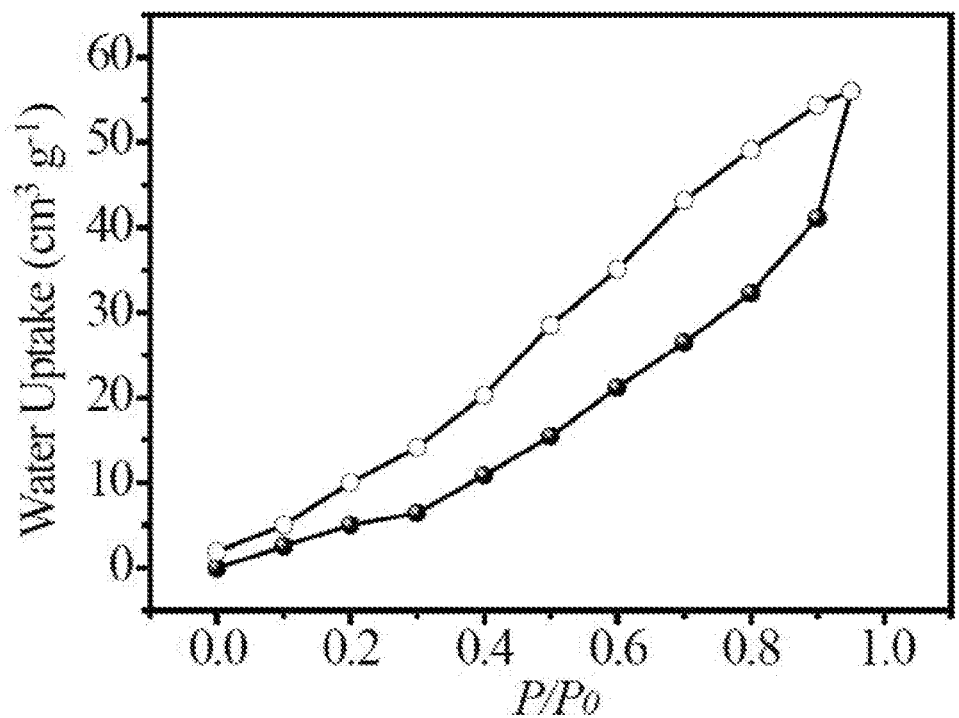
FIG. 8 shows a graph of water adsorption (solid symbols) and desorption (open symbols) isotherms collected at 298 K for COF-VF.

To investigate the effect of perfluoroalkyl group incorporation on the wettability of the COF material, the water contact angles (CA) of the surface were measured. COF-VF exhibits a static water CA of about 167°, thus revealing a superhydrophobic surface (superhydrophobic materials have a contact angle exceeding 150° for a water droplet, FIG. 20B, inset).[50] By contrast, COF-V and COF-V modified with alkyl group only give rise to CA of 113° and 122°, respectively FIG. 20A, inset and FIG. 6, respectively). Therefore, the incorporation of perfluoroalkyl groups significantly increases the hydrophobicity. However, when oil drops onto the surface of COF-VF, it can be quickly absorbed, displaying contact angles close to 0° (FIG. 7). To further elucidate the superhydrophobicity and superoleophilicity of COF-VF, vapor adsorption experiments were performed. Water adsorption isotherms reveal that COF-VF is highly hydrophobic, showing negligible water adsorption even at $P/P_0$ up to 0.9 (less than 10 mg $g^{-1}$), while COF-V exhibits a water adsorption capacity of 56 mg g-1 (FIG. 8). In contrast, it has a toluene adsorption isotherm that shows sharp uptake at very low pressure ($P/P_0$<0.1) and attains a saturation capacity exceeding 680 mg g-1 at P/P0=0.88. These results indicate that the large channels in COF-VF are "closed" to water yet "open" to toluene, exhibiting superior hydrophobic and oleophilic behaviors, which offer exceptional potential for overcoming the problems associated with the adsorption of harmful volatile organic compounds (VOCs) in highly competitive moist environments.

Figures 9A, 9B:
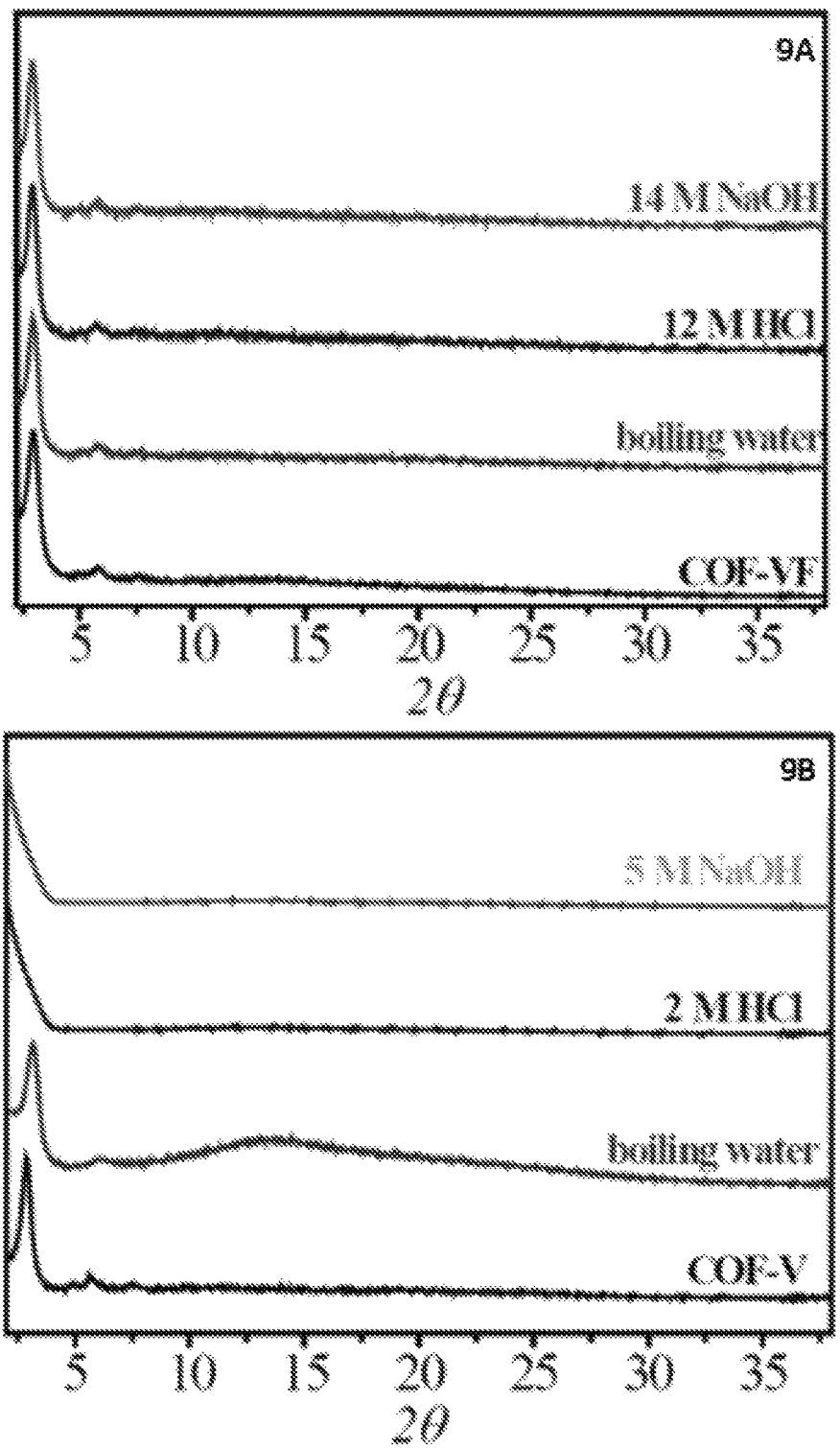
FIGS. 9A-9B show PXRD patterns of COF-VF (FIG. 9A) and COF-V (FIG. 9B) including pristine (bottom curves) and after treatment for 7 days in boiling water, in 12 M HCl at room temperature for 24 hours, or in 14 M NaOH at room temperature for 24 hours.
Figure 10A:
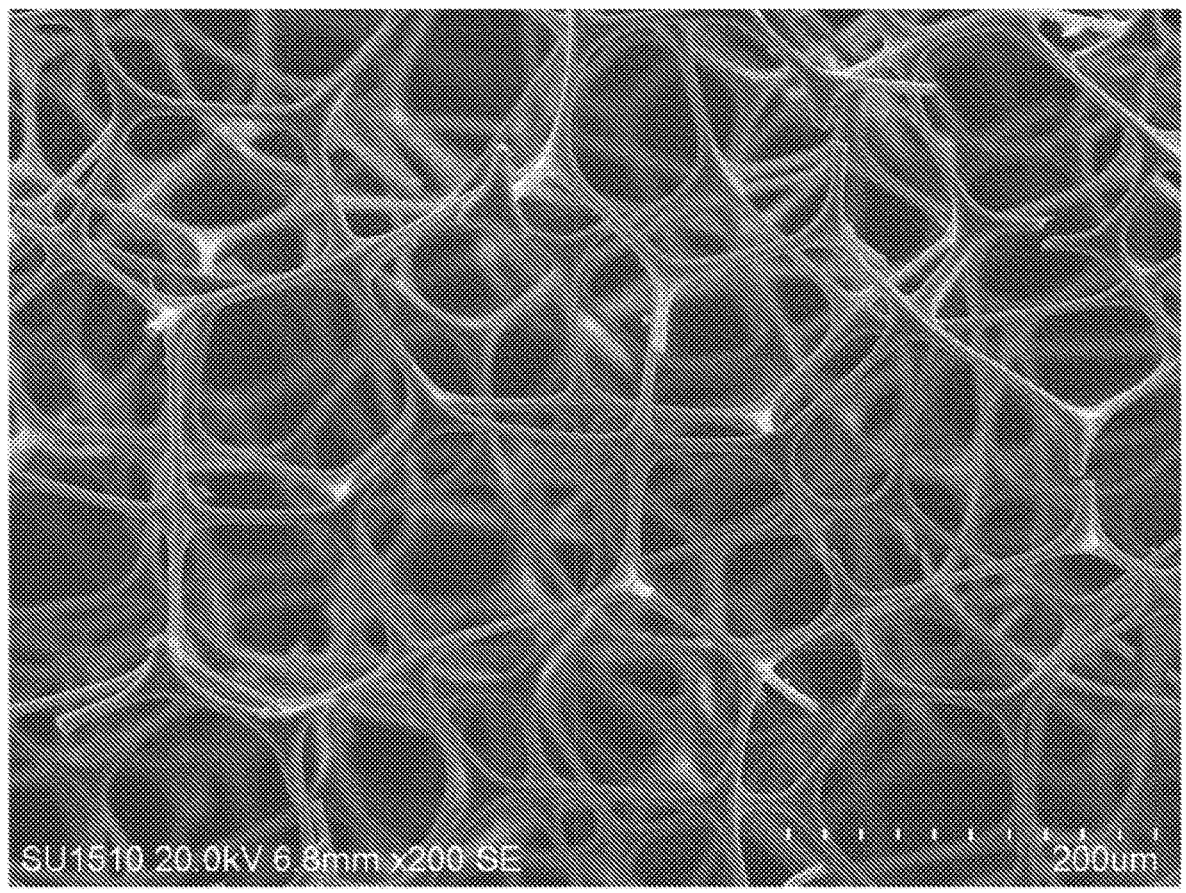
FIGS. 10A-10B show SEM images of pristine melamine foam at different levels of magnification.
Figure 10B:
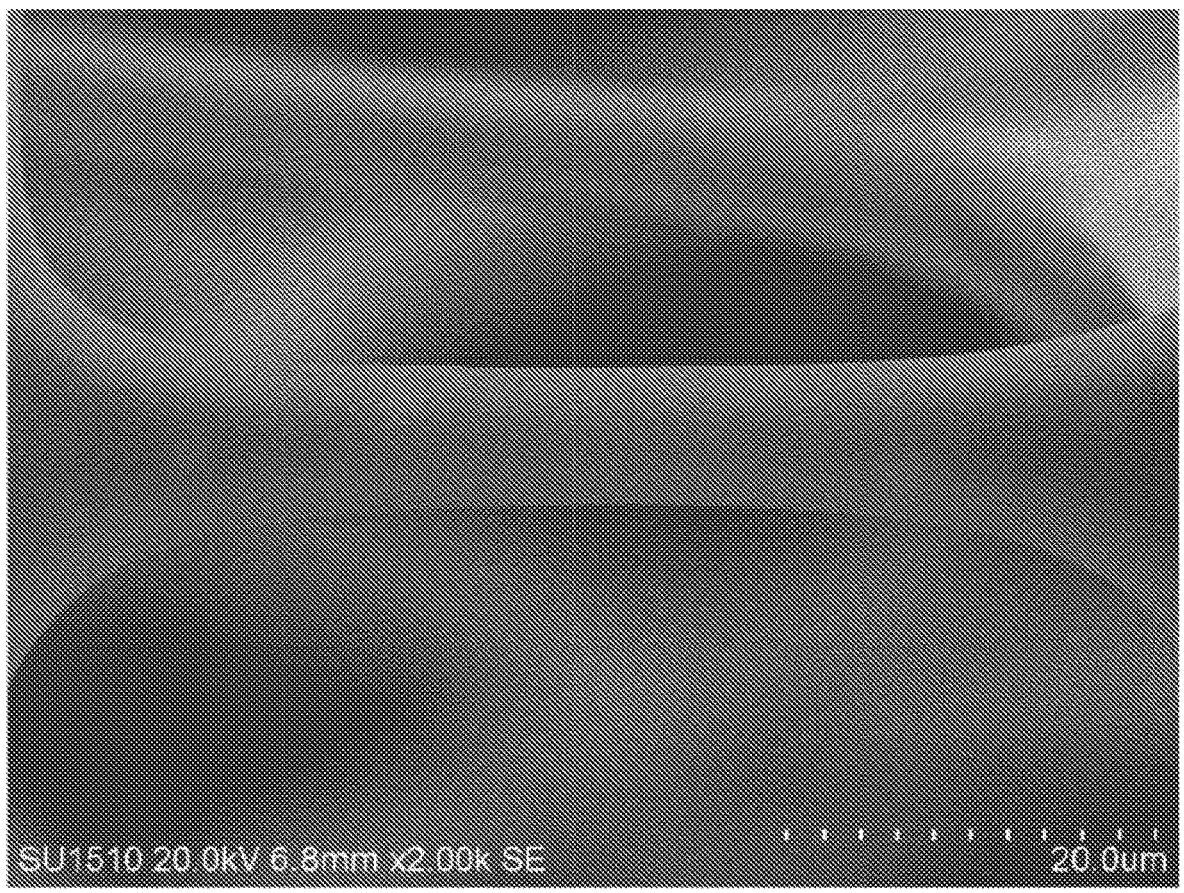
Figure 11A:
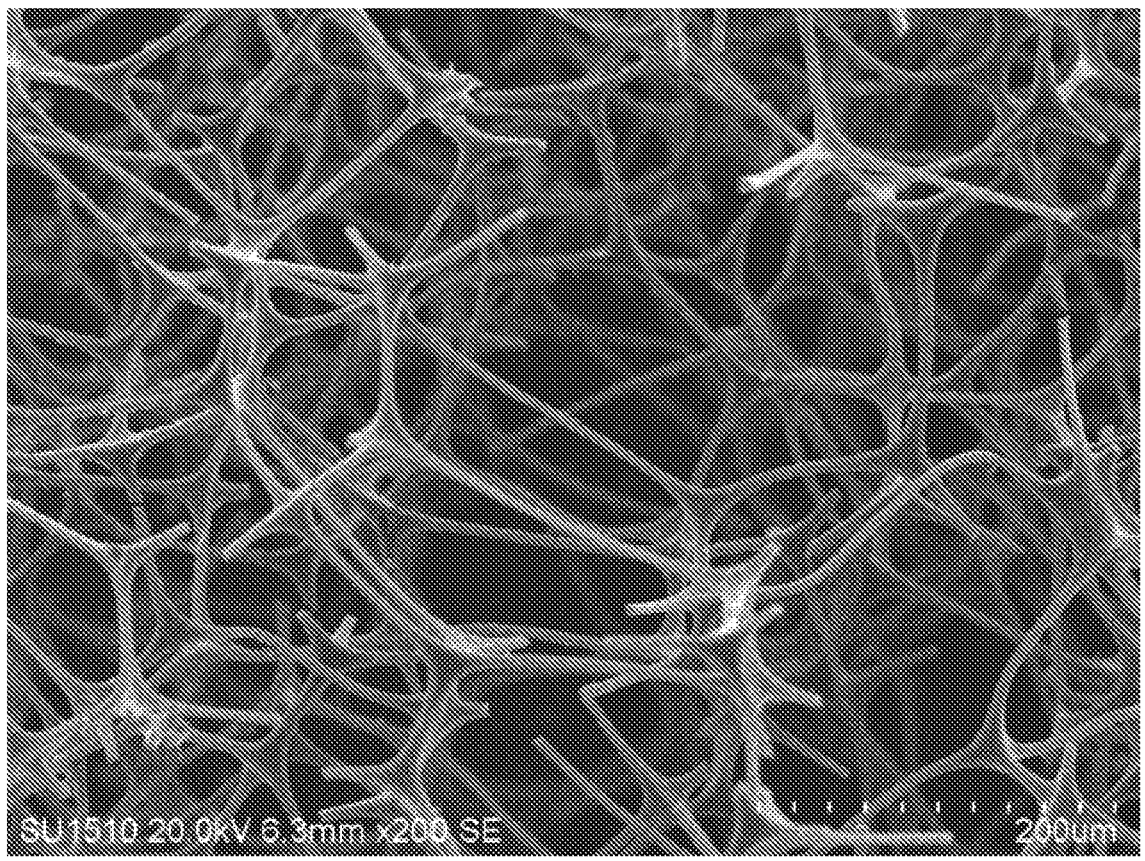
FIGS. 11A-11D show SEM images of COF-VF coated melamine foam (COF-VF@foam) with different levels of magnification.
Figure 11B:
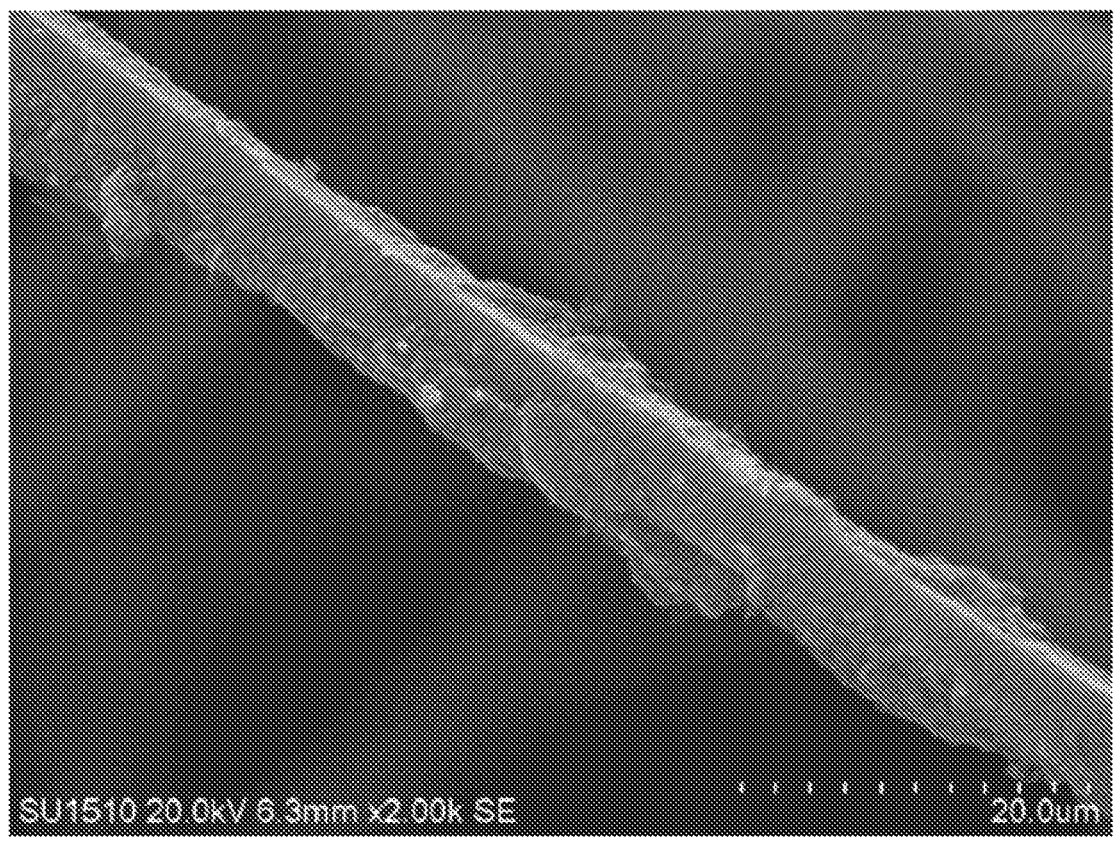
Figure 11C:
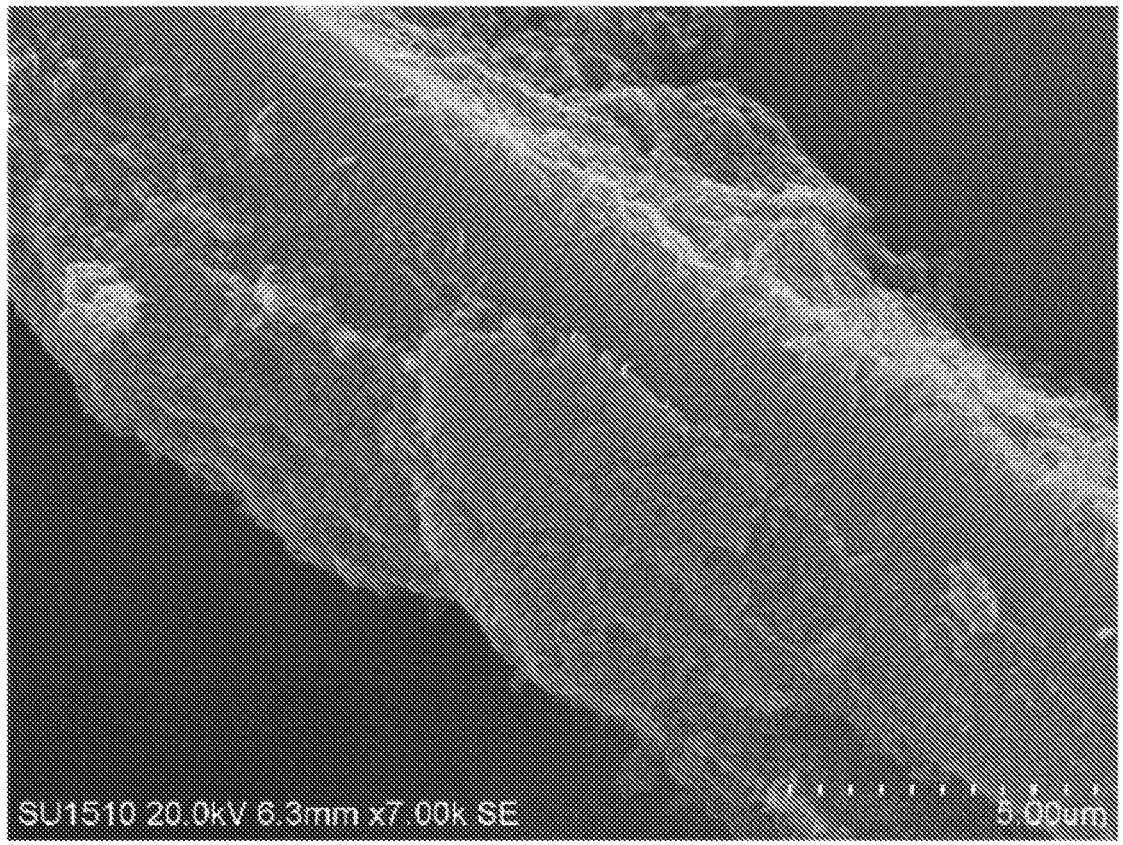
Figure 11D:
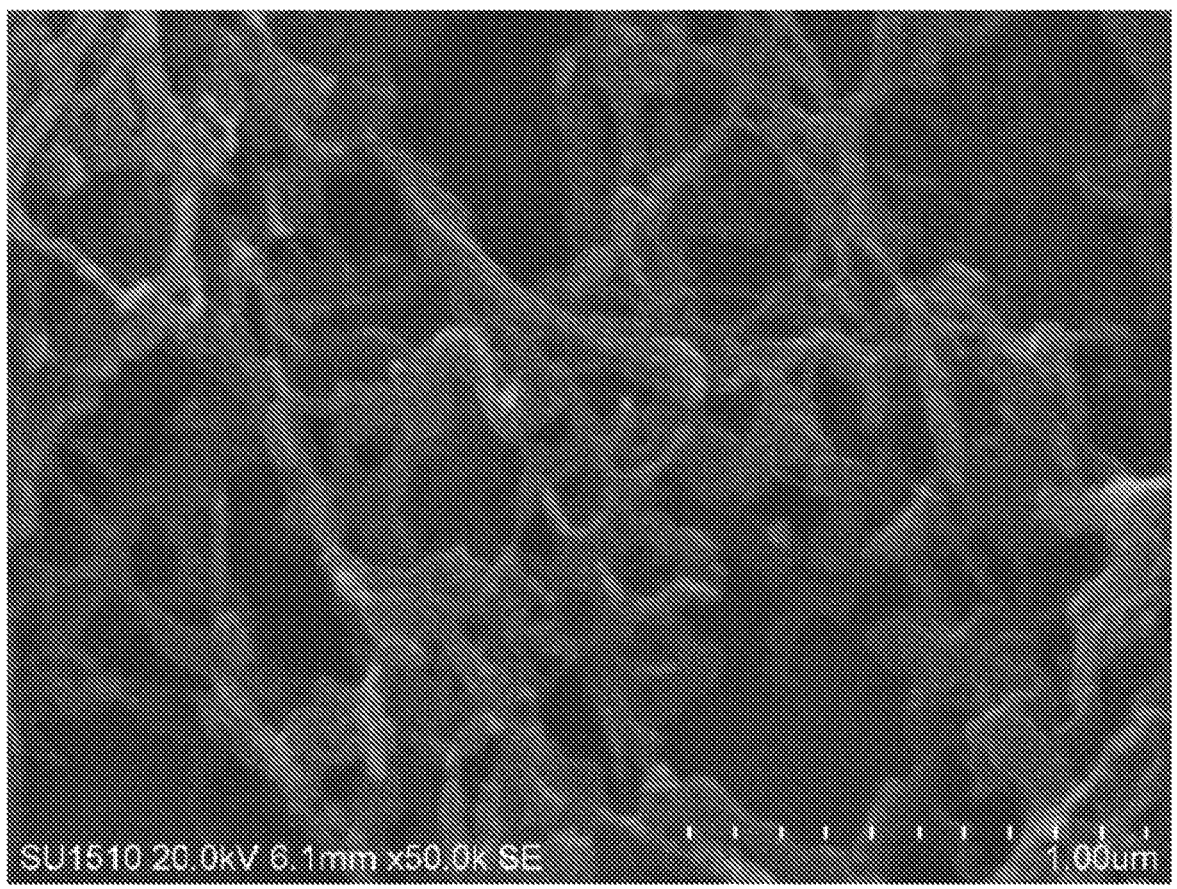
Figure 12:
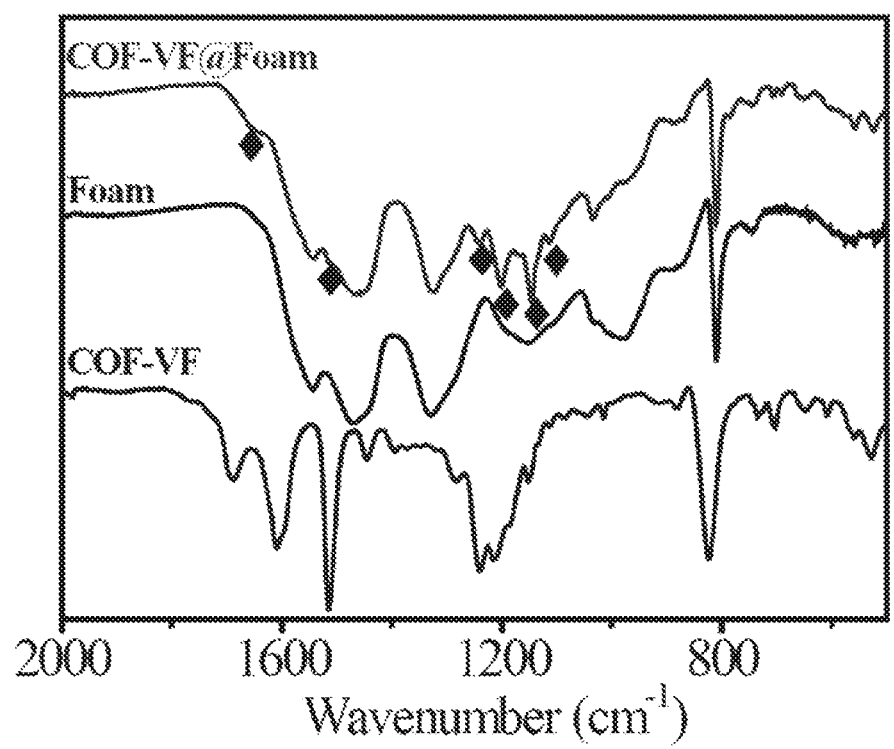
FIG. 12 shows IR spectra of COF-VF (lower), pristine foam (middle), and COF-VF@Foam (upper).
Figure 13A:
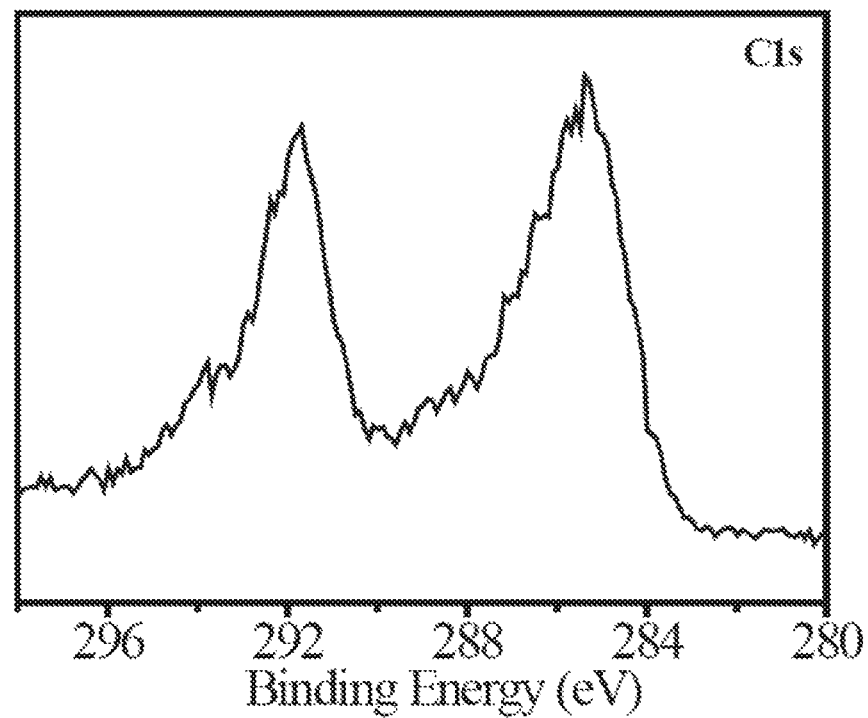
FIGS. 13A-13C shows C1s (FIG. 13A), F1s (FIG. 13B), and S2p (FIG. 13C) XPS spectra of COF-VF@Foam.
Figure 13B:
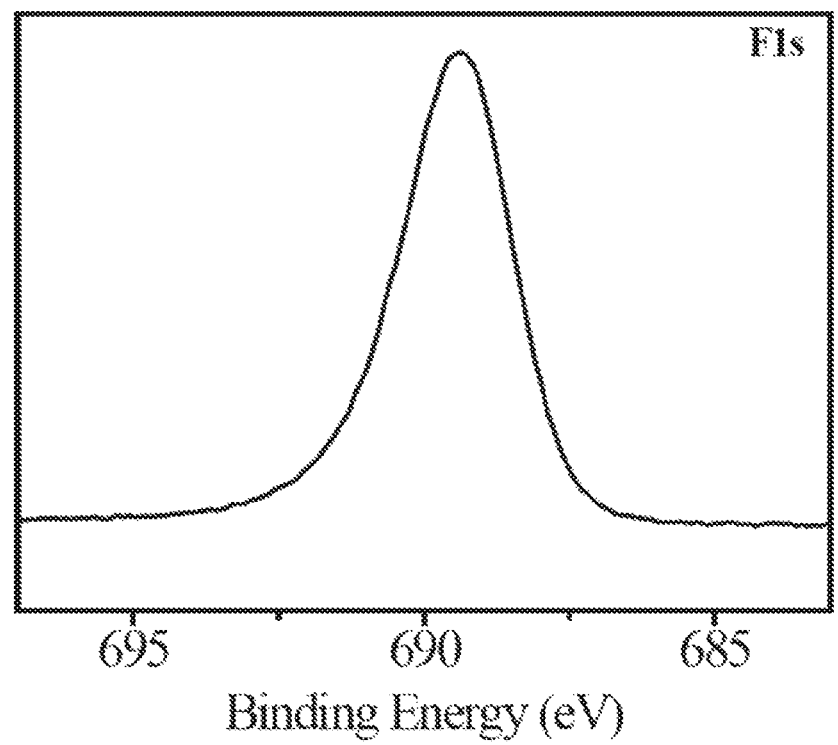
Figure 13C:
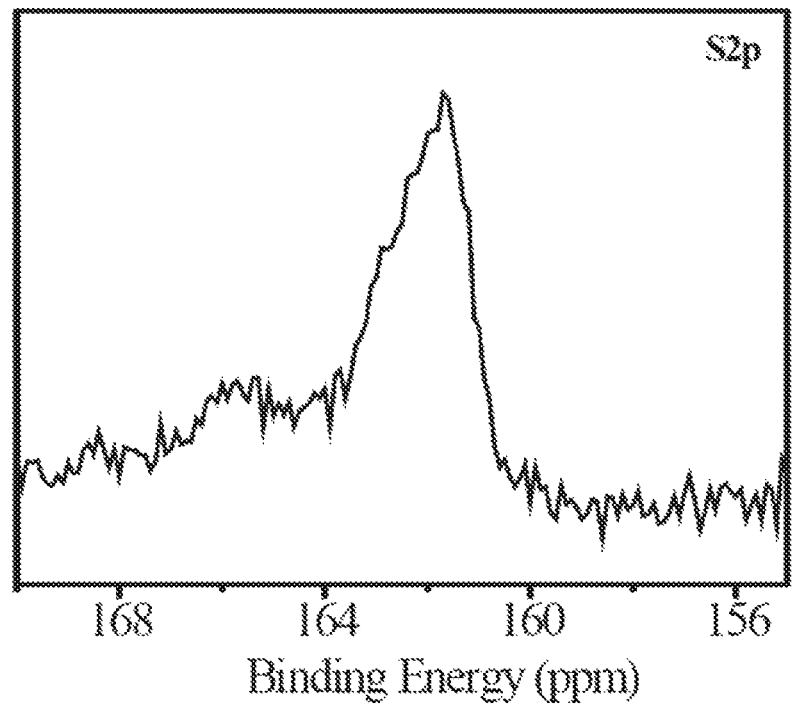
Figure 14A:
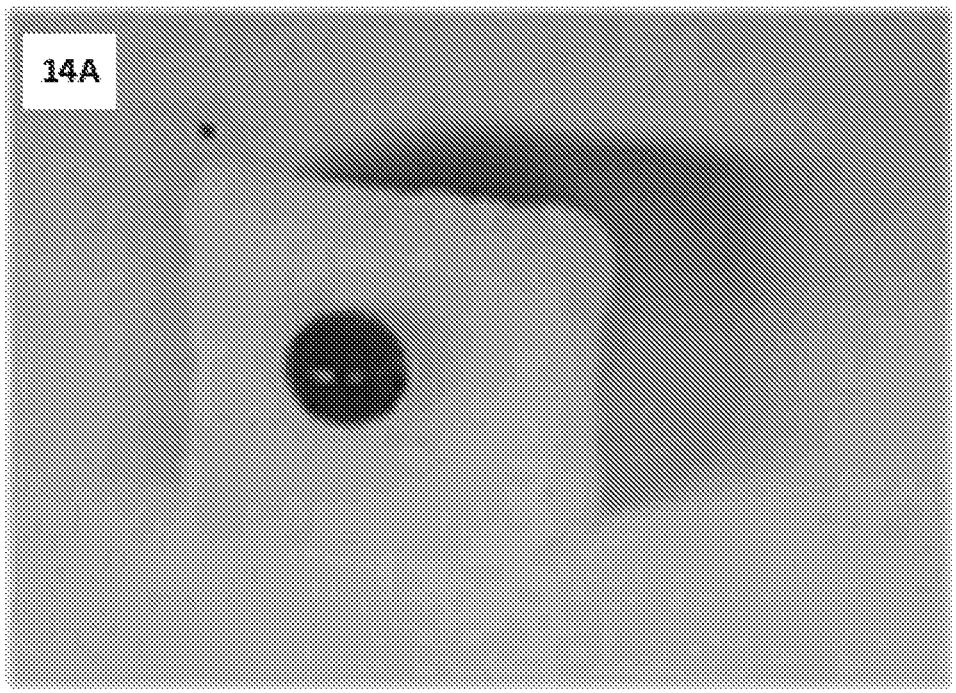
FIGS. 14A-14D show photographs of superwettability tests of melamine foam and COF-VFC@Foam, including photographs of (FIG. 14A) water droplet as quasi-sphere and (FIG. 14B) nitrobenzene trace on the surface of COF-VF@Foam as well as (FIG. 14C) water and (FIG. 14D) nitrobenzene droplets on the surface of melamine foam. Water and nitrobenzene used were dyed by Arsenazo III and brilliant cresyl blue, respectively. These results indicate that COF-VF@Foam cannot absorb water but shows excellent wettability to nitrobenzene. In contrast, pristine melamine foam can quickly absorb water but very slowly for nitrobenzene.
Figure 14B:
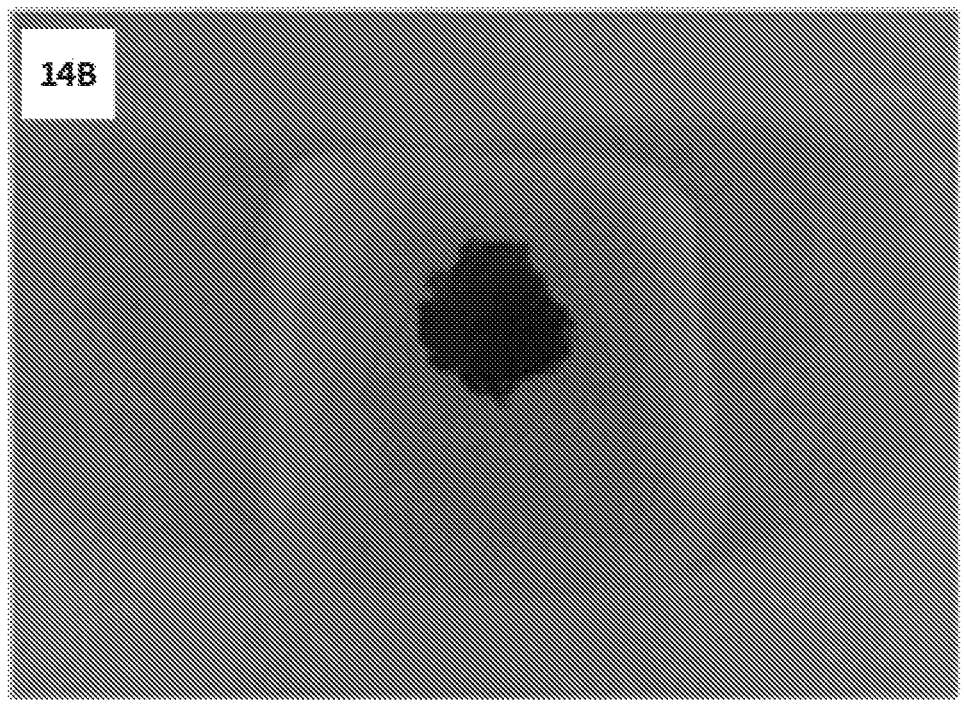
Figure 14C:
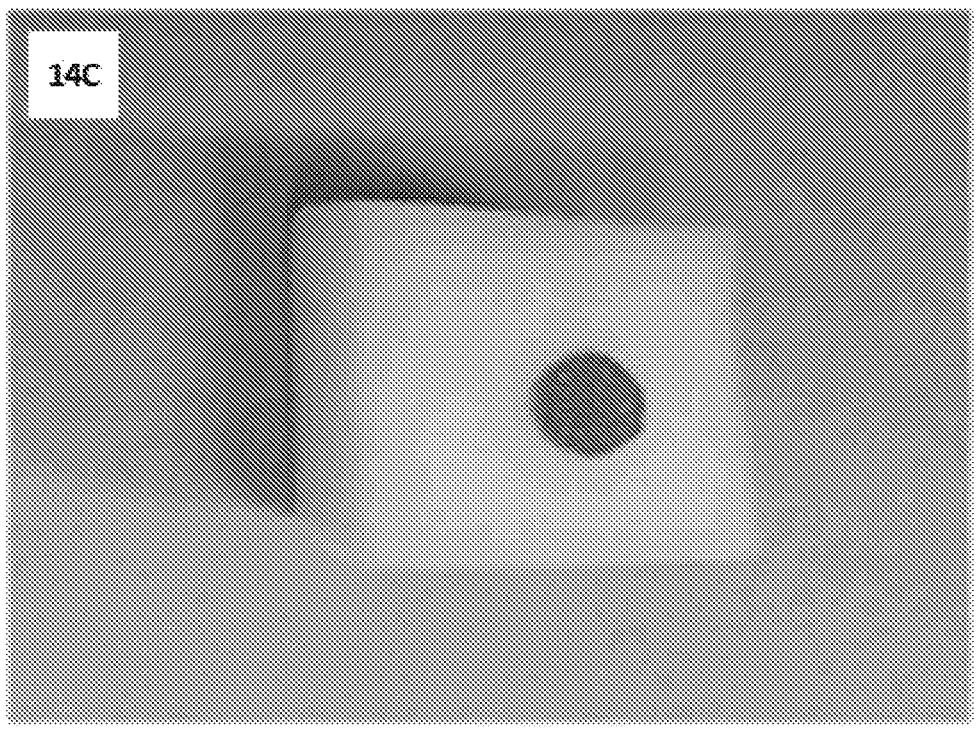
Figure 14D:
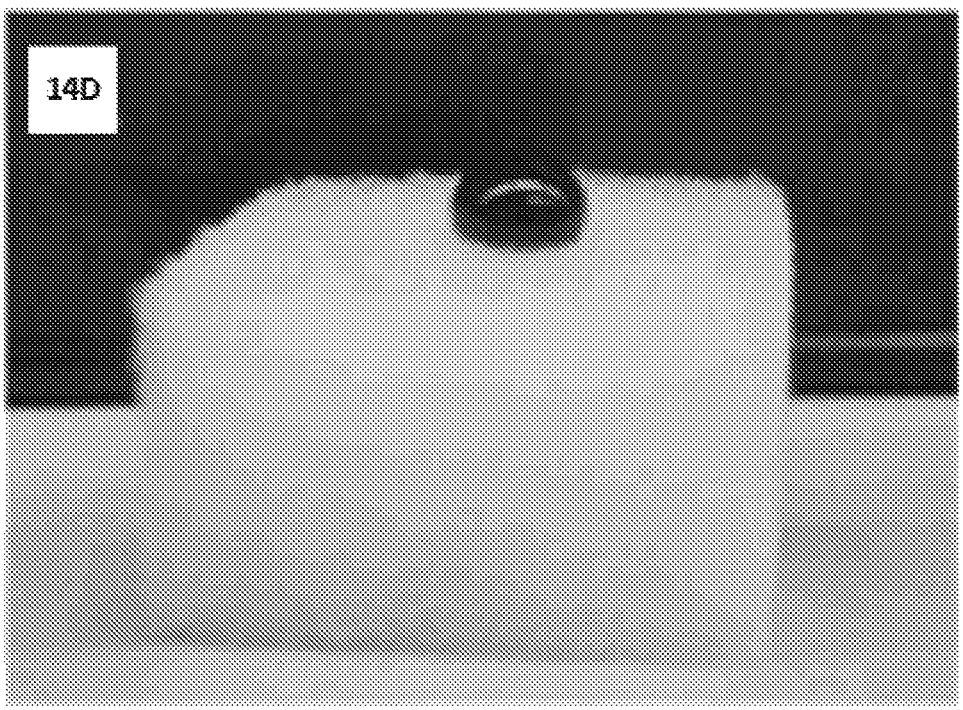

Given the importance of chemical stability for practical applications, the tolerance of COF-VF under a wide range of conditions was tested. Notably, after one week of treatment in 12M HCl and 14 M NaOH at room temperature, as well as boiling water, COF-VF still displayed high crystallinity. In contrast, COF-V cannot survive in 2 M HCl even after suspension for only 24 h (FIGS. 9A-9B). The results indicate that hydrophobic modifications to the COF material can appreciably safeguard the crystallinity. We attribute the observed ultrastability of COF-VF towards acid/base to the extreme water repellent properties of superhydrophobic surfaces, which serve as chemical shields to prevent the permeation of acidic/basic aqueous solutions.

By embracing the features of superhydrophobicity and superoleophilicity together with high porosity and chemical stability, COF-VF could be beneficial in mitigating environmental problems caused by the release of harmful organic compounds. However, COF-VF was synthesized as microcrystalline powders and therefore its applications in real-world separation may be affected by their poor processability and handling.[53] In addition, the limited pore Volume of the COF material restricts the adsorption capacities. In this context, we were motivated to incorporate superhydrophobic COF coatings onto other substrates to add applicability.

Figure 21:
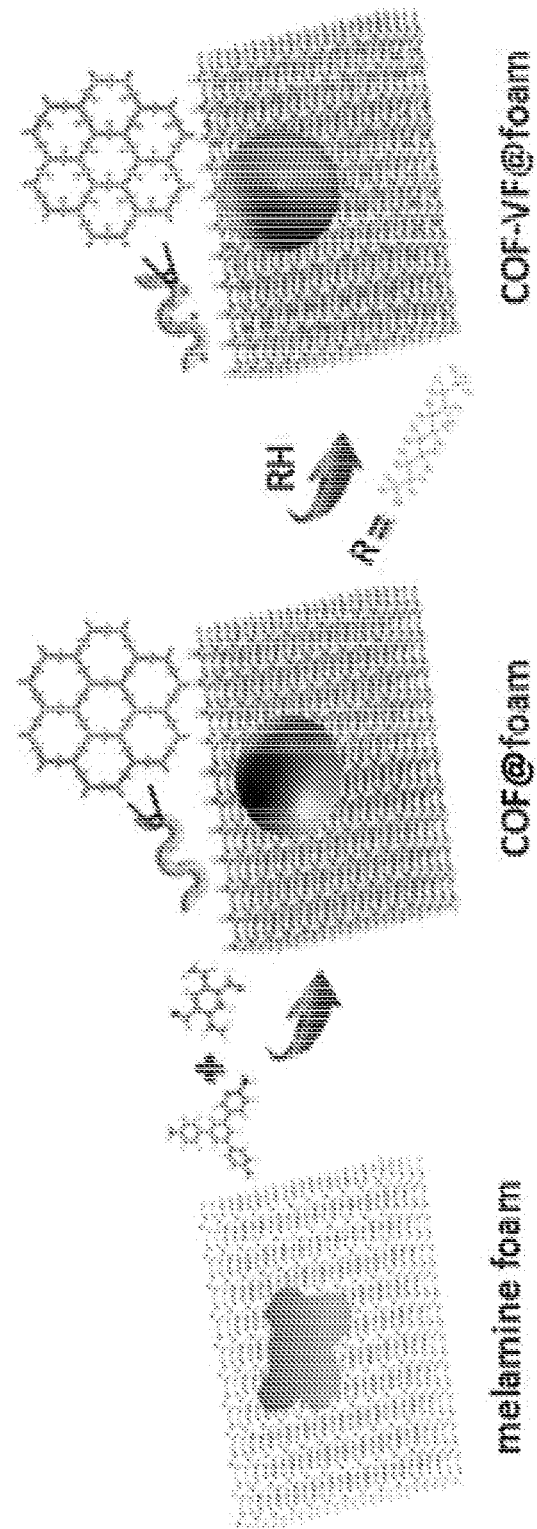
FIG. 21 is a schematic illustration of the preparation of superhydrophobic COF-VF coated melamine foam (COF-VF@foam).

Of the various supports, melamine foams have several appealing features on account of their high chemical and mechanical stability, large void fractions, and unique structure which offers binding affinity for the growth and anchoring of COF microcrystals by π-π interaction and hydrogen bonding. To increase the interaction between the melamine foam and the COF to realize the homogeneous distribution of the COF throughout the foam, a bottom-up synthetic pathway was employed for COF immobilization on the foam for the potential application in process-intensive systems. Monolithic melamine foam was submerged in a solution of the monomers and catalyst (acetic acid) for COF synthesis. Upon being heated at 100° C. for 3 days and then treated with 1H,1H,2H,2H-perfluorodecanethiol, a homogenous color occurred on the foam from white to light yellow, suggesting the monolithic foam was coated and interpenetrated by the COF (FIG. 21).

From the SEM images of the bare and COF-coated melamine foams (FIGS. 10A-10B and FIGS. 11A-11D) it was observed that the microstructure of the foam remains unchanged, while upon further magnification, a distinctive difference in the surface morphology was observed. The smooth melamine framework was encased by the COF, which resulted in a surface roughness as shown in FIGS. 11A-11D. Furthermore, the presence of strong signals associated with the C—F stretching vibration, as well as S and F species in the FT-IR and XPS spectra of COF-VF@foam, respectively, confirms the incorporation of COF-VF onto the melamine foam (FIG. 12 and FIGS. 13A-13C).

Figure 22A:
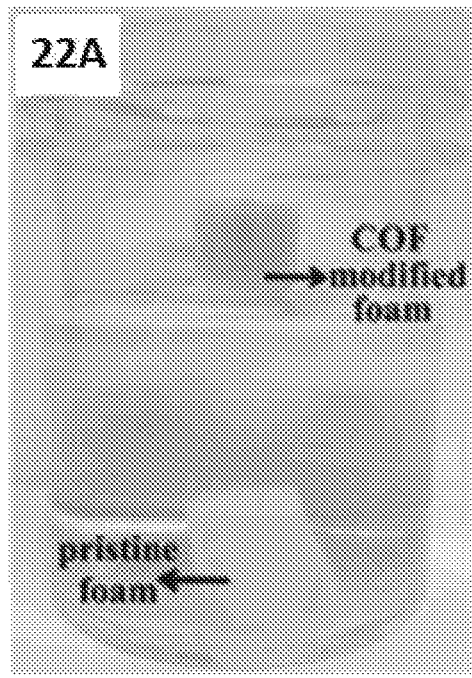
Figure 22B:
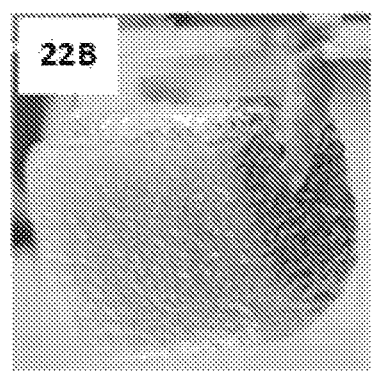
Figure 22C:
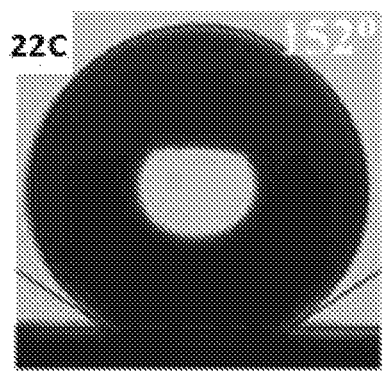

More importantly, the coating of the COF onto the surface of the skeletons turns the foam from hydrophilic to hydrophobic. FIG. 22A depicts a photograph of COF-VF@foam floating atop a water bath while the pristine melamine foam sank to the bottom. When immersing COF-VF@foam in water by applying external force, an interface formed between the entrapped air residing along the surface of the foam and the surrounding water, giving rise to mirror-like surface on COF-VF@foam; this phenomenon is due to the Cassie-Baxter nonwetting behavior (FIG. 22B). After the external force was released, COF-VF@foam immediately floated to the surface of the water without absorption of any of the surrounding water, indicating excellent water repellency. The hydrophobicity of COF-VF@foam was characterized by water contact angle measurements. As displayed in FIG. 22C, the water contact angle of the COF-VF@foam is as high as 152°, confirming the superhydrophobic characteristics of the functionalized foam. To examine the wetting behavior of oil on COF-VF@foam, a nitrobenzene droplet (10 μL) contacted the membrane surface, spread out quickly, and a nearly zero contact angle was reached (FIGS. 14A-14D). These results indicate that COF-VF@foam also exhibits superhydrophobic and superoleophilic properties. Notably, unlike many previous superhydrophobic foams in which the hydrophobic coatings are physically attached onto the external surface of the foam and easily detached, the COF powders are wrapped throughout the skeletons, which remains unaffected by the squeezing process.

Figure 15:
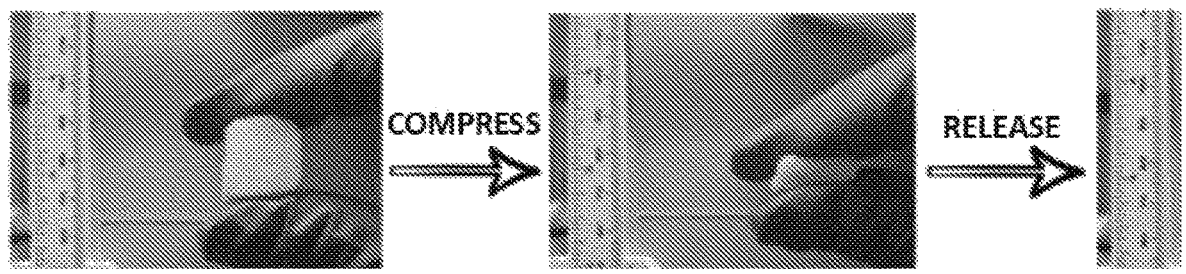
FIG. 15 shows elasticity tests of COF-VF@Foam (left), under force (center), and after releasing the force (right).
Figure 22D:
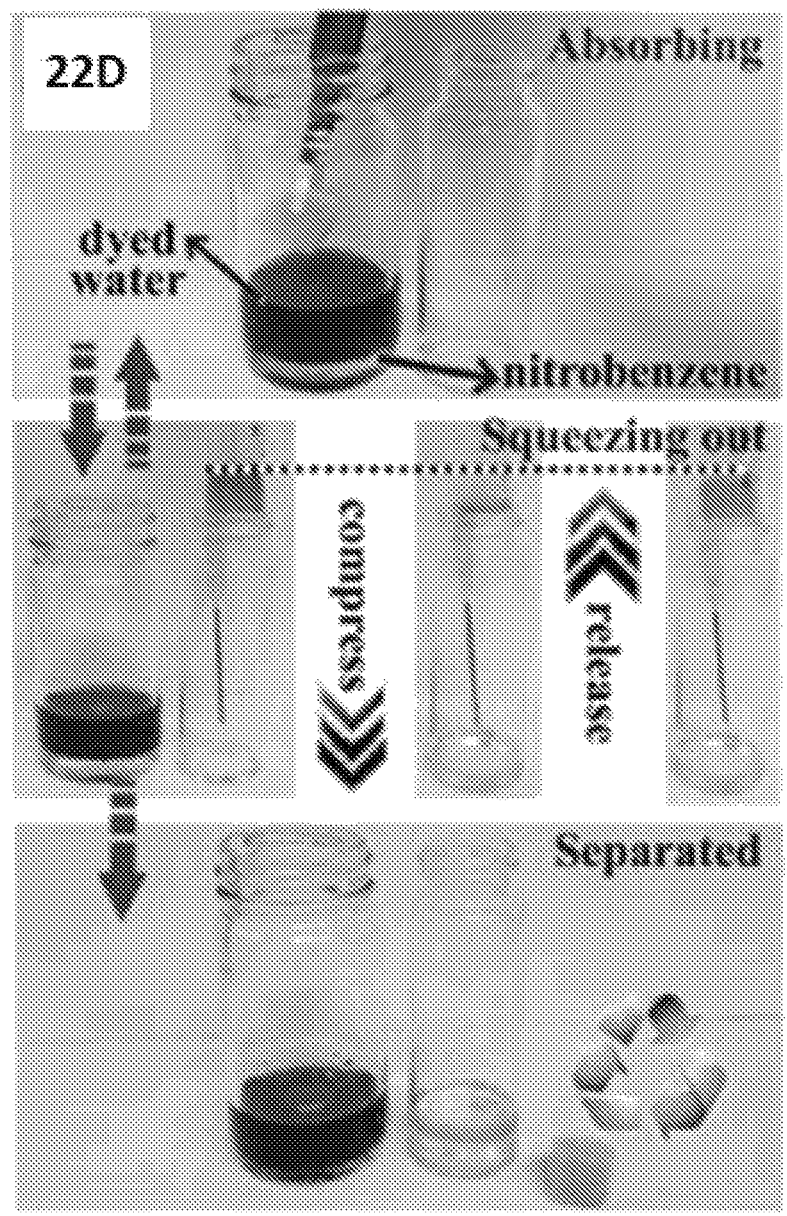
Figure 22E:
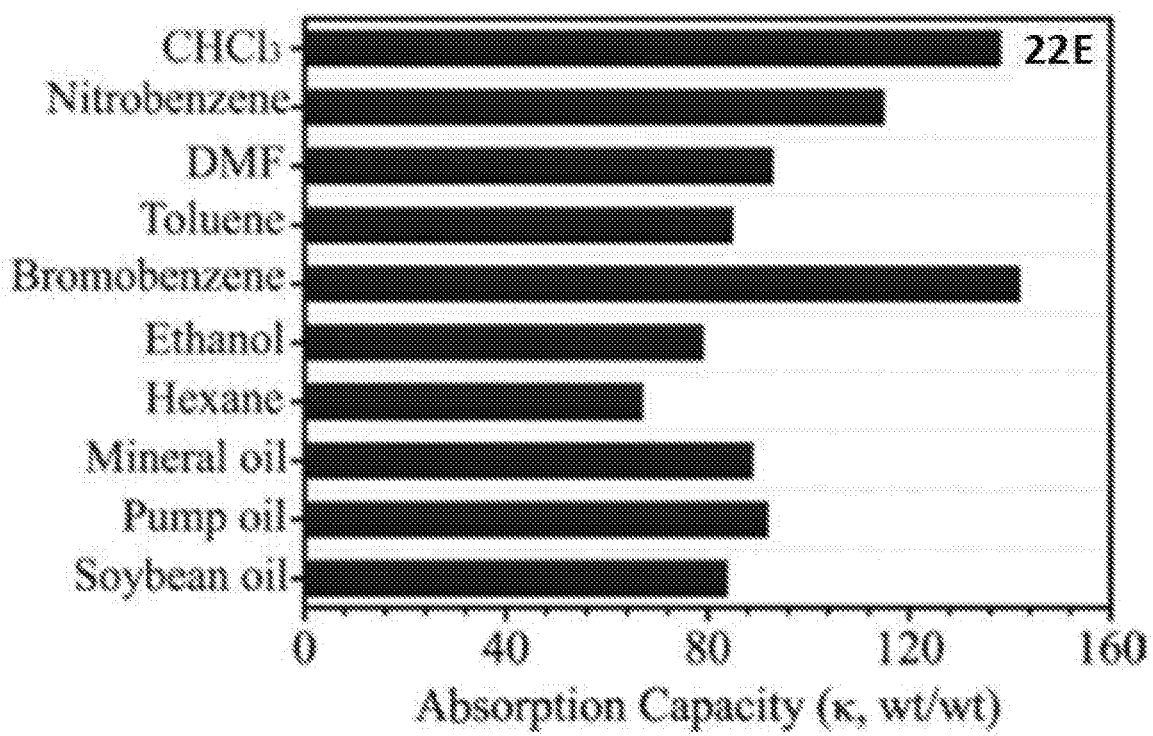
Figure 22F:
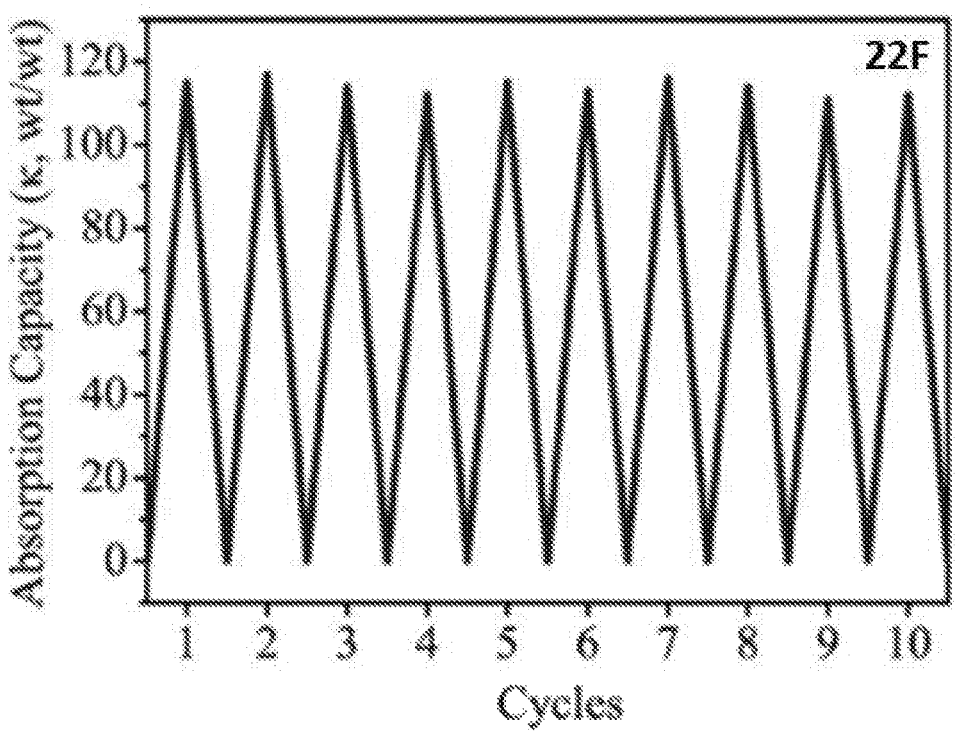

The mechanical stability of the melamine foams was retained during the coating process, with COF-VF@foam subjected to compression and distortion, displaying elastomer characteristics (FIG. 15). The combination of flexibility and superhydrophobbicity and superoleophilicity allow COF-VF@foam to be used directly as compressible adsorbents for simple removable organic pollutants. We therefore investigated its potential to clean up oil spills. Given the challenge to clean up underwater oil, nitrobenzene and 0.25 wt % Arsenazo III aqueous solution were poured into a vial to clearly distinguish the nitrobenzene phase from the water. When COF-VF@foam was inserted into the vial, nitrobenzene below the water was efficiently removed, while pristine melamine foam only absorbed the aqueous solution. Importantly. The capture oil was readily removed by simple squeezing of the foam and the recovered COF-VF@foam was reused without any measurable loss in performance, thus suggesting that COF-VF@foam is a promising candidate as a "suction skimmer" in marine oil-spill recovery (FIG. 22D). To investigate the maximum sorption capacity, sorption tests were performed in organic solvents and oils in the absence of water. The oil absorption capacity of COF-VF@foam was calculated by the following equation; absorption capacity (κ)=(mCOF-VF@foam before and after oil absorption, respectively, and the absorption capacity of the tested solvents is represented in FIG. 22E. Various organic solvents and oils with different polarities, densities, and viscosities were tested. COF-VF@foam exhibited remarkable sorption capacities, from 67 to 142 times its own weight, placing it within striking distance of the all-time oil uptake record (Table 3). COF-VF@foam increased as a function of the solvent density as the pore volume for bulk solvent storage was mainly provided by the micrometer-sized pores of the melamine foam. More interestingly, COF-VF@foam also showed excellent recyclability with sorption capacity retention after 10 cycles of sorption-squeezing of more than 93% for multiple organic solvents and oils, thus validating its great potential in water remediation (FIG. 22F).

TABLE 3

Absorption capacities of various materials for organic solvents and oils.

| Material | Weight gain (wt/wt) |
|---|---|
| ZIF-8/CN foam [55] | 0.36-0.58 |
| Spongy graphene [56] | 20-86 |
| SMF-2D [57] | 50-145 |
| MTMS-DMDMS marshmallow-like gel [58] | 6.2-16 |
| PDMS-coated CNF-0.8-18 [59] | 40-115 |
| PDVB [60] | 8-15 |
| Graphene-coated sponge [61] | 54-165 |
| HCMP-1 [62] | 7-10 |
| USTC-6@GO@sponge [63] | 12-43 |

Figure 16A:
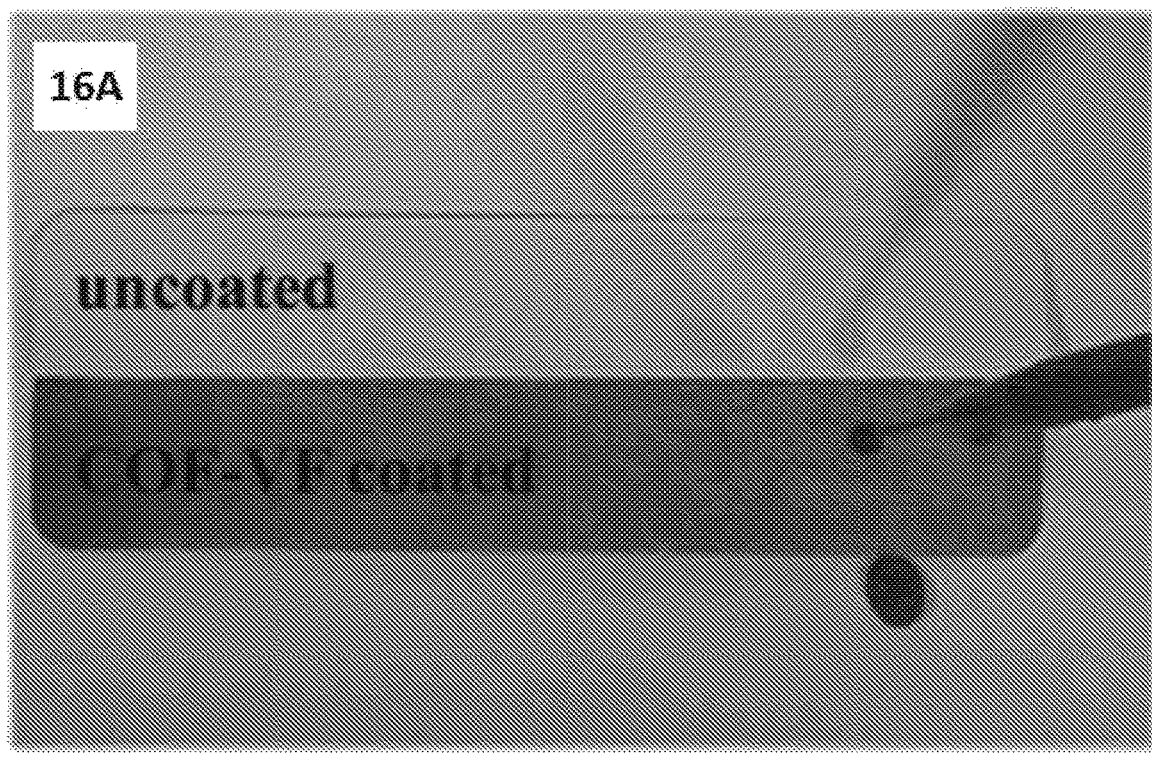
FIGS. 16A-16B are photographs of water droplets on adhesive tapecoated with COF-VF (FIG. 16A) and uncoated surface (FIG. 16B). The droplets completely roll off the COF-VF coated surface without wetting or contaminating the surface, while the droplets are absorbed on the uncoated surface.
Figure 16B:
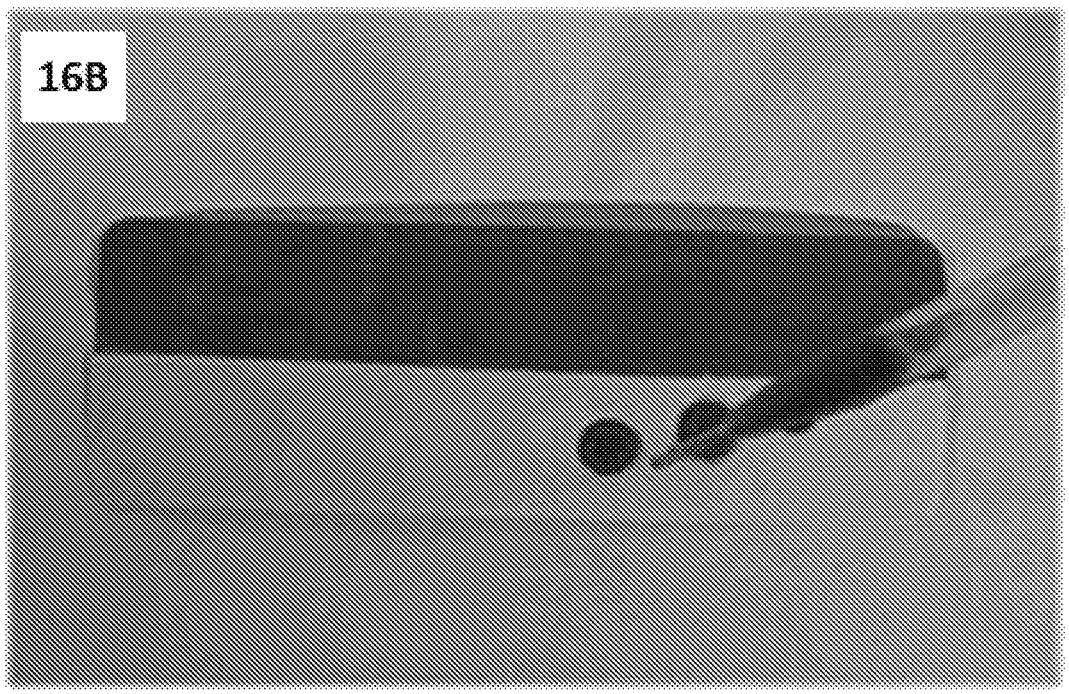

Currently, the creation of superhydrophobic surfaces has stimulated great interest for both fundamental research and practical applications. Given the bulk superhydrophobicity of COF-VF powders, it should be useful in conferring superhydrophobicity to an arbitrary surface to which it is applied. To test this concept, the COF-VF powder was sprayed onto adhesive tape and the resultant surface was seemingly impervious to water and concentrated aqueous acid or base. After application the droplets completely roll off the surface without wetting or contaminating the surface (FIGS. 16A-16B). It is worth pointing out, our superhydrophobic layers encompass the entire thickness and they are able to display significant durability. When the top layer is damaged, the underlying structure becomes exposed and the surface remained superhydrophobic. This improves upon other methods developed for the fabrication of superhydrophobic surfaces based on the generation of roughness, which are easily destroyed when the surface is scratched or wiped. In addition to sharing the attributes of general superhydrophobic surfaces, such as self-cleaning and waterproof, the surfaces created by the COFs are expected to possess other unique functions due to the intrinsic properties of COFs, which hold great promise in applications such as wearable microelectronic devices. For example, distinguishing from many other nonporous coatings, which provide a non-breathable layer, the pores of COFs are permeable to air, thus facilitating the release of generated heat by electronic devices as well as aiding in the comfort of functional garments.

Figure 23A:
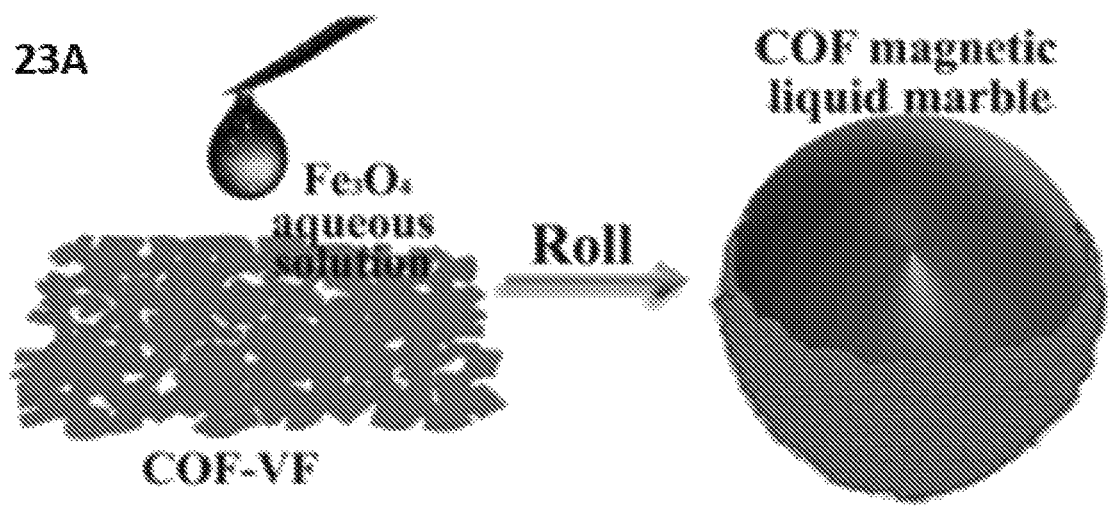
FIG. 23A is a schematic illustration of the COF magnetic liquid marbles preparation.

Apart from conferring the solid substrates with superhydrophobicity, it is also applicable to aqueous solutions to form liquid marbles, which are of potential benefit in microfluidic applications, and also permit the study of a drop in non-wetting situations. In particular, magnetic liquid marbles have recently attracted attention due to their magnetic responsive ability. To demonstrate this concept, we encapsulated an aqueous solution of Fe3O4 nanoparticles into COF powders. As schematically shown in FIG. 23A, the magnetic liquid marbles were readily obtained by rolling water droplets on a pile of superhydrophobic COF powders. As the water droplet is rolled over, the COF powders were spontaneously self-organized to encapsulate the water droplet and render the droplet nonwetting to the substrate, behaving like a soft solid.

Figure 23B:
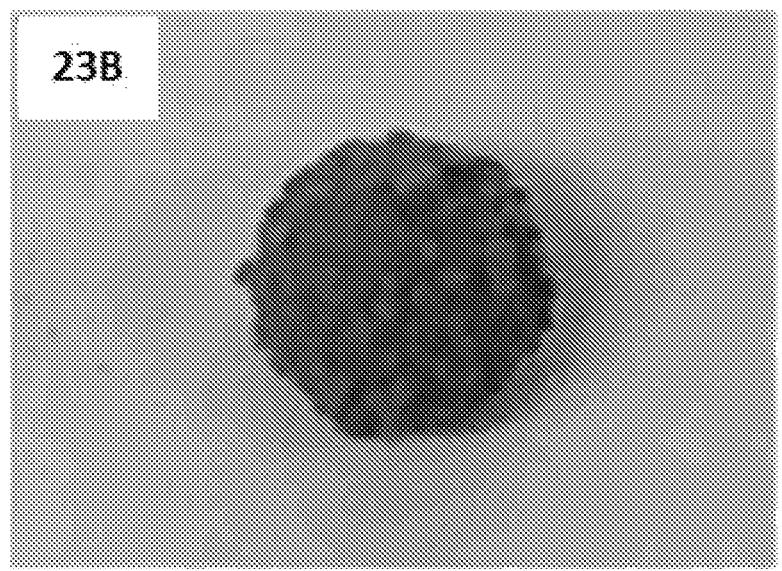
FIG. 23B is a photograph of a COF magnetic liquid marble made by 0.1 mL Fe$_3$O$_4$ aqueous solution placed on a glass plate.
Figure 23C:
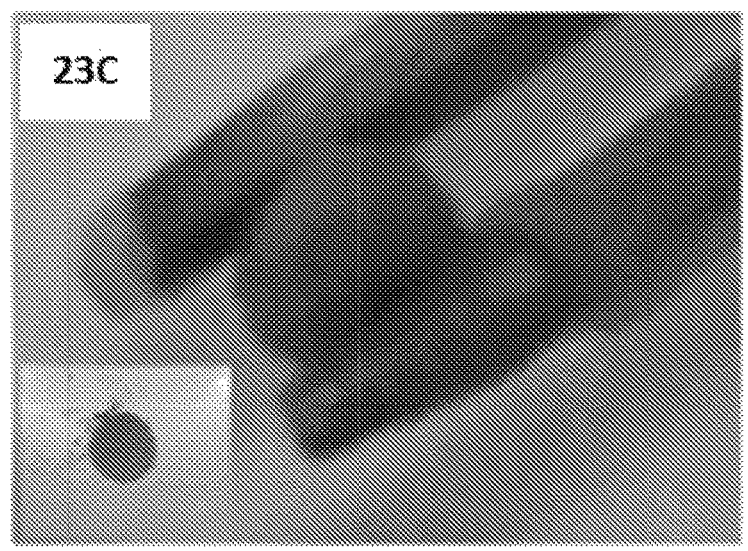
FIG. 23C is a photograph of a COF magnetic liquid marble picked up by a pair of tweezers and then transferred onto a water surface in a Petri dish (inset).
Figure 23D:
FIG. 23D is a series of photographs of the magnetic actuation of a liquid marble with movement from right to left over an upslope.
Figure 23E:
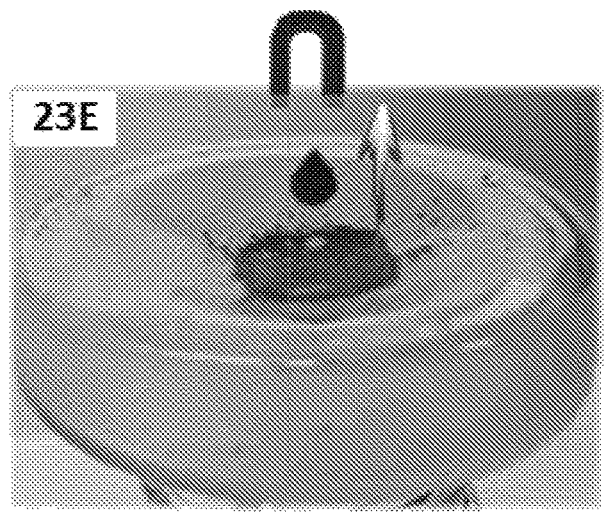
FIG. 23E is a photograph of the magnetic actuation of a liquid marble with movement up and down.
Figures 24A, 24B:
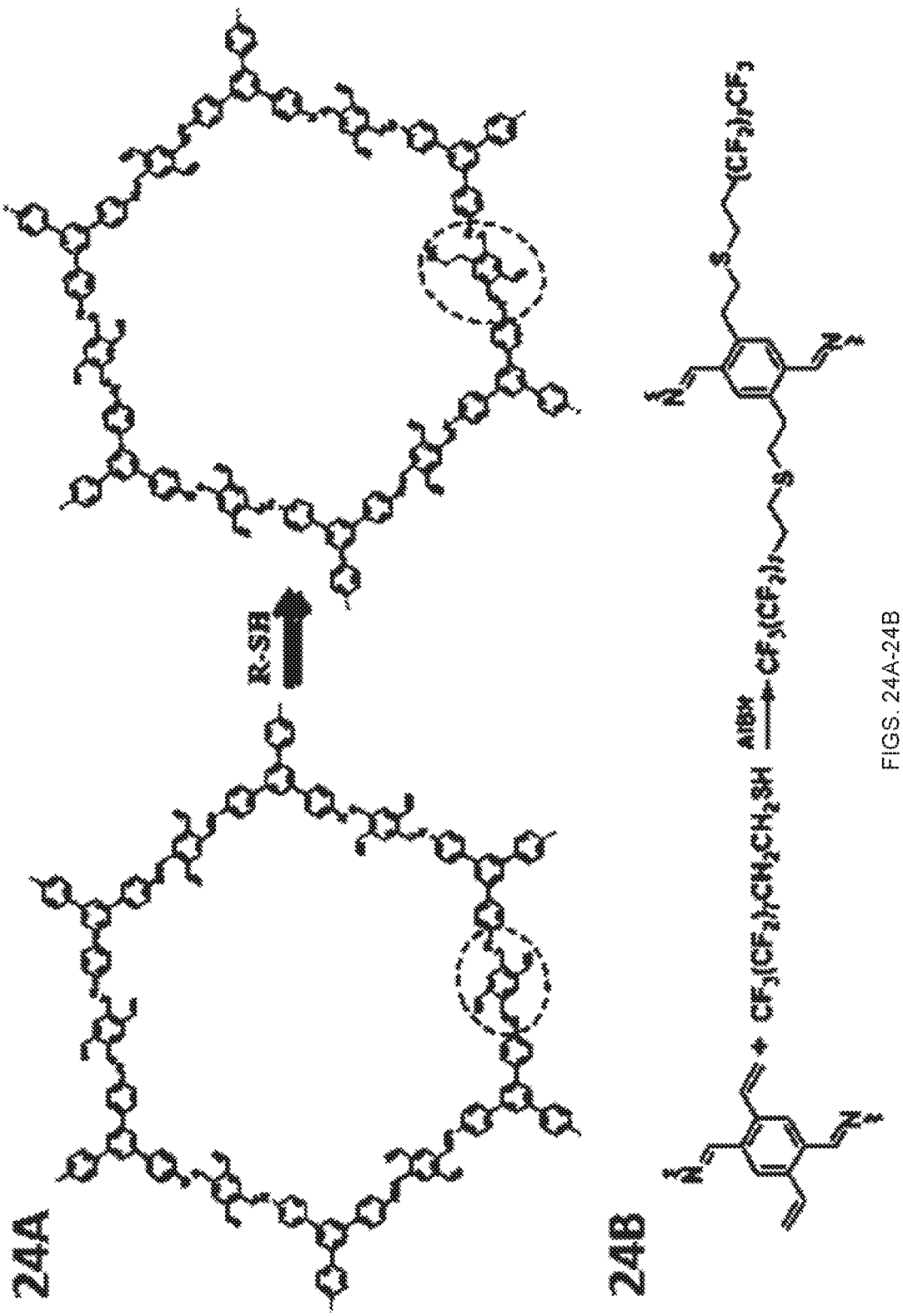
FIGS. 24A-24B show (FIG. 24A) a schematic illustration of post-synthetic modification by reacting 1H,1H,2H,2H-perfluorodecanethiol with the vinyl groups in COF-V, and (FIG. 24B) the detailed reaction scheme between 1H,1H,2H,2H-perfluorodecanethiol and vinyl groups.
Figures 25A, 25B:
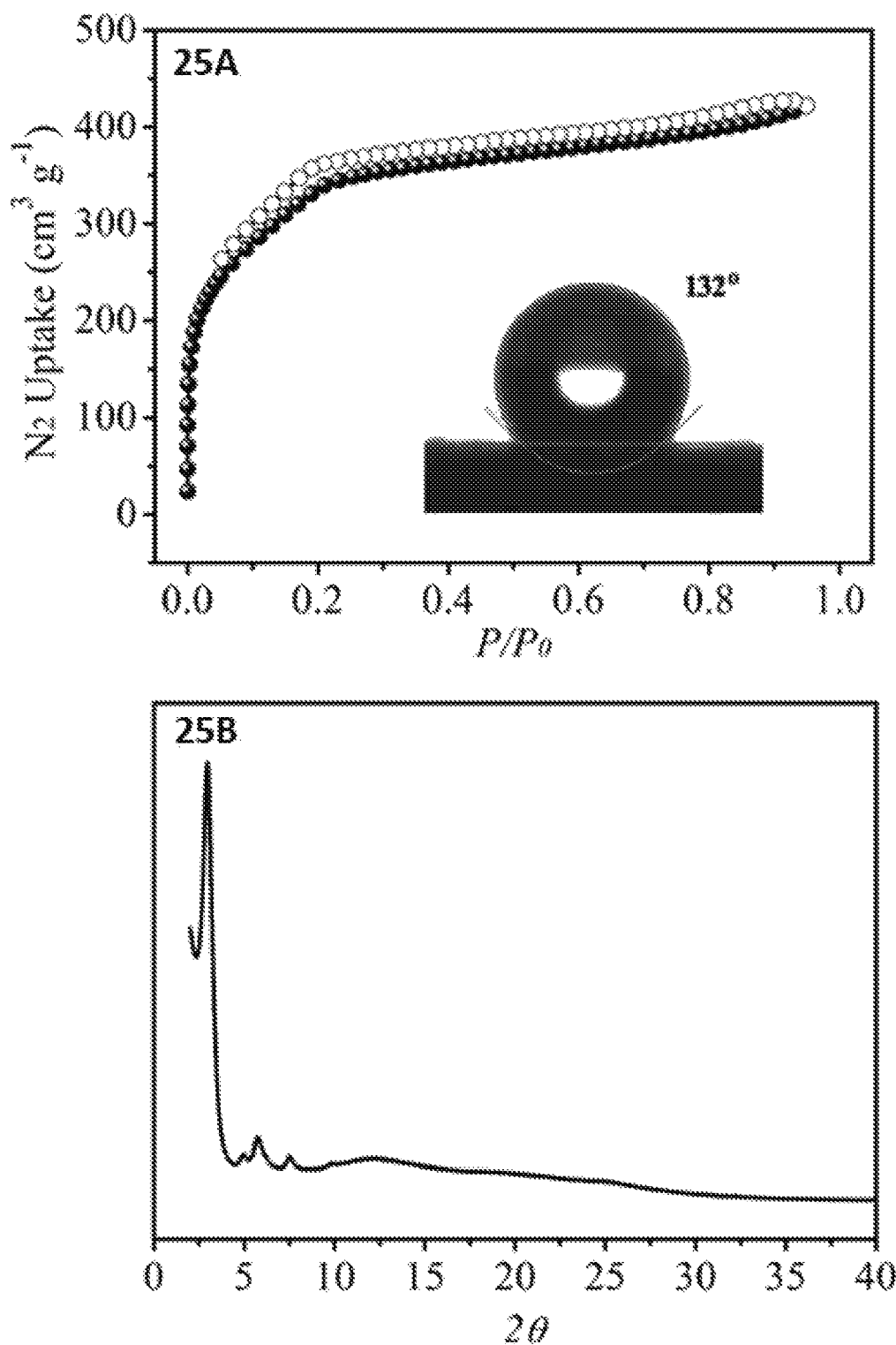
Figure 26A:
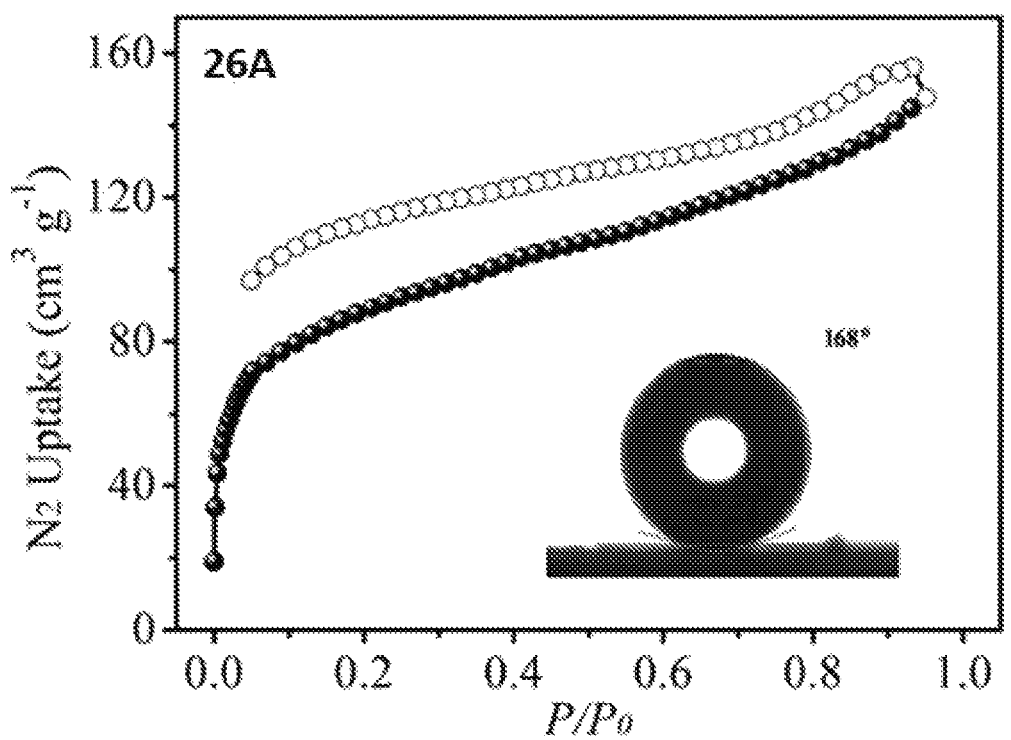
FIGS. 26A-26B show characterizations of COF-V reacted with 1H,1H,2H,2H-perfluorodecanethiol with a F grafting amount of 14.2 wt. % in the resultant sample.
Figure 26B:
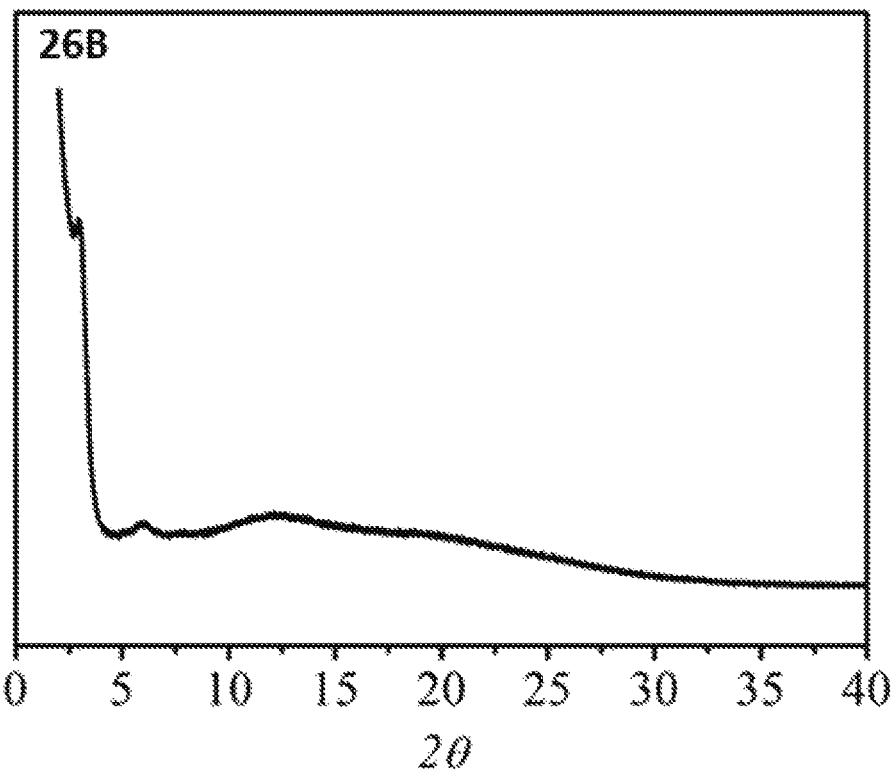
Figure 27A:
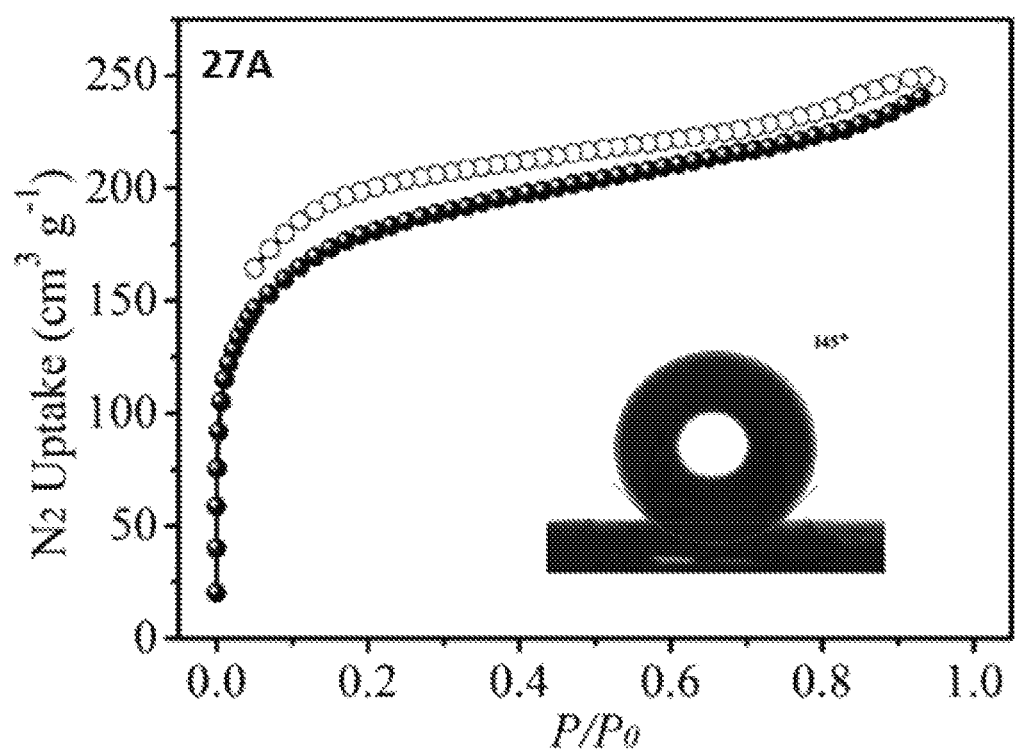
FIGS. 27A-27B show characterizations of COF-V reacted with 2,2,2-trifluoroethanethiol with a F grafting amount of 5.6 wt. %.
Figure 27B:
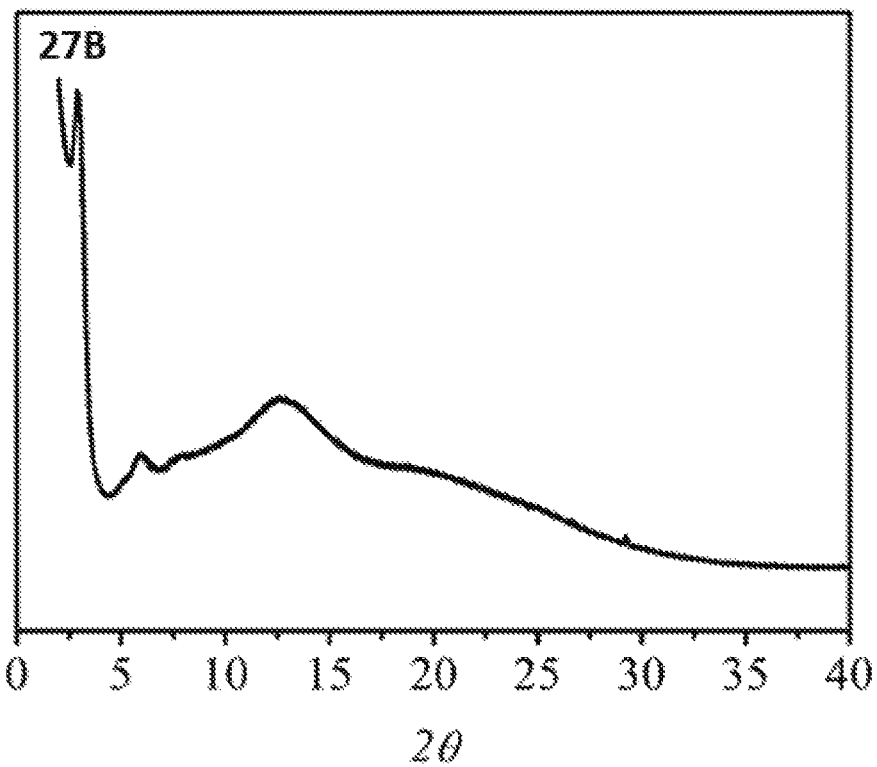
Figures 28A, 28B, 28C, 28D, 28E, 28F:
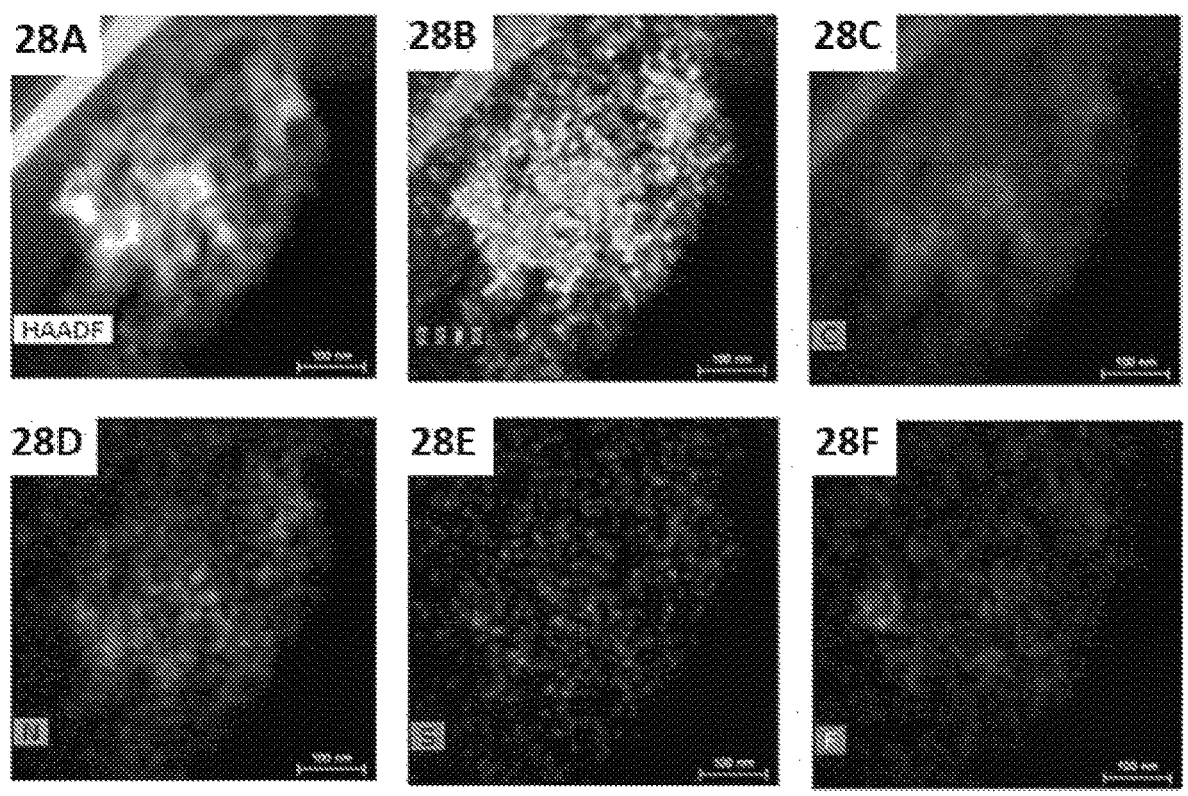
FIGS. 28A-28F show HADDF-STEM and corresponding element mapping of COF-VF.

The spontaneous attachment of the nanoparticles at the liquid/air interface can be understood by the minimization of the free energy of the surface. FIG. 23B shows a typical digital photograph of a liquid marble prepared from 0.1 mL water (containing 2 wt % $Fe_3O_4$), which could roll freely on the surface of a glass plate. The mechanical robustness of the resultant magnetic liquid marbles was demonstrated by impact deformation and rebound of the marbles, which is a unique benefit for applications in microfluidic devices. The excellent stability of the liquid marble is further supported by its capability to be handled with a pair of tweezers without breaking and the liquid marble remained intact after being transferred onto a water surface in a Petri dish (FIG. 23C). Driven by a magnetic bar, the direction of the liquid marble movement changed in response to the motion of the external magnet. The liquid marble can be transported not only on flat surfaces but also on upslope surfaces and jump up and down in curve, as illustrated in FIGS. 23D-23E, which will facilitate the generation of topologically complex microfluidic systems. Given the inherent porosity of COF-VF, the superhydrophobic shell of a liquid marble allows gas transport, but prevents contact of its liquid core with outside surfaces. A foreseeable application of such liquid marbles can therefore be used to sense gases or emit gases simultaneously after being loaded with different indicators. All of these unique features are very promising in the development of magnetically actuated channel-free microfluidic systems and smart microreactors.

In summary, we have determined that pore surface modification of COFs serves as an excellent approach to improve applicability of these materials. This study demonstrated the successful impartment of a COF material with superhydrophobicity and its potential applications by integrating it with other substrates such as melamine foam and magnetic liquids. This proof-of-concept study is an important first step toward exploiting new capabilities for COF materials by combining them with superwettability. Fundamentally, it expands the superwettability control space that can be carried out within COFs, as an emerging class of porous crystalline materials, not just limited to 2D surfaces. This work highlights the opportunity of designing smart materials by taking advantage of the ability to synergistically integrate multiple functionalities into COFs. Considering the tunable synthesis of COFs and the modular nature of surface properties in conjunction with the compatibility of the resultant COF materials to integrate with a variety of substrates, our work therefore opens a new avenue for the task-specific application of COFs.

References for Example 1

[1] A. G. Slater, A. I. Cooper, Science 2015, 348, aaa8075.
[2] S. Das, P. Heasman, T. Ben, S. Qiu, Chem. Rev. 2017, 117, 1515-1563.
[3] A. P. Côté, A. I. Benin, N. W. Ockwig, M. O'Keeffe, A. J. Matzger, O. M. Yaghi, Science 2005, 310, 1166-1170.
[4] X. Feng, X. Ding, D. Jiang, Chem. Soc. Rev. 2012, 41, 6010-6022.
[5] S.-Y. Ding, W. Wang, Chem. Soc. Rev. 2013, 42, 548-568.
[6] L. Ascherl, T. Sick, J. T. Margraf, S. H. Lapidus, M. Calik, C. Hettstedt, K. Karaghiosoff, M. Döblinger, T. Clark, K. W. Chapman, F. Auras, T. Bein, Nat. Chem. 2016, 8, 310-316.
[7] S. Kandambeth, A. Mallick, B. Lukose, M. V. Mane, T. Heine, R. Banerjee, J. Am. Chem. Soc. 2012, 134, 19524-19527.
[8] Z.-F. Pang, S.-Q. Xu, T.-Y. Zhou, R.-R. Liang, T.-G. Zhan, X. Zhao, J. Am. Chem. Soc. 2016, 138, 4710-4713.
[9] L. M. Lanni, R. W. Tilford, M. Bharathy, J. J. Lavigne, J. Am. Chem. Soc. 2011, 133, 13975-13983.
[10] D. N. Bunck, W. R. Dichtel, Angew. Chem. Int. Ed. 2012, 1885-1889.
[11] J. Jiang, Y. Zhao, O. M. Yaghi, J. Am. Chem. Soc. 2016, 138, 3255-3265.
[12] C. S. Diercks, O. M. Yaghi, Science 2017, 355, eaal1585.
[13] H. Xu, J. Gao, D. Jiang, Nat. Chem. 2015, 7, 905-912.
[14] S.-Y. Ding, J. Gao, Q. Wang, Y. Zhang, W.-G. Song, C.-Y. Su, W. Wang, J. Am. Chem. Soc. 2011, 133, 19816-19822.
[15] Q. Fang, S. Gu, J. Zheng, Z. Zhuang, S. Qiu, Y. Yan, Angew. Chem. Int. Ed. 2014, 53, 2878-2882.
[16] V. S. Vyas, F. Haase, L. Stegbauer, G. Savasci, F. Podjaski, C. Ochsenfeld, B. V. Lotsch, Nat. Commun. 2015, 6, 8508.
[17] Q. Sun, B. Aguila, J. A. Perman, N. Nguyen, S. Ma, J. Am. Chem. Soc. 2016, 138, 15790-15796.
[18] X. Wang, X. Han, J. Zhang, X. Wu, Y. Liu, Y. Cui, J. Am. Chem. Soc. 2016, 138, 12332-12335.
[19] G. H. V. Bertrand, V. K. Michaelis, T.-C. Ong, R. G. Griffin, M. Dincă, Proc. Natl. Acad. Sci. U.S.A. 2013, 110, 4923-4928.
[20] Y. Du, H. Yang, J. M. Whiteley, S. Wan, Y. Jin, S.-H. Lee, W. Zhang, Angew. Chem. Int. Ed. 2016, 55, 1737-1741.
[21] Y. Zeng, R. Zou, Y. Zhao, Adv. Mater. 2016, 28, 2855-2873.
[22] L. A. Baldwin, J. W. Crowe, D. A. Pyles, P. L. McGrier, J. Am. Chem. Soc. 2016, 138, 15134-15137.
[23] Q. Sun, B. Aguila, J. Perman, L. Earl, C. Abney, Y. Cheng, H. Wei, N. Nguyen, L. Wojtas, S. Ma, J. Am. Chem. Soc. 2017, 139, 2786-2793.
[24] Q. Fang, J. Wang, S. Gu, R. B. Kaspar, Z. Zhuang, J. Zheng, H. Guo, S. Qiu, Y. Yan, J. Am. Chem. Soc. 2015, 137, 8352-8355.
[25] S. Kandambeth, V. Venkatesh, D. B. Shinde, S. Kumari, A. Halder, S. Verma, R. Banerjee, Nat. Commun. 2015, 6, 6786.
[26] H. Ma, B. Liu, B. Li, L. Zhang, Y.-G. Li, H.-Q. Tan, H.-Y Zang, G. Zhu, J. Am, Chem. Soc. 2016, 138, 5897-5903.
[27] S. Wang, Q. Wang, P. Shat, Y. Han, X. Gao, L. Ma, S. Yuan, X. Ma, J. Zhou, X. Feng, B. Wang, J. Am. Chem. Soc. 2017, 139, 4258-4261.
[28] H.-L. Qian, C.-X. Yang, X.-P. Yan, Nat. Commun. 2016, 7, 12104.
[29] A. Nagai, Z. Guo, X. Feng, S. Jin, X. Chen, X. Ding, D. Jiang, Nat. Commun. 2011, 2, 536.
[30] H.-L. Jiang, D. Feng, T.-F. Liu, J. R. Li, H.-C. Zhou, J. Am. Chem. Soc. 2012, 134, 14690-14693.
[31] B. Su, Y. Tian, L. Jiang, J. Am. Chem. Soc. 2016, 138, 1727-1748.
[32] H. BeHanger, T. Darmanin, E. T. de Givenchy, F. Guittard, Chem. Rev. 2014, 114, 2694-2716.
[33] X.-M. Li, D. Reinhoudt, M. Crego-Calama, Chem. Soc, Rev. 2007, 36, 1350-1368.
[34] C. Zhang, D. A. Mcadams, J. C. Grunlan, Adv. Mater. 2016, 28, 6292-6321.
[35] X. Yao, Y. Song, L. Jiang, 2011, 23, 719-734.
[36] K. Jayaramulu, K. K. R. Datta, C. Rösier, M. Petr, M. Otyepka, R. Zboril, R. A. Fischer, Angew. Chem. Int. Ed. 2016, 55, 1178-1182.
[37] J. Yuan, X. Liu, O. Akbulut, J. Hu, S. L. Suib, J. Kong, F. Stellacci, Nature Nanotech. 2008, 3, 332-336.
[38] Q. Sun, H. He, W.-Y. Gao, B. Aguila, L. Wojtas, Z. Dai, J. Li, Y.-S. Chen, F.-S. Xiao, S. Ma, Nat. Commun. 2016, 7, 13300.
[39] S. Pan, A. K. Kota, J. M. Mabry, A. Tuteja, J. Am. Chem. Soc. 2013, 135, 578-581.
[40] W. Zhang, Y. Hu, J. Ge, H.-L. Jiang, S.-H. Yu, J. Am. Chem. Soc. 2014, 136, 16978-16981.
[41] J. G. Nguyen, S. M. Cohen, J. Am. Chem. Soc. 2010, 132, 4560-4561.
[42] X. Tian, S. Shaw, K. R. Lind, L. Cademartiri, Adv. Mater. 2016, 28, 3677-3682.
[43] Q. Sun, B. Aguila, G. Verma, X. Liu, Z. Dai, F. Deng, X. Meng, F.-S. Xiao, S. Ma, Chem 2016, 1, 628-639.
[44] G. Huang, Q. Yang, Q. Xu, S.-H. Yu, H.-L. Jiang, Angew. Chem. Int. Ed. 2016, 55, 7379-7383.
[45] D. Mullangi, S. Shalini, S. Nandi, B. Choksi, R. Vaidhyanathan, J. Mater. Chem. A 2017, 5, 8376-8384.
[46] C. Yang, U. Kaipa, Q. Z. Mather, X. Wang, V. Nesterov, A. F. Venero, M. A. Omary, J. Am. Chem. Soc. 2011, 133, 18094-18097.
[47] N. M. Padial, E. Q. Procopio, C. Montoro, E. López, J. E. Oltra, V. Colombo, A. Maspero, N. Masciocchi, S.

Galli, I. Senkovska, S. Kaskel, E. Barea, J. A. R. Navarro, Angew. Chem. Int, Ed. 2013, 52, 8290-8294.

[48] S. Mitra, H. S. Sasmal, T. Kundu, S. Kandambeth, K. Illath, D. D. Diaz, R. Banerjee, J. Am. Chem. Soc. 2017, 139, 4513-4520.

[49] P. A. Levkin, F. Svec, M. J. Fréchet Adv. Funct. Mater, 2009, 19, 1993-1998.

[50] T. Darmanin, F. Guittard, J. Mater. Chem. A 2014, 2, 16319-16359.

[51] G. Hayase, K. Kanamori, G. Hasegawa, A. Maeno, H. Kaji, K. Nakanishi, Angew. Chem. Int. Ed. 2013, 52, 10788-10791.

[52] H. Zhou, H. Wang, H. Mu, Y. Zhao, Z. Xu, T. Lin, Adv. Funct. Mater. 2017, 1604261.

[53] S. Kandambeth, B. P. Biswal, H. D. Chaudhari, K. C. Rout, H. S. Kunjattu, S. Mitra, S. Karak, A. Das, R. Mukherjee, U. K. Kharul, R. Banerjee, Adv. Mater. 2017, 29, 1603945.

[54] Y. Wu, J. Guo, C. Wang, Angew. Chem. Int, Ed, 2016, 55, 6013-6017.

[55] D. Kim, D. W. Kim, O. Buyukcakir, M.-K. Kim, K. Polychronopoulou, A. Coskun, Adv. Funct. Mater. 2017, 1700706.

[56] H. Bi, X. Xie, K. Yin, Y. Zhou, S. Wan, L. He, F. Xu, F. Banhart, L. Sun, R. S. Ruoff, Adv. Funct. Mater, 2012, 22, 4421-4425.

[57] R. Du, X. Cao, Q. Feng, Q. Zhao, P. Li, S. Deng, L. Shi, J. Zhang, Adv. Mater. 2016, 28, 936-942.

[58] G. Hayase, K. Kanamori, M. Fukuchi, H. Kaji, K. Nakanishi, Angew. Chem. Int. Ed. 2013, 52, 1986-1989.

[59] H.-W. Liang, Q.-F. Guan, L.-F. Chen, Z. Zhu, W.-J. Zhang, S.-H. Yu, Angew. Chem. Int. Ed. 2012, 51, 5101-5105.

[60] Y. Zhang, S. Wei, F. Liu, Y. Du, S. Liu, Y. Ji, T. Yokoi, T. Tatsumi, F.-S. Xiao, Nano Today 2009, 4, 135-142.

[61] D. D. Nguyen, N.-H. Tai, S.-B. Lee, W.-S. Kuo, Energy Environ. Sci. 2012, 5, 7908-7912.

[62] A. Li, H.-X. Sun, D.-Z. Tan, W.-J. Fan, S.-H. Wen, X.-J. Qing, G.-X. Li, S.-Y. Li, W.-Q. Deng, Energy Environ. Sci. 2011, 4, 2062-2065.

[63] Z.-R. Jiang, J. Ge, Y.-X. Zhou, Z. U. Wang, D. Chen, S.-H. Yu, L.-H. Jiang, NPG Asia Mater. 2016, 8, e253.

[64] P. Aussillous, D. Quéré, Nature 2001, 411, 924-927.

[65] W. Gao, H. K. Lee, J. Hobley, T. Liu, I. Y. Phang, X. Y. Ling, Angew. Chem. Int. Ed. 2015, 54, 3993-3996.

[66] D. Dupin, S. P. Armes, S. Fujii, J. Am. Chem. Soc. 2009, 131, 5386-5387.

[67] Y. Xue, H. Wang, Y. Zhao, L. Dai, L. Feng, X. Wang, T. Lin, Adv. Mater. 2010, 22, 4814-4818.

[68] D. Wang, L. Zhu, J.-F. Chen, L. Dai, Angew, Chem. Int. Ed. 2016, 55, 10795-10799.

Example 2: Integrating Superwettability within Covalent Organic Frameworks for Functional Coating Experimental Procedures
Materials Commercially available reagents were purchased in high purity and used without purification. Solvents were purified according to standard laboratory methods.

Synthesis of COF-VF

To the mixture of COF-V (100 mg), which was synthesized according to the literature,[23] and a catalytic amount of azobisisobutyronitrile (AIBN), 10 v/v % 1H,1H,2H,2H-perfluorodecanethiol trifluorotoluene solution (10 mL) was introduced. After being stirred at 60° C. for 2 h, the title product was isolated by filtration, washed with acetone, and dried under vacuum at 50° C.

Synthesis of COF-VF@Foam

Figures 42A, 42B:
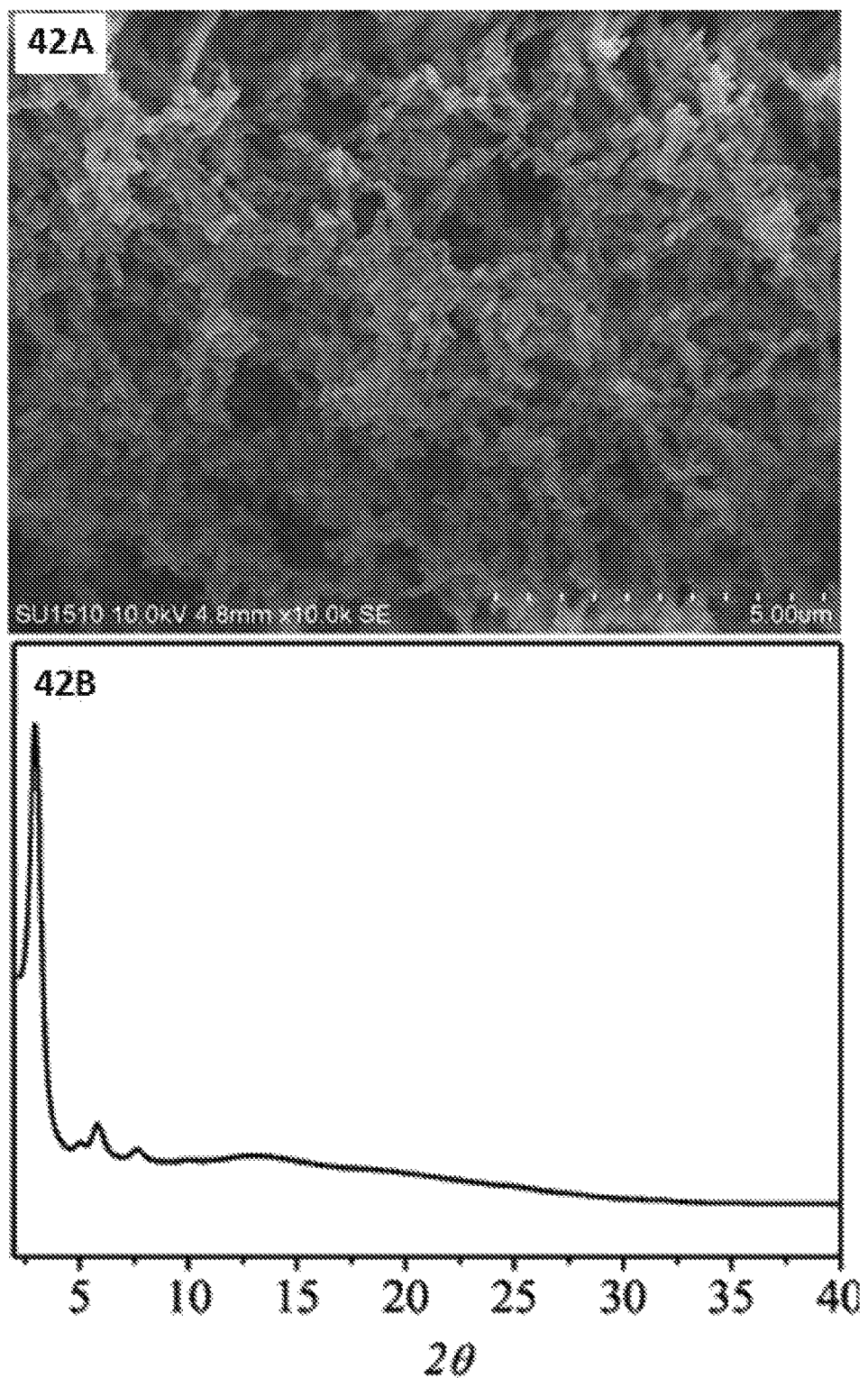
FIGS. 42A-42B shows morphology and crystallinity characterization.
Figure 43:
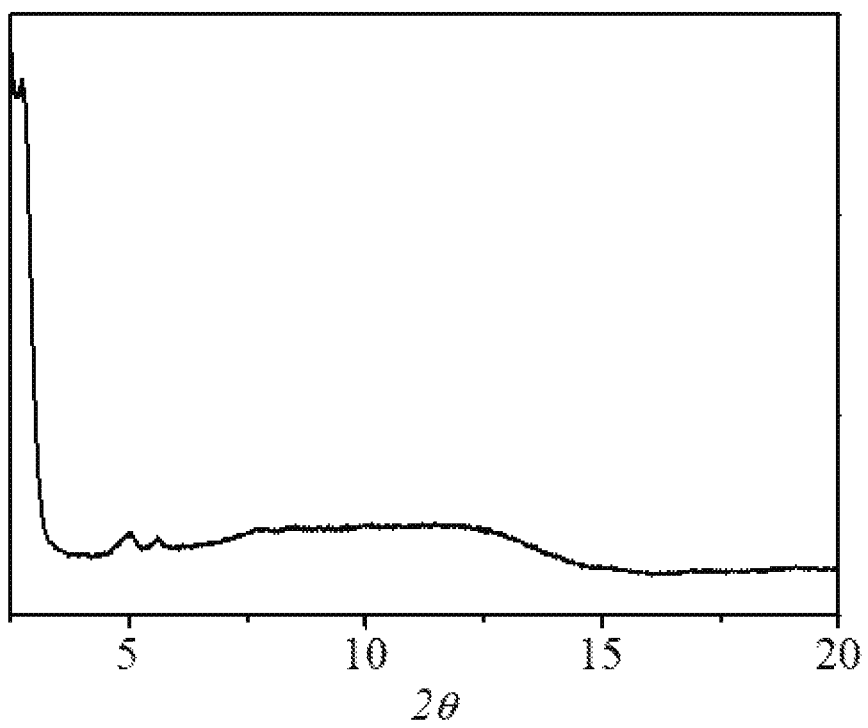
FIG. 43 shows an XRD pattern of finely grinded COF-VF@foam.

Melamine foam (ca. 3 mg) was soaked in a mixture of 1,3,5-tris(4-aminophenyl)-benzene (4 mg) and 2,5-divinyl-terephthaldehyde (3 mg) in anisole (4.75 mL) and phenethanol (0.25 mL) for 24 h. After that, 0.5 mL of 6 M aqueous acetic acid was added and the tube was flash frozen at 77 K, evacuated, and sealed. The reaction mixture was heated at 100° C. for 3 days and the resultant foam was washed thoroughly with acetone and dried under vacuum. The dried foam was then soaked in 10 v/v % 1H,1H,2H, 2H-perfluorodecanethiol trifluorotoluene solution (10 mL) with a catalytic amount of azobisisobutyronitrile (AIBN) and heated at 60° C. for 24 h. The title product was isolated, washed with acetone, and dried under vacuum at 50°, The COF weight percent in the resultant COF-VF@foam is around 10 wt % calculated based on the mass increase after introducing the COF material. Note: To homogeneously integrate COF-V with melamine foam, we modified the COF-V synthesis conditions. Under these conditions, the system is homogeneous before heating, which is essential for the yielded COF-V crystals to uniformly wrap the foam fibers. The SEM image and XRD pattern of COF-V synthesized under the conditions aforementioned in the absence of melamine foam are shown in FIG. 424-42B for comparison. To check the crystallinity of the COF-VF component on COF-VF@foam, XRD of the fine grinded composite was tested, which exhibited obvious diffraction peaks, thus indicting the crystallinity of the COF-VF component in COF-VF@foam (FIG. 43). The relatively weak peaks observed can be reasonably attributed to the fact that COF-VF only takes up a very small fraction of the COF-VF@foam composite.

Characterization

IR spectra were recorded on a Nicolet Impact 410 FTIR spectrometer. ICP-OES was performed on a Perkin-Elmer Elan DRC II Quadrupole. X-ray photoelectron spectroscopy (XPS) spectra were performed on a Thermo ESCALAB 250 with Al Kα irradiation at θ=90° for X-ray sources, and the binding energies were calibrated using the C1s peak at 284.9 eV. $^1$H NMR spectra were recorded on a Bruker Avance-400 (400 MHz) spectrometer. Chemical shifts are expressed in ppm downfield from TMS at δ=0 ppm, and J values are given in Hz. $^{13}$C and $^{19}$F cross-polarization magic-angle spinning (CP-MAS) was recorded on a Varian infinity plus 400 spectrometer equipped with a magic-angle spin probe in a 4-mm $ZrO_2$ rotor. Powder X-ray diffraction (PXRD) data were collected on a Bruker AXS D8 Advance A25 Powder X-ray diffractometer (40 kV, 40 mA) using Cu Kα (λ=1.5406 Å) radiation. Variable temperatures X-ray diffraction patterns were recorded from 298 K to 673 K with a heating rate of 10° min$^{-1}$ under ambient conditions. The gas adsorption isotherms were collected on a surface area analyzer, ASAP 2020. The $N_2$ sorption isotherms were measured at 77 K using a liquid N2 bath. Scanning electron microscopy (SEM) images were collected using a Hitachi SU 1510. Photographs of water and organic compounds on the surface of the samples in the pressed pellet form were measured with SL200KB (USA KNO Industry, Co.), equipped with a charge-coupled device camera. Water adsorption and desorption isotherms were obtained via SMS Instruments DVS Advantage. The balance has a sensitivity of 0.1 mg. These isotherms were measured at 298 K by monitoring the weight change of the sample as a function of relative humidity of water. The relative humidity of water was stepped up from 0 to 98% with an increment of 10% in each step and then was stepped down to 0%. Real-time weight, temperature, and relative humidity were recorded. Toluene adsorption isotherms were measured via Micromeritics 3Flex. These isotherms were collected at 298 K by monitoring the volume change. TGA was carried out on a Q50 thermogravimetric analyzer under $N_2$ atmosphere. High-angle-annular-dark-field (HAADF) scanning, STEM imaging, and energy dispersive X-ray spectroscopy (EDX) mapping were carried out by Titan ChemiSTEM operated at 200 kV.

Results and Discussion

Synthesis of Superhydrophobic COF

To test the feasibility of pore channel engineering for controlling the wettability of COFs, a COF bearing the vinyl functionality synthesized from the condensation between 1,3,5-tris(4-aminophenyl)-benzene and 2,5-divinylterephthalaldehyde, which was developed by our group, was selected for proof of principle due to its excellent chemical stability, large pore size, and abundant high reactivity vinyl groups for potential chemical transformations (FIGS. 19A-19D).[23] Given the low surface free energy of fluorinated compounds,[53] especially for the long chain ones, in conjugation with the facility and controllability of the thiol-ene click reaction,[52] 1H,1H,2H,2H-perfluorodecanethiol was chosen to modify the pore surface of COF-V to manipulate the wettability. Since the enhancement of hydrophobicity, by increasing the grafting degree of fluorinated compounds, is at the expense of both porosity and crystallinity of the material, reaction conditions were screened to achieve the trade-off between hydrophobicity and the retention of intrinsic properties of the COF. Under optimal synthetic conditions, reacting COF-V with a 10 v/v % 1H,1H,2H,2H-perfluorodecanethiol trifluorotoluene solution in the presence of a catalytic amount of azobisisobutyronitrile (AIBN) for 2 h, resulted in the desired material (COF-VF, FIGS. 19A-19D and FIGS. 24A-24B). To understand the effect of modification degree and the type of perfluoroalkyl group on the superhydrophobic property of the resultant materials, detailed structure-property relationships are given in the Supplementary Information (FIGS. 24A-27B).

Structural Characterization

FIGS. 20A-20B show scanning electron microscopy (SEM) images of the COF materials before and after pore surface modification, which reveal that no noticeable morphological changes occur and both of them show a large quantity of uniform nanofibers with diameters of about 80 nm. To examine the change of surface functionalities after chemical modification, Fourier transform infrared spectroscopy (FT-IR), X-ray photoelectron spectroscopy (XPS), high-resolution TEM EDX mapping, and solid-state NMR spectroscopy were performed. The appearance of new peaks at 1241 and 1212 $cm^{-1}$, which were assigned to the C—F stretching vibration[53] together with the presence of the C—F (292.2 eV), as well as elements F (F1s at 689.6 eV) and S (S2p at 163.4 eV) signals in the FT-IR (FIG. 1) and XPS spectra of COF-VF (FIGS. 2A-2F), respectively, indicate the successful incorporation of perfluoroalkyl groups onto COF-V. The EDX mapping via TEM verifies the homogeneously distributed F, N, and S elements throughout COF-VF (FIGS. 28A-28F). To provide additional proof, solid-state NMR analyses were employed. $^{19}F$ MAS NMR spectrum of COF-VF gives clear F signals with the same chemical shifts as those of 1H,1H,2H,2H-perfluorodecanethiol. In addition, the appearance of a noticeable peak at 26.3 ppm attributed to the alkyl carbon species from the reacted vinyl groups confirms the covalent bond formation between vinyl groups on COF-V and 1H,1H,2H,2H-perfluorodecanethiol. However, the relative intensity of the peak ascribed to the vinyl group did not change obviously in comparison with that in COF-V, suggesting that only a small part of the vinyl groups participate in the reaction. To quantify the degree of post-synthetic modification, the content of F species in COF-VF was evaluated by elemental analysis. The results show that the weight percent of F species in COF-VF is 5.2 wt. %, which means about 4% of the vinyl groups are involved in the thiol-ene reaction.

Figure 29:
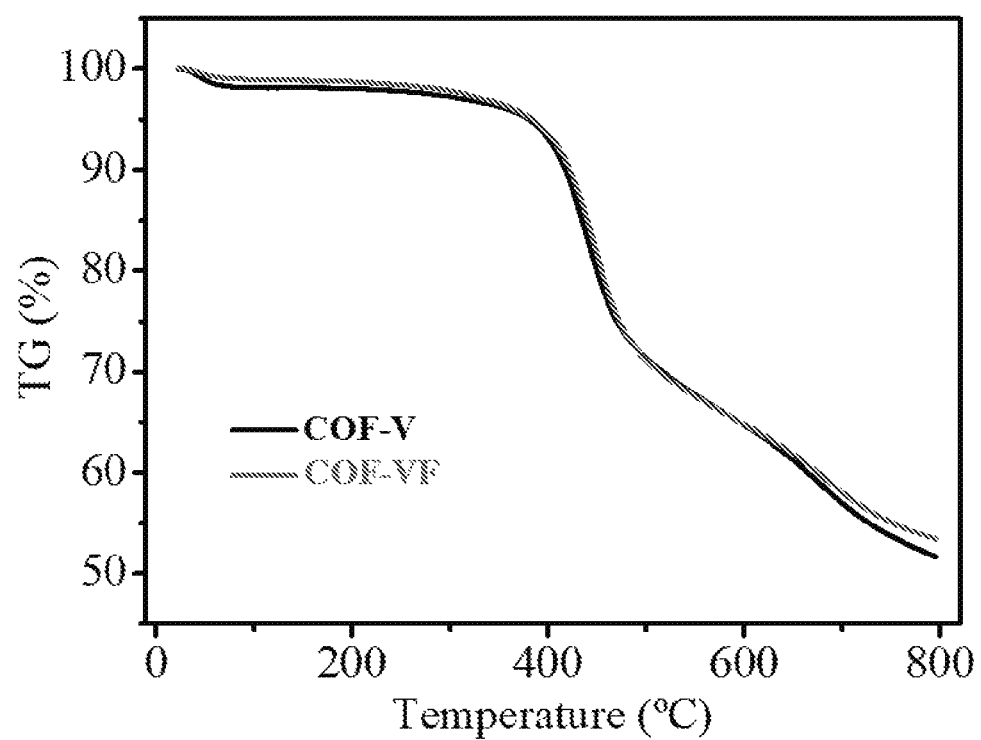
FIG. 29 shows TG curves of COF-V and COF-VF tested under $N_2$ atmosphere.
Figure 30:
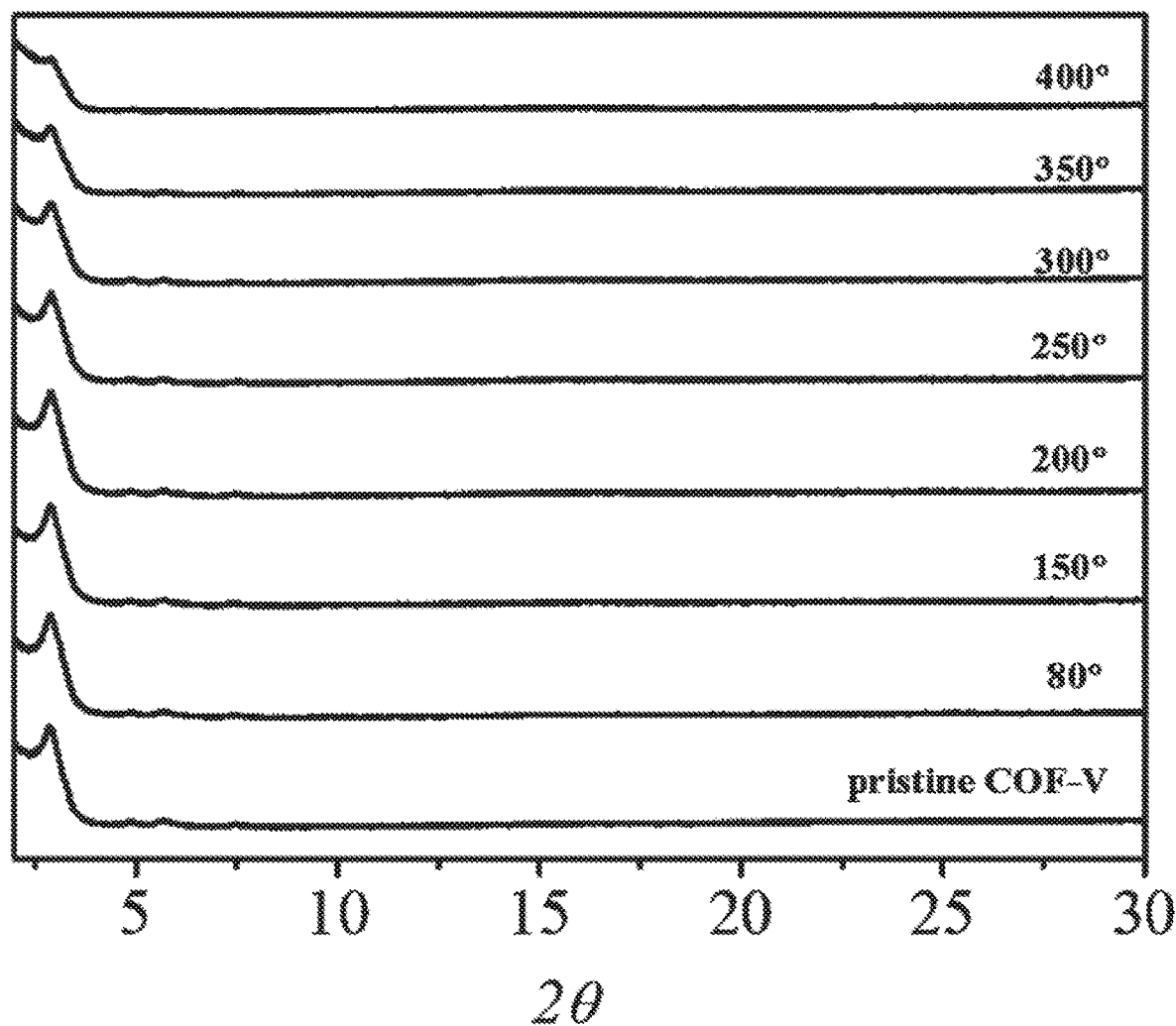
FIG. 30 shows variable temperatures PXRD profiles of COF-V.
Figure 31:
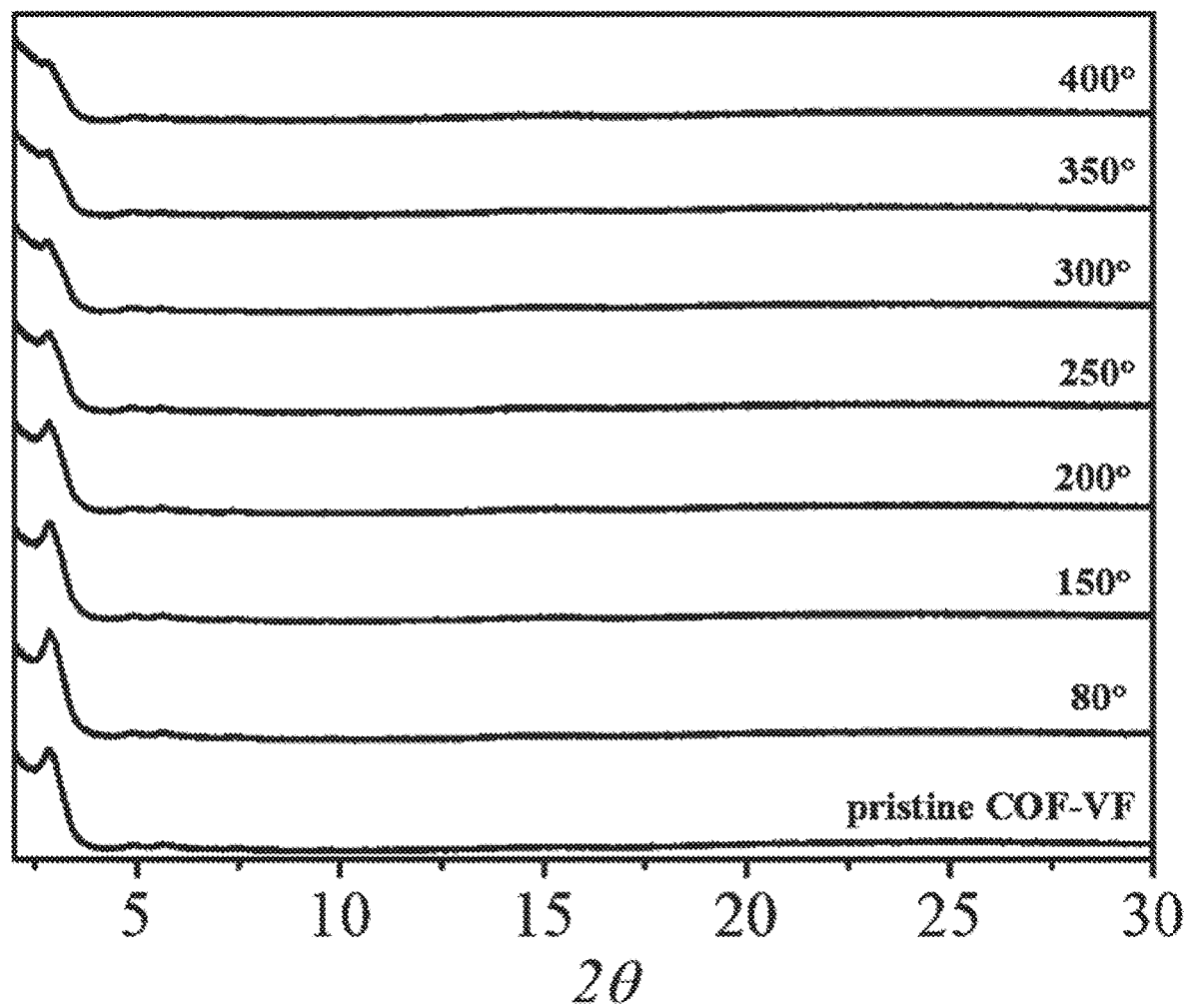
FIG. 31 shows variable temperatures PXRD profiles of COF-V.

To characterize the crystalline structure of COF-VF, powder X-ray diffraction (PXRD) measurements were carried out. COF-VF exhibits an intense peak at 2.8° along with some relatively weak peaks at 4.9°, 5.9°, 7.5°, and 24.9°, which agree well with the pristine pattern of COF-V, thus revealing the retention of crystallinity and structural integrity after introducing perfluoroalkyl groups (FIG. 20C). $N_2$ sorption isotherms collected at 77 K show that COF-V and COF-VF exhibit similar adsorption behavior (FIG. 20D). The BET surface area of COF-VF was calculated to be as high as 938 $m^2$ $g^{-1}$, rivaling that of COF-V (1152 $m^2$ $g^{-1}$), suggesting that the post-synthetic modification process has little effect on the pore structure of the pristine material, thereby still accessible for guest molecules (see also pore size distributions of these samples, FIG. 5). Thermogravimetric analysis (TGA, FIG. 29) conducted in $N_2$ atmosphere reveals that COF-V and COF-VF exhibit very similar curves with a decomposition temperature at around 400° C., indicative of their excellent thermal stability. This was further confirmed by means of variable temperatures powder X-ray diffraction and both of them retained their crystallinity up to 300° C. with decreased crystallinities observed after that (FIGS. 30-31).

Examination of Superwettability Properties

Figures 32A, 32B:
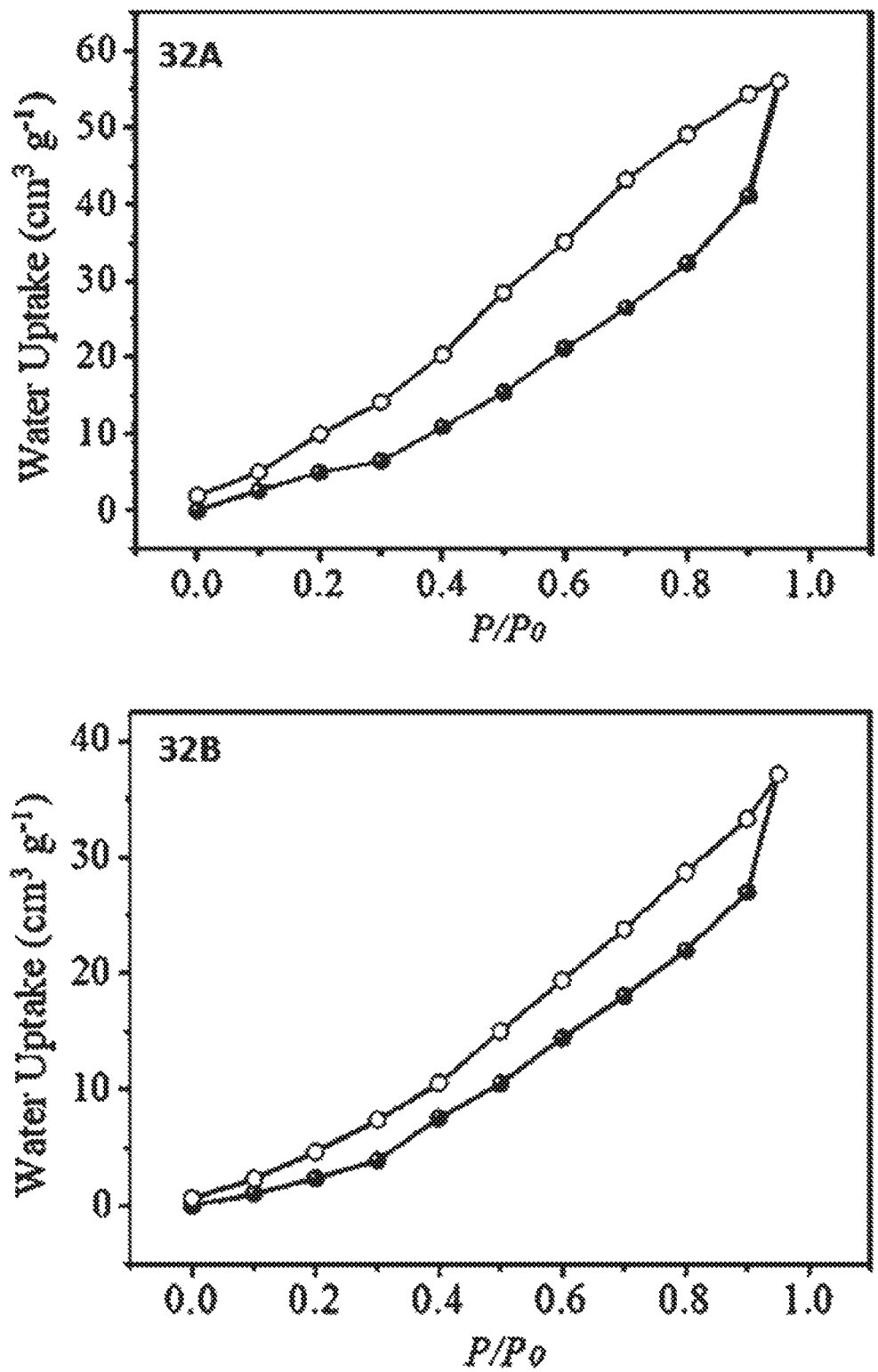
FIGS. 32A-32B show water adsorption (solid symbols) and desorption (open symbols) isotherms collected at (FIG. 32A) 298 K and (FIG. 32B) 323 K for COF-V.
Figures 33A, 33B:
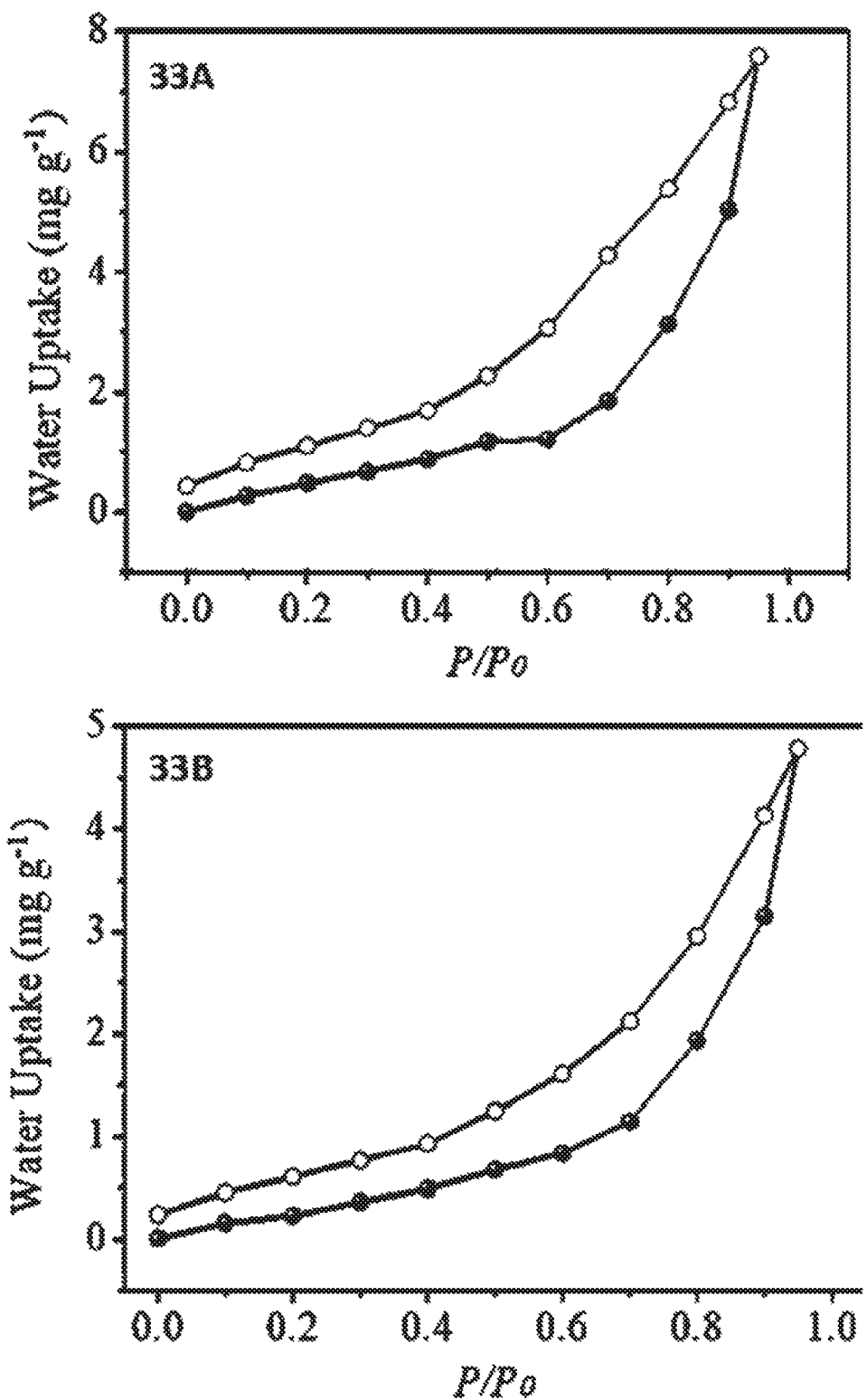
FIGS. 33A-33B show water adsorption (solid symbols) and desorption (open symbols) isotherms collected at (FIG. 33A) 298 K and (FIG. 33B) 323 K for COF-VF.
Figure 34A:
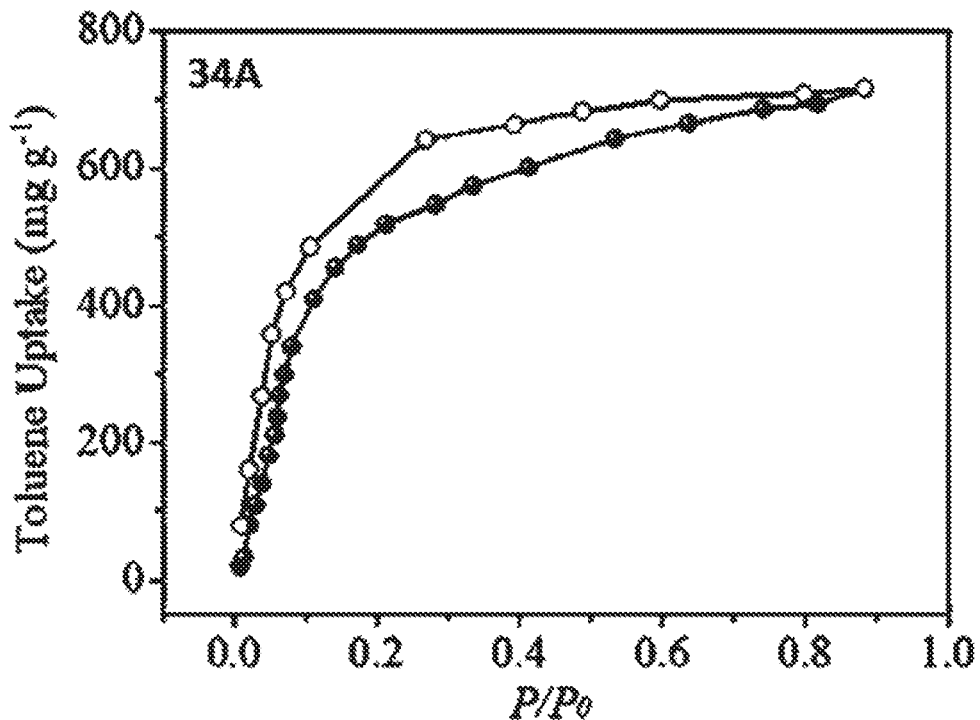
FIGS. 34A-34C show toluene adsorption (solid symbols) and desorption (open symbols) isotherms collected at (FIG. 34A) 298 K and (FIG. 34B) 323 K for COF-V. The isosteric heats of toluene (Qst) for COF-V were evaluated using the virial method. The Qst value for toulene was calculated to be 59.8 kJ mol-1 for COF-V at zero coverage.
Figure 34B:
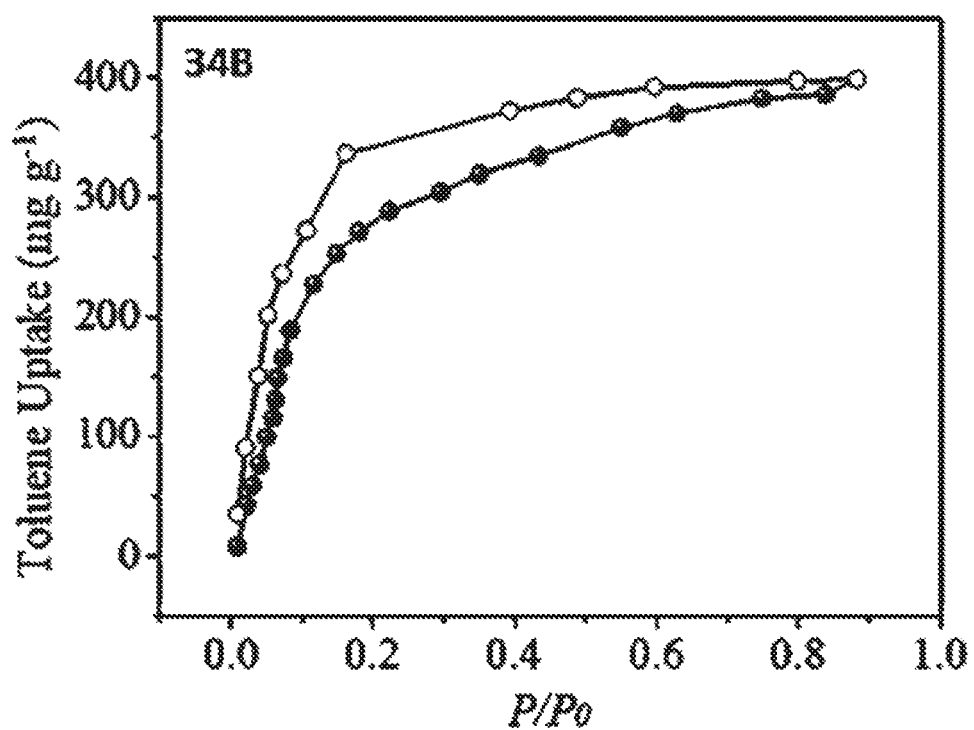
Figure 34C:
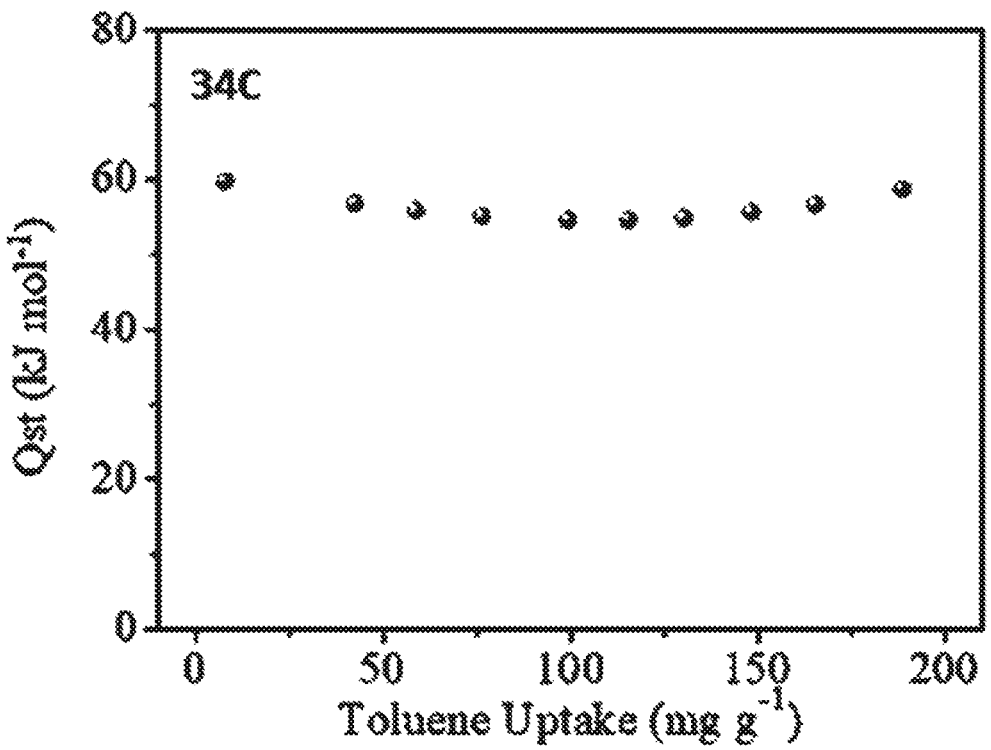
Figure 35A:
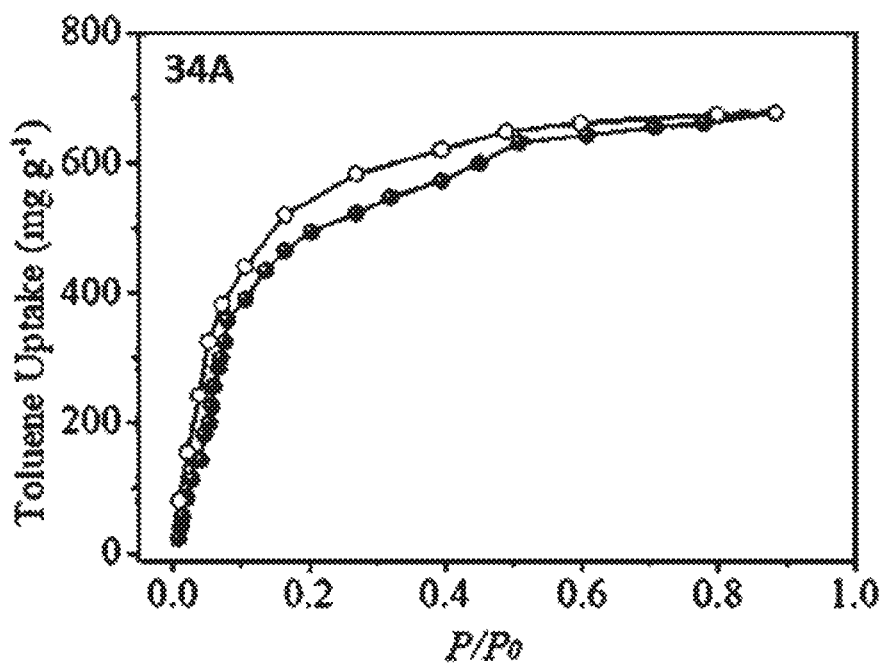
FIGS. 35A-35C show toluene adsorption (solid symbols) and desorption (open symbols) isotherms collected at (FIG. 35A) 298 K and (FIG. 35B) 323 K for COF-VF. The isosteric heats of toluene (Qst) for COF-V were evaluated using the virial method. The Qst value for toulene was calculated to be 62.4 kJ mol-1 for COF-VF at zero coverage.
Figures 35B, 35C:
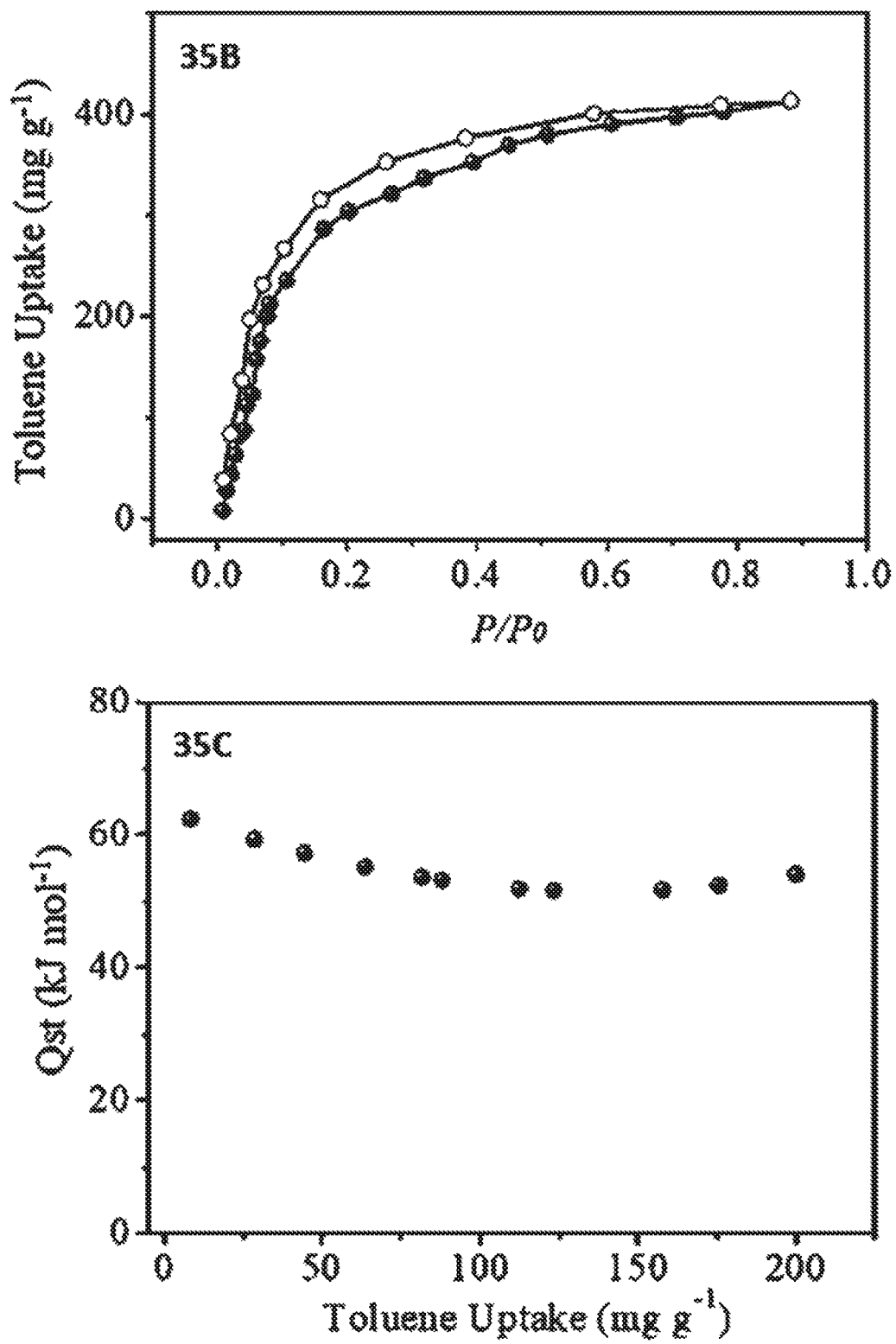

To investigate the effect of perfluoroalkyl group incorporation on the wettability of the COF material, the water contact angles (CA) of the surface were measured. COF-VF exhibits a static water CA of about 167°, thus revealing a superhydrophobic surface (superhydrophobic materials have a contact angle exceeding 150° for a water droplet, FIG. 20B, inset).[52] By contrast, COF-V and COF-V modified with alkyl group only give rise to CA of 113° and 122°, respectively (FIG. 20A, inset and FIG. 6, respectively). Therefore, the incorporation of perfluoroalkyl groups significantly increases the hydrophobicity. However, when oil drops onto the surface of COF-VF, it can be quickly absorbed, displaying contact angles close to 0° (FIG. 7). To further elucidate the superhydrophobicity and superoleophilicity of COF-VF, vapor adsorption experiments were performed. Water adsorption isotherms reveal that COF-VF is highly hydrophobic, showing negligible water adsorption even at $P/P_0$ up to 0.9 (less than 10 mg $g^{-1}$), while COF-V exhibits a water adsorption capacity of 56 mg $g^{-1}$ (FIGS. 32A-32B). In contrast, it has a toluene adsorption isotherm that shows sharp uptake at very low pressure ($P/P_0<0.1$) and attains a saturation capacity exceeding 680 mg $g^{-1}$ at $P/P_0=0.88$. To further investigate the impact by introducting flourine species on the materials' affinity towards $H_2O$ and oil, sorption isotherms of COF-V and COF-VF for $H_2O$ and toluene were collected and compared at 298 K and 323 K (FIGS. 33A-35C). COF-VF exhibited a higher affinity towards toluene and a lower affinity to $H_2O$ in relation to COF-V. These results indicate that the large channels in COF-VF are restricted to water yet permitted to toluene, exhibiting superior hydrophobic and oleophilic behaviors, which offer exceptional abilities to overcome the problems associated with the adsorption of harmful volatile organic compounds (VOCs) in humid environments.

Investigation of Chemical Shielding Effect

Figures 36A, 36B:
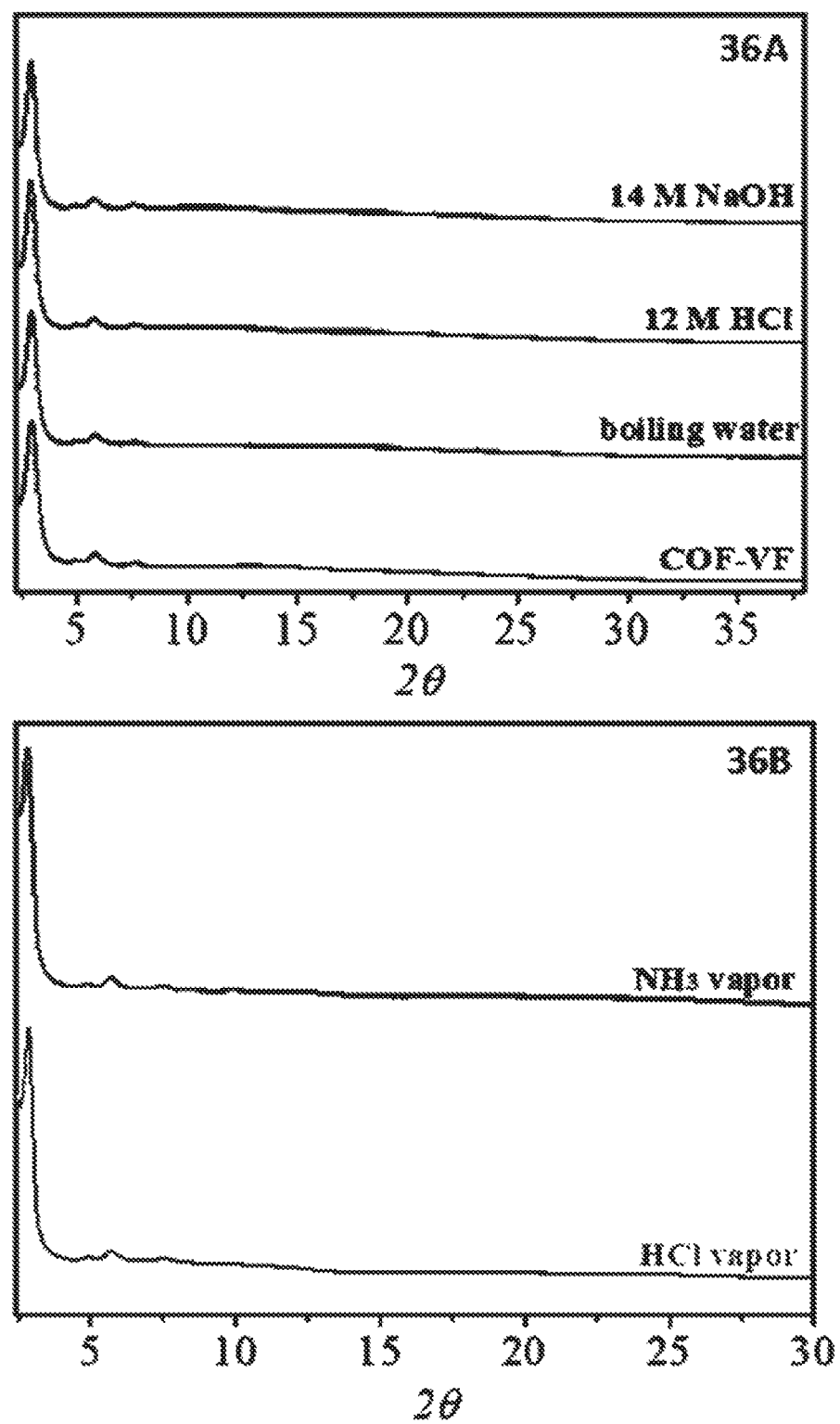
FIGS. 36A-36B show PXRD patterns.
Figure 37:
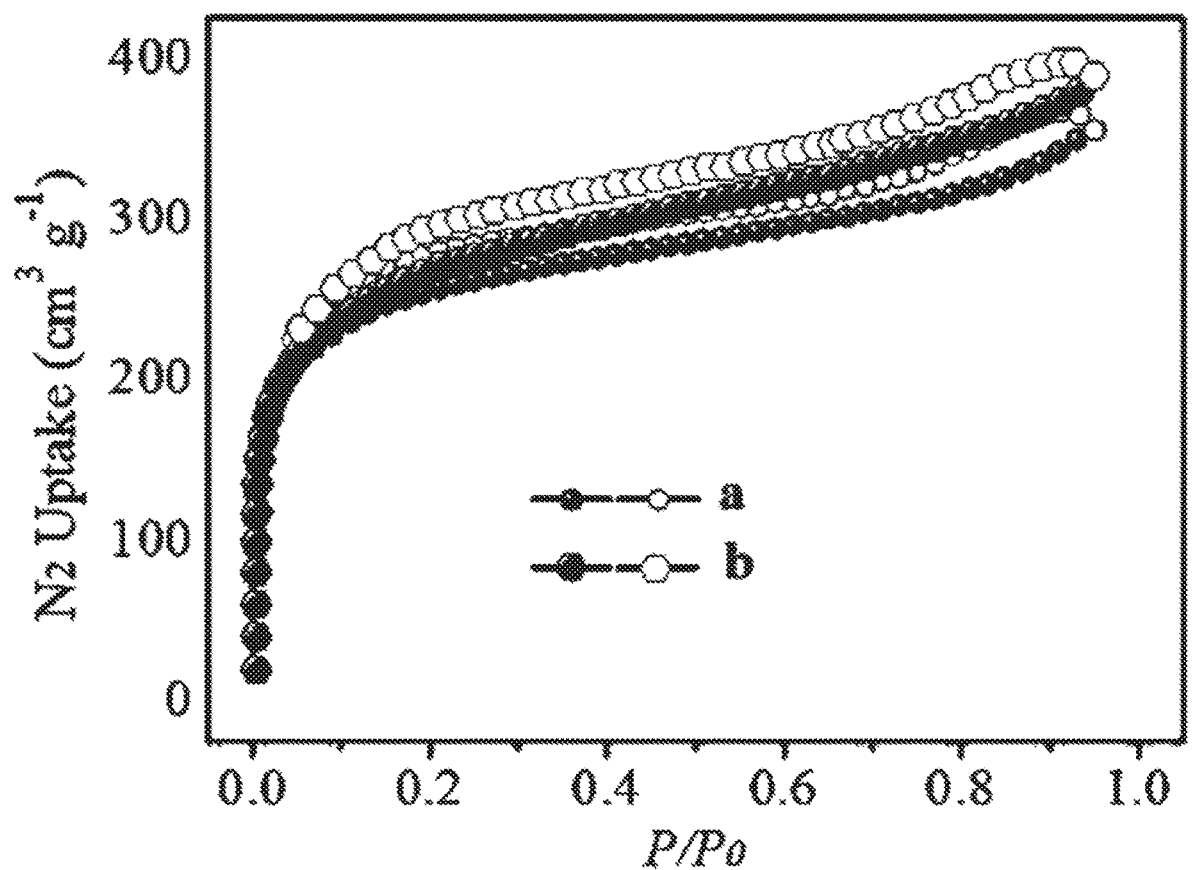
FIGS. 37A-37B shows a porosity test. $N_2$ sorption isotherms of COF-VF after treatment for 7 days under 12 M NaOH (FIG. 37A) and 12 M HCl (FIG. 37B). The BET surface area of FIG. 37A and FIG. 37B was calculated to be as high as 907 and 863 $m^2 g^{-1}$, respectively.
Figure 38A:
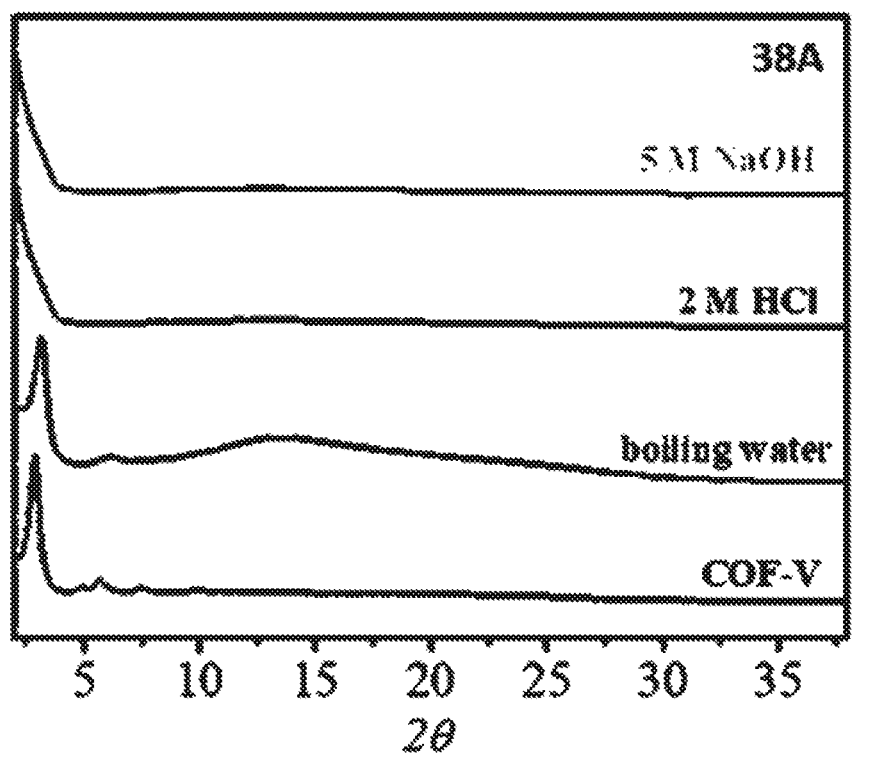
FIGS. 38A-38B show PXRD patterns.
Figure 38B:
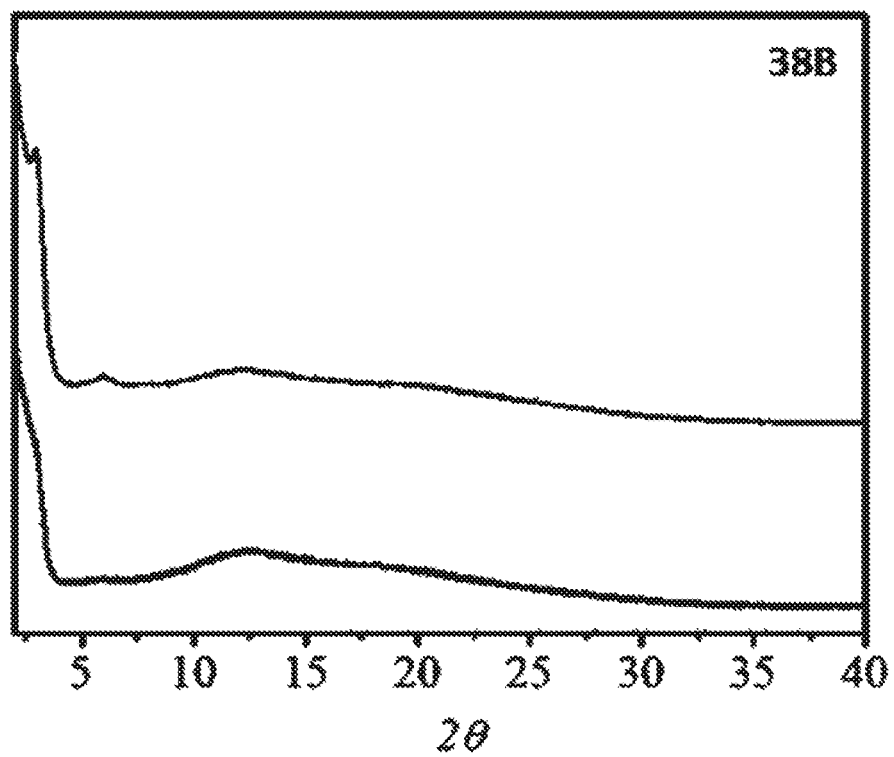
Figure 39A:
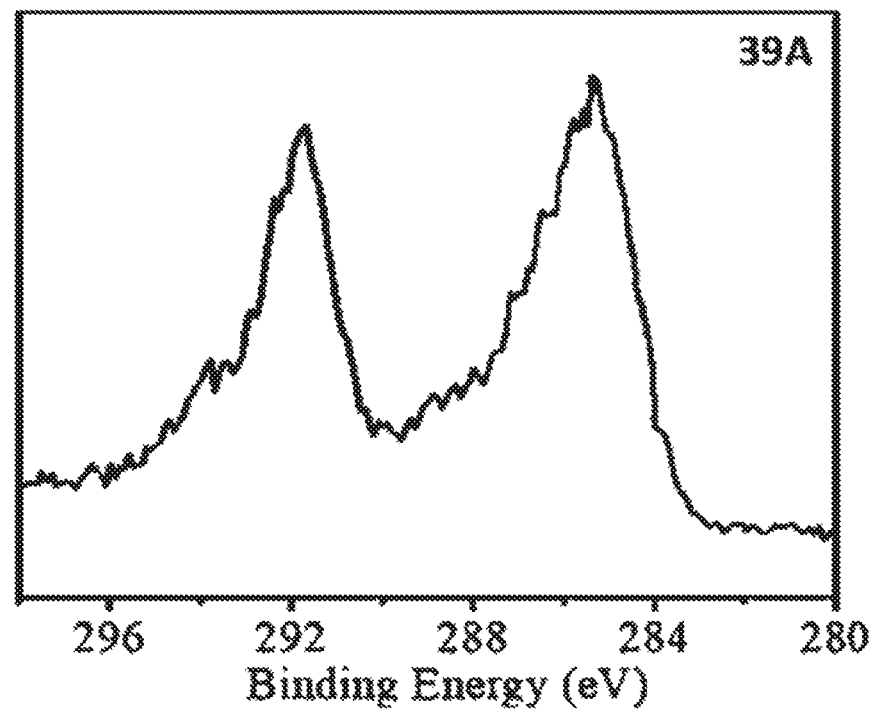
FIGS. 39A-39C show C1s, F1s, and S2p XPS spectra of COF-VF@foam.
Figure 39B:
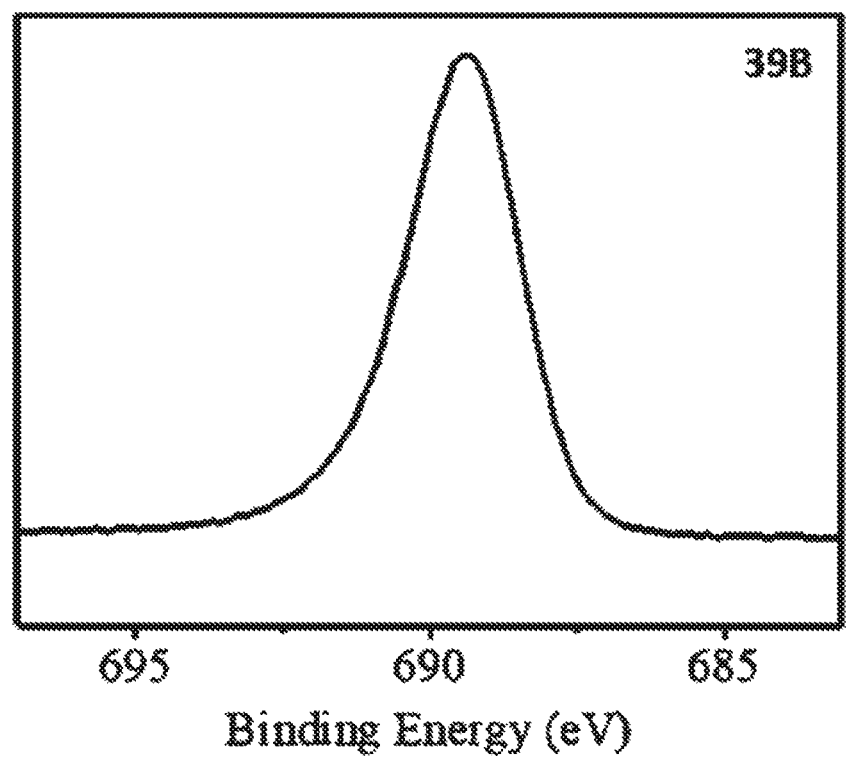
Figure 39C:
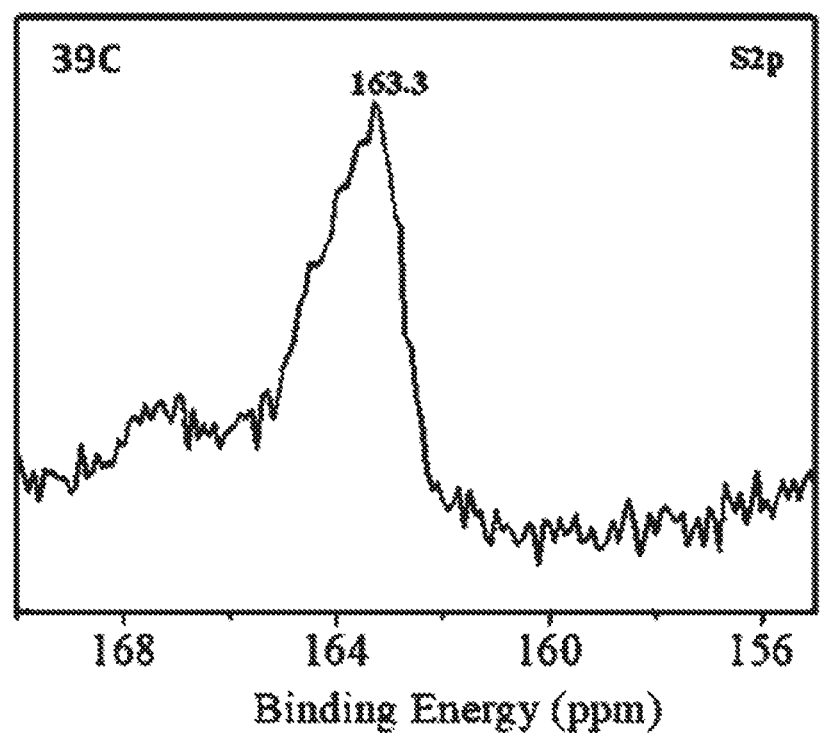

Given the importance of chemical stability for practical applications, the tolerance of COF-VF under a wide range of conditions was tested. Notably, after one week of treatment in 12 M HCl and 14 M NaOH at room temperature, as well as boiling water, COF-VF still retained its crystallinity and porosity (FIGS. 36A-37B). To further evaluate the chemical shielding effect resulting from superhydrophobicity, the PXRD patterns of COF-VF exposed to 100% relative humidity under HCl or $NH_3$ atmosphere at room temperature were monitored. COF-VF does not experience noticeable change in the PXRD patterns, even after aging under the above conditions over 48 h (FIGS. 36A-36B). In sharp contrast, COF-V cannot survive in 2 M HCl or humid HCl gas atmosphere after suspension/exposure for only 12 h (FIGS. 38A-38B). The results indicate that hydrophobic modifications to the COF material can appreciably safeguard the crystallinity. We attribute the observed ultrastability of COF-VF towards acid/base to the extreme water repellent properties of superhydrophobic surfaces, which serve as chemical shields to prevent the permeation of acidic/basic aqueous solutions.

Integration of the Superhydrophobic COF and Melamine Foam for Oil Recovery.

By embracing the features of superhydrophobicity and superoleophilicity together with high porosity and chemical stability, COF-VF could be beneficial in mitigating environmental problems caused by the release of harmful organic compounds. However, COF-VF was synthesized as microcrystalline powders and therefore its applications in real-world separation may be affected by their poor processability and handling.[55] In addition, the limited pore volume of the COF material restricts the adsorption capacities. In this context, we were motivated to incorporate superhydrophobic COF coatings onto other substrates to add applicability. Of the various supports, melamine foams have several appealing features on account of their high chemical and mechanical stability, large void fractions, and unique structure which offers binding affinity for the growth and anchoring of COF microcrystals by π-π interaction and hydrogen bonding.[56] To increase the interaction between the melamine foam and the COF to realize the homogeneous distribution of the COF throughout the foam, a bottom-up synthetic pathway was employed for COF immobilization on the foam for the potential application in process-intensive systems. Monolithic melamine foam was submerged in a solution of the monomers and catalyst (acetic acid) for COF synthesis. Upon being heated at 100° C. for 3 days and then treated with 1H,1H,2H,2H-perfluorodecanethiol, a homogeneous color change occurred on the foam from white to light yellow, suggesting the monolithic foam was coated and interpenetrated by the COF (FIG. 21).

Figure 40:
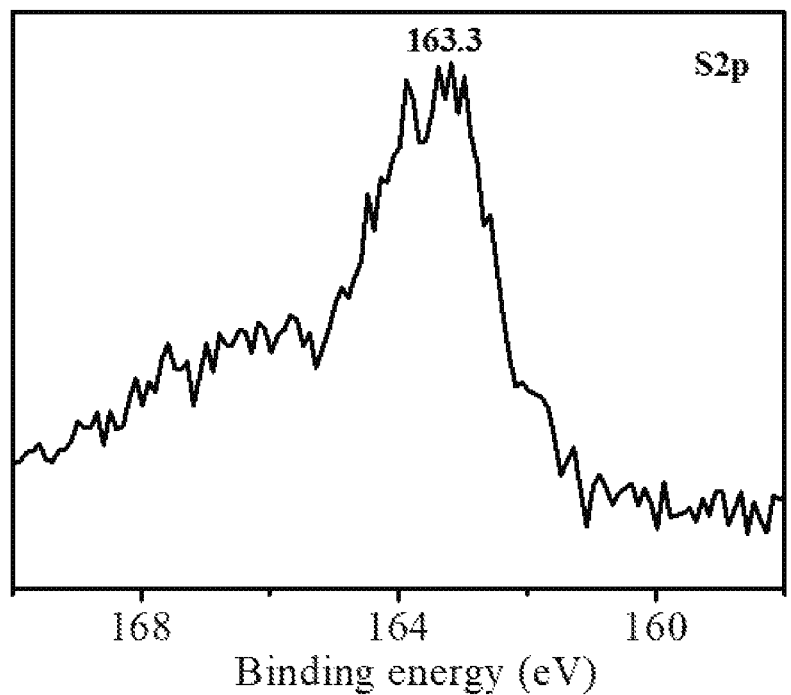
FIG. 40 shows an XPS spectrum, S2p XPS spectrum of the physical mixture of Melamine foam and COF-VF, which revealed that this sample gave the same S binding energy to that of COF-VF and COF-VF@foam synthesized in-situ, thereby suggesting that S species are attached on the COF rather than the foam.

From the SEM images of the bare and COF-coated melamine foam (FIGS. 38A-38B and 10A-10B), it was observed that the microstructure of the foam remains unchanged, while upon further magnification, a distinctive difference in the surface morphology was observed. The smooth melamine framework was encased by the COF products, which resulted in a surface roughness as shown in FIGS. 38A-38B. Furthermore, the presence of strong signals associated with the C—F stretching vibration, as well as S and F species in the FT-IR and XPS spectra of COF-VF@foam, respectively, confirms the incorporation of COF-VF onto the melamine foam (FIGS. 11A-12 and FIG. 39A-9C). More importantly, the coating of the COF onto the surface of the skeletons turns the foam from hydrophilic to hydrophobic. FIG. 22A depicts a photograph of COF-VF@foam floating atop a water bath while the pristine melamine foam sank to the bottom. When immersing COF-VF@foam in water by applying an external force, an interface formed between entrapped air residing along the surface of the foam and the surrounding water, giving rise to a mirror-like surface on COF-VF@foam; this phenomenon is due to the Cassie-Baxter nonwetting behavior (FIG. 22B).[63] After the external force was released, COF-VF@foam immediately floated to the water surface without absorption of any of the surrounding water, indicating its excellent water repellency. The hydrophobicity of COF-VF@foam was characterized by water contact angle measurements. As displayed in FIG. 22C, the water contact angle of COF-VF@foam is as high as 152°, confirming the superhydrophobic characteristics of the functionalized foam. To examine the wetting behavior of oil on COF-VF@foam, a nitrobenzene droplet (10 μL) contacted the membrane surface, spread out quickly, and a nearly zero CA was reached (FIG. 40). These results indicate that COF-VF@foam also exhibits superhydrophobic and superoleophilic properties. Notably, unlike many previous superhydrophobic foams in which hydrophobic coatings are physically attached onto the external surface of the foam and easily detached, the COF powders are wrapped throughout the skeletons, which remains unaffected by the squeezing process.[63] The mechanical stability of the melamine foam was retained during the coating processes, with COF-VF@foam subjected to compression and distortion, displaying elastomer characteristics. The combination of flexibility with superhydrophobicity and superoleophilicity allow COF-VF@foam to be used directly as compressible adsorbents for simple removal of organic pollutants. We therefore investigated its potential to clean up oil spills. Given the challenge to clean up underwater oil, nitrobenzene and 0.25 wt % Arsenazo III aqueous solution were poured into a vial to clearly distinguish the nitrobenzene phase from the water. When COF-VF@foam was inserted into the vial, nitrobenzene below the water was efficiently removed, while the pristine melamine foam only absorbed the aqueous solution (See also Movie S2). Importantly, the oil absorption kinetics of COF-VF@foam was very rapid, reaching its saturated absorption capacity within 5 seconds, as seen in Supplementary Movie 1 and the captured oil was readily removed by simple squeezing of the foam and the recovered COF-VF@foam was reused without any loss in its performance, thus suggesting that COF-VF@foam is a promising candidate as a "suction skimmer" in marine oil-spill recovery (FIG. 4d). To investigate the maximum sorption capacity, sorption tests were performed in organic solvents and oils in the absence of water. The oil absorption capacity of COF-VF@foam was calculated by the following equation; absorption capacity $(\kappa)=(m_s-m_o)/m_o$, wherein, $m_s$ and $m_o$ indicate the weight of COF-VF@foam before and after oil absorption, respectively, and the absorption capacity of the tested solvents is represented in FIG. 4e. Various organic solvents and oils with different polarities, densities, and viscosities were tested. COF-VF@foam exhibited remarkable sorption capacities, from 67 to 142 times its own weight, placing it within striking distance of the all-time oil uptake record (Table 1).[57-65] The absorption capacity of COF-VF@foam increased as a function of the solvent density as the pore volume for bulk solvent storage was mainly provided by the micrometer-sized pores of the melamine foam. More interestingly, COF-VF@foam also showed excellent recyclability with sorption capacity retention after 10 cycles of sorption-squeezing of more than 93% for multiple organic solvents and oils, thus validating its great potential in water remediation (FIG. 22F).

TABLE 1

Absorption capacities of various materials for organic solvents and oils.

| Material* | Weight gain (wt/wt) |
|---|---|
| ZIF-8/CN foam[55] | 0.36-0.58 |
| Spongy graphene[56] | 20-86 |
| SMF-2D[57] | 50-145 |
| MTMS-DMDMS marshmallow-like gel[58] | 6.2-16 |
| PDMS-coated CNF-0.8-18[59] | 40-115 |
| PDVB[60] | 8-15 |
| Graphene-coated sponge[61] | 54-165 |
| HCMP-1[62] | 7-10 |
| USTC-6@GO@sponge[63] | 12-43 |

*These references are cited in the main text.

COF-VF as a Nanocoat for Various Substrates

Currently, the creation of a superhydrophobic surface has stimulated great interest for both fundamental research and practical applications.[51] Given the bulk superhydrophobicity of COF-VF powders, it should be useful in conferring superhydrophobicity to an arbitrary surface to which it is applied. To test this concept, the COF-VF powder was sprayed onto adhesive tape and the resultant surface was seemingly impervious to water and concentrated aqueous acid or base. After application the droplets completely roll off the surface without wetting or contaminating the surface. It is worth pointing out, our superhydrophobic layers encompass the entire thickness and they are able to display significant durability. When the top layer is damaged, the underlying structure becomes exposed and the surface remained superhydrophobic. This improves upon other methods developed for the fabrication of superhydrophobic surfaces based on the generation of roughness, which are easily destroyed when the surface is scratched or even pressed. To prove this statement and to highlight the importance of bulky superhydrophobicity of the material for the maintenance of long-term stability, we have compared the stability of the materials' hydrophobicity as a result of chemical composition and microstructure, as exemplified by COF-VF and nickel foam, respectively. It is shown that the superhydrophobicity of COF-VF was retained after exerting a pressure, while the hydrophobic nickel foam became hydrophilic, due to loss of roughness.

To further demonstrate the ultra-stability of superhydrophobicity originated from chemical modification, we physically mixed COF-V and 1H,1H,2H,2H-perfluorodecanethiol at a mass ratio of 100/8 to keep the mixture (COF-V&F) with the same F amount as that in COF-VF. Contact angle test results revealed that an increased contact angle in comparison with COF-V was obtained, giving as high as 138°. However, it is still below the range of superhydrophobicity, due in part to less homogeneity of F species relative to chemical grafting. More importantly, the increased hydrophobicity is not stable, and after being rinsed with organic solvents, such improvement was disappeared, as demonstrated by comparing the waterproof properties of coating onto adhesive tape before and after being soaked in acetone. The water droplets completely roll off the surface without wetting or contaminating the fresh-made surface, while water drops very easily stick on the rinsed surface.

Figure 41:
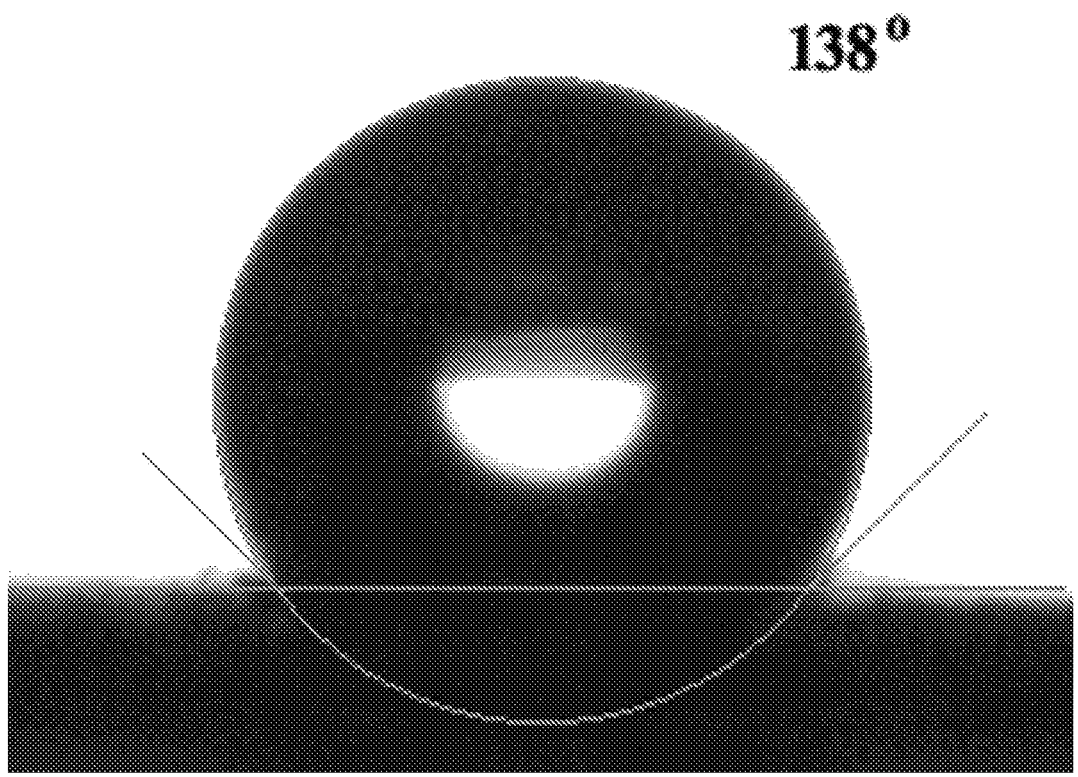
FIG. 41 shows a photograph of a water droplet on the pellet disk made from the physical mixture of COF-V (100 mg) and 1H,1H,2H,2H-perfluorodecanethiol (8 mg), which has the same F amount in the resultant material as that in COF-VF. Contact angle test results revealed that an increased contact angle in comparison with COF-V was obtained, giving as high as 138°.

Apart from conferring the solid substrates with superhydrophobicity, it is also applicable to aqueous solutions to form liquid marbles, which are of potential benefit in microfluidic applications, and also permit the study of a drop in a non-wetting situation.[66-68] In particular, magnetic liquid marbles have recently attracted extensive attention due to their magnet responsive ability.[69,70] To demonstrate this concept, we encapsulated an aqueous solution of $Fe_3O_4$ nanoparticles into COF powders. As schematically shown in FIG. 23A, the magnetic liquid marbles were readily obtained by rolling water droplets on a pile of superhydrohobic COF powders. As the water droplet is rolled over, the COF powders spontaneously self-organize to encapsulate the water droplet and render the droplet nonwetting to the substrate, behaving like a soft solid. The spontaneous attachment of the nanoparticles at the liquid/air interface can be understood by the minimization of the free energy of the surface. FIG. 23B shows a typical digital photograph of a liquid marble prepared from 0.1 mL water (containing 2 wt % $Fe_3O_4$), which could roll freely on the surface of a glass plate. The mechanical robustness of the resultant magnetic liquid marbles was demonstrated by impact deformation and rebound of the marbles, which is an essential requirement for their applications in microfluidic devices. The excellent stability of the liquid marble is further supported by its capability to be handled with a pair of tweezers without breaking and the liquid marble remained intact after being transferred onto a water surface in a Petri dish (FIG. 23C). Driven by a magnetic bar, the direction of the liquid marble movement changed in response to the motion of the external magnet. The liquid marble can be transported not only on flat surfaces but also on upslope surfaces and jump up and down in curve, as illustrated in FIGS. 23D-23E, which will facilitate the generation of topologically complex microfluidic systems. Given the inherent porosity of COF-VF, the superhydrophobic shell of a liquid marble allows gas transport, but prevents contact of its liquid core with outside surfaces. These properties intuitively enable them to be used as a gas or vapor sensor and liquid marbles loaded with different indicators can simultaneously sense different gases via different mechanisms. To highlight the advantage of a porous material (like COFs) over other organic superhydrophobic materials, side-by-side comparisons were made with liquid marbles formed by nonporous polytetrafluoroethylene. Ammonia sensing from an aqueous $NH_3$ emitting source using liquid marbles were carried out. Liquid marbles loaded with phenolphthalein or transition metal salt ($CoCl_2$) indicator were placed onto the surface of an $NH_4OH$ solution (2 wt. %). Rapid color changes of liquid marbles made of COF-VF were observed (within one minute), while no noticeable changes were detected for those using nonporous polytetrafluoroethylene under identical conditions, indicative of the superiority of porous materials as a permeable shell (FIG. 41).

Conclusion

In summary, we have determined that pore surface modification of COFs serves as an excellent approach to improve applicability of these materials. This study demonstrated the successful impartment of a COF material with superhydrophobicity and its potential applications by integrating it with other substrates such as melamine foam and magnetic liquids. This proof-of-concept study is an important first step toward exploiting new capabilities for COF materials by combining them with superwettability. Fundamentally, it expands the superwettability control space that can be carried out within COFs, as an emerging class of porous crystalline materials, not just limited to 2D surfaces.

This work highlights the opportunity of designing smart materials by taking advantage of the ability to synergistically integrate multiple functionalities into COFs. In addition to sharing the attributes of general superhydrophobic surfaces, such as self-cleaning and waterproof, the surfaces created by the COFs are expected to possess other unique functions due to the intrinsic properties of COFs, which hold great promise in applications such as wearable microelectronic devices. For example, distinguishing from many other nonporous coatings, which provide a non-breathable layer, the pores of COFs are permeable to air, thus facilitating the release of generated heat by electronic devices as well as aiding in the comfort of functional garments. Considering the tunable synthesis of COFs and the modular nature of surface properties in conjunction with the compatibility of the resultant COF materials to integrate with a variety of substrates, our work therefore opens a new avenue for the task-specific application of COFs.

References for Example 2

1. Slater, A. G., and Cooper, A. I. (2015). Function-led design of new porous materials. Science 348, aaa8075.
2. Das, S., Heasman, P., Ben, T., and Qiu, S. (2017). Porous organic materials: strategic design and structure-function correlation. Chem. Rev. 117, 1515-1563.
3. Côté, A. P., Benin, A. I., Ockwig, N. W., O'Keeffe, M., Metzger, A. J., and Yaghi, O. M. (2005). Porous, crystalline, covalent organic frameworks. Science 310, 1166-1170.
4. Feng, X., Ding, X., and Jiang, D. (2012). Covalent organic frameworks. Chem. Soc. Rev. 41, 6010-6022.
5. Ding, S.-Y., and Wang, W. (2013). Covalent organic frameworks (COFs): from design to applications. Chem. Soc, Rev. 42, 548-568.
6. Ascherl, L., Sick, T., Margraf, J. T., Lapidus, S. H., Calik, M., Hettstedt, C., Karaghiosoff, K., Döblinger, M., Clark, T., Chapman, K. W., Auras, F., and Bein, T. (2016). Molecular docking sites designed for the generation of highly crystalline covalent organic frameworks. Nat. Chem. 8, 310-316.
7. Kandambeth, S., Mallick, A., Lukose, B., Mane, M. V., Heine, T., and Banerjee, R. (2012). Construction of crystalline 2D covalent organic frameworks with remarkable chemical (acid/base) stability via a combined reversible and irreversible route. J. Am. Chem. Soc. 134, 19524-19527.
8. Pang, Z.-F., Xu, S.-Q., Zhou, T.-Y., Liang, R.-R., Zhan, T.-G., and Zhao, X. (2016). Construction of covalent organic frameworks bearing three different kinds of pores through the heterostructural mixed linker strategy. J. Am. Chem. Soc. 138, 4710-4713.
9. Lanni, L. M., Tilford, R. W., Bharathy, M., and Lavigne, J. J. (2011). Enhanced hydrolytic stability of self-assembling alkylated two-dimensional covalent organic frameworks. J. Am. Chem. Soc. 133, 13975-13983.
10. Bunck, D. N., and Dichtel, W. R. (2012). Functionalization of three-dimensional covalent organic frameworks. Angew. Chem. Int. Ed. 51, 1885-1889.
11. Jiang, J., Zhao, Y., and Yaghi, O. M. (2016). Covalent chemistry beyond molecules. J. Am. Chem. Soc. 138, 3255-3265.
12. Diercks, C. S., and Yaghi, O. M. (2017). The atom, the molecule, and the covalent organic framework. Science 355, eaal1585.
13. Xu, H., Gao, J., and Jiang, D. (2015). Stable, crystalline, porous, covalent organic frameworks as a platform for chiral organocatalysts. Nat. Chem. 7, 905-912.
14. Ding, S.-Y., Gao, J., Wang, Q., Zhang, Y., Song, W.-G., Su, C.-Y., and Wang, W. (2011). Construction of covalent organic framework for catalysis: Pd/COF-LZU1 in Suzuki-Miyaura coupling reaction. J. Am. Chem. Soc. 133, 19816-19822.
15. Fang, Q., Gu, S., Zheng, J., Zhuang, Z., Qiu, S., and Yan, Y. (2014). 3D Microporous base-functionalized covalent organic frameworks for size-selective catalysis, Angew. Chem. Int. Ed. 53, 2878-2882.
16. Vyas, V. S., Haase, F., Stegbauer, L., Savasci, G., Podjaski, F., Ochsenfeld, C., and Lotsch, B. V. (2015). A tunable azine covalent organic framework platform for visible light-induced hydrogen generation. Nat. Commun. 6, 8508.
17. Sun, Q., Aguila, B., Perman, J. A., Nguyen, N., and Ma, S. (2016). Flexibility matters: cooperative active sites in covalent organic framework and threaded ionic polymer. J. Am. Chem. Soc. 138, 15790-15796.
18. Wang, X., Han, X., Zhang, J., Wu, X., Liu, Y., and Cui, Y, (2016). Homochiral 2D porous covalent organic frameworks for heterogeneous asymmetric catalysis. J. Am. Chem. Soc. 138, 12332-12335.
19. Bertrand, G. H. V., Michaelis, V. K., Ong, T.-C., Griffin, R. G., and Dincă, M. (2013). Thiophene-based covalent organic frameworks. Proc. Natl. Acad. Sci, U, S. A. 110, 4923-4928.
20. Du, Y., Yang, H., Whiteley, J. M., Wan, S., Jin, Y., Lee, S.-H., and Zhang, W. (2016). Ionic covalent organic frameworks with spiroborate linkage. Angew. Chem. Int. Ed. 55, 1737-1741.
21. Zeng, Y., Zou, R., and Zhao, Y. (2016). Covalent organic frameworks for $CO_2$ capture. Adv. Mater. 28, 2855-2873.
22. Baldwin, L. A., Crowe, J. W., Pyles, D. A., and McGrier, P. L. (2016). Metalation of a mesoporous three-dimensional covalent organic framework. J. Am. Chem. Soc, 138, 15134-15137.
23. Sun, Q., Aguila, B., Perman, J., Earl, L., Abney, C., Cheng, Y., Wei, H., Nguyen, N., Wojtas, L., and Ma, S. (2017). Postsynthetically modified covalent organic frameworks for efficient and effective mercury removal. J. Am. Chem. Soc. 139, 2786-2793.
24. Fang, Q., Wang, J., Gu, S., Kaspar, R. B., Zhuang, Z., Zheng, J., Guo, H., Qiu, S., and Yan, Y. (2015). 3D porous crystalline polyimide covalent organic frameworks for drug delivery. J. Am. Chem. Soc. 137, 8352-8355.
25. Kandambeth, S., Venkatesh, V., Shinde, D. B., Kumari, S., Halder, A., Verma, S., and Banerjee, R. (2015). Self-templated chemically stable hollow spherical covalent organic framework. Nat. Commun. 6, 6786.
26. Ma, H., Liu, B., Li, B., Zhang, L., Li, Y.-G., Tan, H.-Q., Zang, H.-Y., and Zhu, G. (2016). Cationic covalent organic frameworks: a simple platform of anionic exchange for porosity tuning and proton conduction. J. Am. Chem. Soc. 138, 5897-5903.
27. Wang, S., Wang, Q., Shao, P., Han, Y., Gao, X., Ma, L., Yuan, S., Ma, X., Zhou, J., Feng, X., and Wang, B. (2017), Exfoliation of covalent organic frameworks into few-layer redox-active nanosheets as cathode materials for lithium-ion batteries. J. Am. Chem. Soc. 139, 4258-4261.
28. Qian, H.-L., Yang, C.-X., and Yan, X.-P. (2016). Bottom-up synthesis of chiral covalent organic frameworks and their bound capillaries for chiral separation. Nat. Commun. 7, 12104.
29. Nagai, A., Guo, Z., Feng, X., Jin, S., Chen, X., Ding, X., and Jiang, D. (2011). Pore surface engineering in covalent organic frameworks. Nat. Commun. 2, 536.
30. Jiang, H.-L., Feng, D., Liu, T.-F., Li, J. R., and Zhou, H.-C. (2012). Pore surface engineering with controlled loadings of functional groups via click chemistry in highly stable metal-organic frameworks. J. Am. Chem. Soc. 134, 14690-14693.
31. Su, B., Tian, Y., and Jiang, L. (2016). Bioinspired interfaces with superwettability: from materials to chemistry. J. Am. Chem. Soc. 138, 1727-1748.
32. Bellanger, H., Darmanin, T., de Givenchy, E. T., and Guittard, F. (2014). Chemical and physical pathways for the preparation of superoleophobic surfaces and related wetting theories. Chem. Rev. 114, 2694-2716.
33. Li, X.-M., Reinhoudt, D., and Crego-Calama, M. (2007). What do we need for a superhydrophobic surface? A review on the recent progress in the preparation of superhydrophobic surfaces. Chem. Soc. Rev. 36, 1350-1368.
34. Zhang, C., Mcadams, D. A., and Grunlan, J. C. (2016). Nano/Micro-manufacturing of bioinspired materials: a review of methods to mimic natural structures. Adv. Mater. 28, 6292-6321.
35. Yao, X., Song, Y. and Jiang, L. (2011). Applications of bio-inspired special wettable surfaces. Adv. Mater. 23, 719-734.
36. Jayaramulu, K., Datta, K. K. R., Rösler, C., Petr, M., Otyepka, M., Zboril, R., and Fischer, R. A. (2016). Biomimetic superhydrophobic/superoleophilic highly fluorinated graphene oxide and ZIF-8 composites for oil-water separation. Angew. Chem. Int. Ed. 55, 1178-1182.
37. Yuan, J., Liu, X., Akbulut, O., Hu, J., Suib, S. L., Kong, J., and Stellacci, F. (2008). Superwetting nanowire membranes for selective absorption. Nature Nanotech. 3, 332-336.
38. Pan, S., Kota, A, K., Mabry, J. M., and Tuteja, A. (2013). Superomniphobic surfaces for effective chemical shielding J. Am. Chem. Soc. 135, 578-581.
39. Tian, X., Shaw, S., Lind, K. R., and Cademartiri, L. (2016). Thermal processing of silicones for green, scalable, and healable superhydrophobic coatings, Adv. Mater. 28, 3677-3682.
40. Mullangi, D., Shalini, S., Nandi, S., Choksi, B, and Vaidhyanathan, R. (2017), Super-hydrophobic covalent organic frameworks for chemical resistant coatings and hydrophobic paper and textile composites. J. Mater. Chem. A 5, 8376-8384.
41. Yang, C., Kaipa, U., Mather, Q. Z., Wang, X., Nesterov, V., Venero, A. F., and Omary, M. A. (2011). Fluorous metal-organic frameworks with superior adsorption and hydrophobic properties toward oil spill cleanup and hydrocarbon storage. J. Am. Chem. Soc, 133, 18094-18097.
42. Padial, N. M., Procopio, E. Q., Montoro, C., López, E., Oltra, J. E., Colombo, V., Maspero, A., Masciocchi, N., Galli, S., Senkovska, I., Kaskel, S., Barea, E., and Navarro, J. A. R. (2013). Highly hydrophobic isoreticular porous metal-organic frameworks for the capture of harmful volatile organic compounds. Angew. Chem. Int. Ed, 52, 8290-8294.
43. Mitra, S., Sasmal, H. S., Kundu, T., Kandambeth, S., Illath, K., Diaz, D. D., and Banerjee, R. (2017). Drug delivery in covalent organic nanosheets (CONS) via sequential postsynthetic modification. J. Am. Chem. Soc. 139, 4513-4520.
44. Sun, Q., He, H., Gao, W.-Y., Aguila, B., Wojtas, L., Dai, Z., Li, J., Chen, Y.-S., Xiao, F.-S., and Ma, S. (2016). Imparting amphiphobicity on single-crystalline porous materials. Nat. Commun. 7, 13300.
45. Zhang, W., Hu, Y., Ge, J., Jiang, H.-L., and Yu, S.-H. (2014). A facile and general coating approach to moisture/water-resistant metal-organic frameworks with intact porosity. J. Am. Chem. Soc. 136, 16978-16981.
46. Nguyen, J. G., and Cohen, S. M. (2010). Moisture-resistant and superhydrophobic metal-organic frameworks obtained via postsynthetic modification, J. Am. Chem. Soc. 132, 4560-4561.
47. McGuire, C. V., and Forgan, R. S. (2015). The surface chemistry of metal-organic frameworks. Chem. Commun. 51, 5199-5217.
48. Sun, Q., Aguila, B., Verma, G., Liu, X., Dai, Z., Deng, F., Meng, X., Xiao, F.-S., and Ma, S. (2016). Superhydrophobicity: constructing homogeneous catalysts into superhydrophobic porous frameworks to protect them from hydrolytic degradation. Chem 1, 628-639.
49. Huang, G., Yang, Q., Xu, Q., Yu, S.-H., and Jiang, H.-L. (2016), Polydimethylsiloxane coating for a palladium/MOF composite: highly improved catalytic performance by surface hydrophobization. Angew. Chem. Int. Ed. 55, 7379-7383.
50. Yuan, C., Luo, W., Zhong, L., Deng, H., Liu, J., Xu, Y., and Dai, L. (2011). Gold@polymer nanostructures with tunable permeability shells for selective catalysis. Angew. Chem. Int. Ed. 50, 3155-3159.
51. Levkin, P. A., Svec, F., and Fréchet, M. J. (2009). Porous polymer coatings: a versatile approach to superhydrophobic surfaces. Adv. Funct. Mater. 19, 1993-1998.
52. Darmanin, T., and Guittard, F. (2014). Recent advances in the potential applications of bioinspired superhydrophobic materials. J. Mater. Chem. A 2, 16319-16359.
53. Hayase, G., Kanamori, K., Hasegawa, G., Maeno, A., Kaji, H., & Nakanishi, K. (2013). A superamphiphobic macroporous silicone monolith with marshmallow-like flexibility. Angew. Chem. Int. Ed. 52, 10788-10791.
54. Zhou, H., Wang, H., Niu, H., Zhao, Y., Xu, Z., and Lin, T. (2017). Fabrication of all-water-based self-repairing superhydrophobic coatings based on UV-responsive microcapsules. Adv. Funct. Mater. 1604261.

55. Kandambeth, S., Biswal, B. P., Chaudhari, H. D., Rout, K. C., Kunjattu H., S., Mitra, S., Karak, S., Das, A., Mukherjee, R., Kharul, U. K., and Banerjee, R. (2017). Selective molecular sieving in self-standing porous covalent-organic-framework membranes, Adv. Mater. 29, 1603945.

56. Wu, Y., Guo, J., and Wang, C. (2016). An elastic monolithic catalyst: a microporous metalloporphyrin-containing framework-wrapped melamine foam for process-intensified acyl transfer. Angew. Chem. Int. Ed. 55, 6013-6017.

57. Kim, D., Kim, D. W., Buyukcakir, O., Kim, M.-K., Polychronopoulou, K., and Coskun, A. (2017), Highly hydrophobic ZIF-8/carbon nitride foam with hierarchical porosity for oil capture and chemical fixation of $CO_2$. Adv. Funct. Mater. 1700706.

58. Bi, H., Xie, X., Yin, K., Zhou, Y., Wan, S., He, L., Xu, F., Banhart, F., Sun, L., and Ruoff, R. S. (2012), Spongy graphene as a highly efficient and recyclable sorbent for oils and organic solvents. Adv. Funct. Mater. 22, 4421-4425.

59. Du, R., Cao, X., Feng, Q., Zhao, Q., Li, P., Deng, S., Shi, L., and Zhang, J. (2016). Microscopic dimensions engineering: stepwise manipulation of the surface wettability on 3D substrates for oil/water separation. Adv. Mater. 28, 936-942.

60. Hayase, G., Kanamori, K., Fukuchi, M., Kaji, H., and Nakanishi, K. (2013). Facile synthesis of marshmallow-like macroporous gels usable under harsh conditions for the separation of oil and water. Angew. Chem. Int. Ed. 52, 1986-1989.

61. Liang, H.-W., Guan, Q.-F., Chen, L.-F., Zhu, Z., Zhang, W.-J., and Yu, S.-H. (2012). Macroscopic-scale template synthesis of robust carbonaceous nanofiber hydrogels and aerogels and their applications. Angew. Chem. Int. Ed. 51, 5101-5105.

62. Zhang, Y., Wei, S., Liu, F., Du, Y., Liu, S., Ji, Y., Yokoi, T., Tatsumi, T., and Xiao, F.-S. (2009). Superhydrophobic nanoporous polymers as efficient adsorbents for organic compounds. Nano Today 4, 135-142.

63. Nguyen, D. D., Tai, N.-H., Lee, S.-B., and Kuo, W.-S. (2012). Superhydrophobic and superoleophilic properties of graphene-based sponges fabricated using a facile dip coating method, Energy Environ. Sci, 5, 7908-7912.

64. Li, A., Sun, H.-X., Tan, D.-Z., Fan, W.-J., Wen, S.-H., Qing, X.-J., Li, G.-X., Li, S.-Y., and Deng, W.-Q. (2011). Superhydrophobic conjugated microporous polymers for separation and adsorption. Energy Environ. Sci. 4, 2062-2065.

65. Jiang, Z.-R., Ge, J., Zhou, Y.-X., Wang, Z. U., Chen, D., Yu, S.-H., and Jiang, H. (2016). Coating sponge with a hydrophobic porous coordination polymer containing a low-energy $CF_3$-decorated surface for continuously pumping recovery of an oil spill from water. NPG Asia Mater. 8, e253.

66. Aussillous, P., and Quéré, D. (2001). Liquid marbles. Nature 411, 924-927.

67. Gao, W., Lee, H. K., Hobley, J., Liu, T., Phang, I. Y., and Ling, X. Y. (2015), Graphene liquid marbles as photothermal miniature reactors for reaction kinetics modulation. Angew. Chem. Int. Ed. 54, 3993-3996.

68. Dupin, D., Armes, S. P., and Fujii, S. (2009). Stimulus-responsive liquid marbles. J. Am. Chem. Soc. 131, 5386-5387.

69. Xue, Y., Wang, H., Zhao, Y., Dai, L., Feng, L., Wang, X., and Lin, T. (2010). Magnetic liquid marbles: a "precise" miniature reactor. Adv. Mater. 22, 4814-4818.

70. Wang, D., Zhu, L., Chen, J.-F., and Dai, L. (2016). Liquid marbles based on magnetic upconversion nanoparticles as magnetically and optically responsive miniature reactors for photocatalysts and photodynamic therapy. Angew. Chem. Int. Ed. 55, 10795-10799.

We claim:

1. A superhydrophobic porous material comprising:
   a polymeric foam matrix comprising a three-dimensional network of polymer fibers;
   a covalent organic framework encasing at least a portion of the polymer fibers, wherein the covalent organic framework comprises a plurality of perfluoroalkyl or perfluorheteroalkyl moieties covalently attached thereto.

2. The superhydrophobic porous material according to claim 1, wherein the polymeric foam matrix comprises a foam selected from the group consisting of polyurethane foam, polyurea foam, polyvinyl chloride foam, polypropylene foam, polyethylene foam, polystyrene foam, polyvinyl acetate foam, and melamine foam.

3. The superhydrophobic porous material according to claim 1, wherein the covalent organic framework is intertwined within the polymeric foam matrix such that the covalent organic framework encasing the portion of the polymer fibers is stable to mechanical compression of the polymeric foam matrix.

4. The superhydrophobic porous material according to claim 1, wherein the covalent organic framework is intertwined within the polymeric foam matrix such that the polymeric foam matrix maintains about the same level of mechanical compressibility as the otherwise same polymeric foam matrix except without the covalent organic framework.

5. A superhydrophobic porous material comprising a covalent organic framework, wherein the covalent organic framework comprises a plurality of perfluoroalkyl or perfluorheteroalkyl moieties covalently attached thereto;
   wherein the covalent organic framework has a structure according to the following formula:

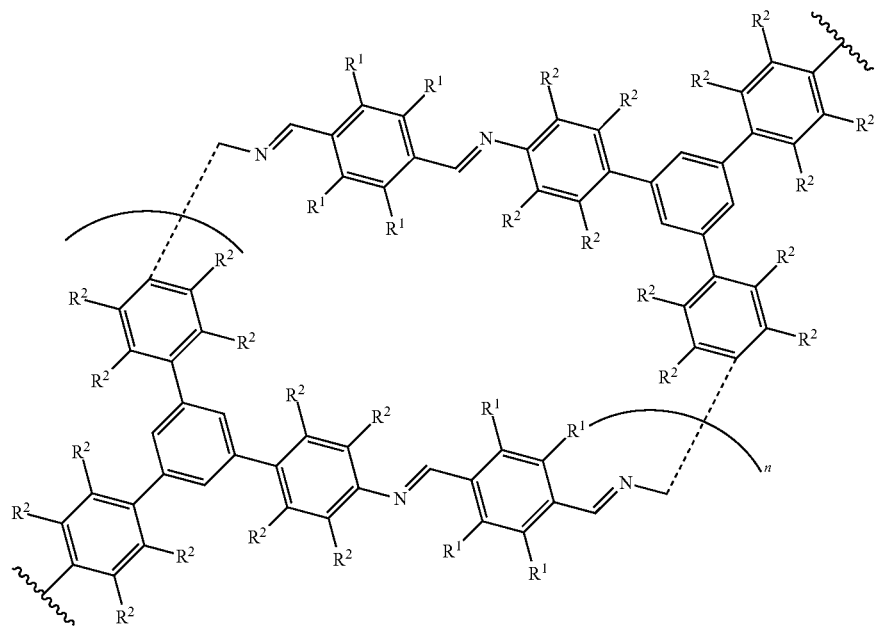

where each occurrence of $R^1$ and $R^2$ is independently a hydrogen, alkyl, alkenyl, heteroalkyl, alkoxy, perfluoroalkyl partially fluorinated alkyl, perfluorheteroalkyl, or partially fluorinated heteroalkyl so long as at least one occurrence of $R^1$ or $R^2$ comprises a perfluoroalkyl, partially fluorinated alkyl, perfluorheteroalkyl, or partially fluorinated heteroalkyl, and where n is an integer from 2 to 12.

6. The superhydrophobic porous material according to claim 1, wherein the covalent organic framework has a structure according to the following formula

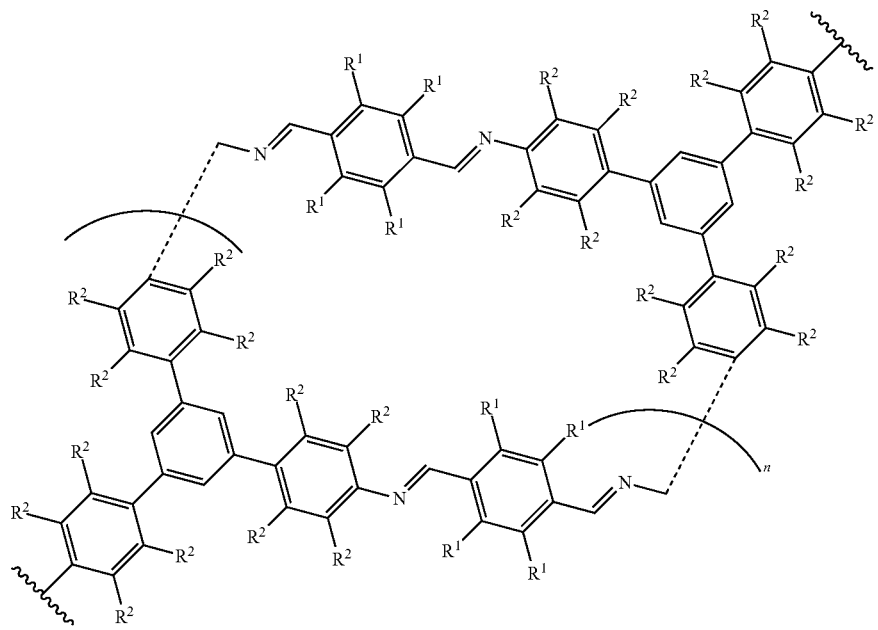

where each occurrence of $R^1$ and $R^2$ is independently a hydrogen, alkyl, alkenyl, heteroalkyl, alkoxy, perfluoroalkyl, partially fluorinated alkyl, perfluorheteroalkyl, or partially fluorinated heteroalkyl so long as at least one occurrence of $R^1$ or $R^2$ comprises a perfluoroalkyl, partially fluorinated alkyl, perfluorheteroalkyl, or partially fluorinated heteroalkyl, and where n is an integer from 2 to 12.

7. The superhydrophobic porous material according to claim 6, wherein each occurrence of $R^2$ is a hydrogen, and wherein each occurrence of $R^1$ is independently a hydrogen or a $-LR^3$, where L is none or is an alkyl or thioalkyl, and where each occurrence of $R^3$ is a perfluoroalkyl.

8. The superhydrophobic porous material according to claim 6, wherein the perfluoralkyl comprises 6 to 15 carbon atoms.

9. The superhydrophobic porous material according to claim 6, wherein $R^1$ is hydrogen, alkenyl, or $-R^4SR^5B^1$, where $R^4$ is a $C_1$-$C_5$ alkyl, $R^5$ is a $C_1$-$C_3$ alkyl, and $B^1$ is a $C_6$-$C_{12}$ perflouoroalkyl;

wherein $R^2$ is a hydrogen; and n is 4 to 6.

10. The superhydrophobic porous material according to claim 9, wherein $R^4$ is $C_2$ alkyl, $R^5$ is $C_2$ alkyl, and $B^1$ is $C_8$ perfluoroalkyl.

11. The superhydrophobic porous material according to claim 1, wherein the covalent organic framework exhibits a water adsorption capacity of about 50-80 milligrams water per gram of the covalent organic framework.

12. The superhydrophobic porous material according to claim 1, wherein the covalent organic framework exhibits a toluene adsorption capacity of about 500-800 milligrams toluene per gram of the covalent organic framework.

13. The superhydrophobic porous material according to claim 1, wherein a water contact angle on the covalent organic framework is about 150° or more.

14. The superhydrophobic porous material according to claim 1, wherein a nitrobenzene contact angle on the covalent organic framework is about 10° or less.

15. The superhydrophobic porous material according to claim 1, wherein the composition has an oil absorption capacity of about 50 to 150 times the weight of the composition.

16. The superhydrophobic porous material according to claim 1, wherein the oil absorption capacity is measured for one or more oils selected from the group consisting of $CHCl_3$, nitrobenzene, dimethylformamide, toluene, bromobenzene, ethanol, hexane, mineral oil, pump oil, soybean oil, and a mixture thereof.

17. A surface comprising a superhydrophobic porous material according to claim 1.

18. A droplet comprising an aqueous central region surrounded by an outer surface according to claim 6.

19. The droplet of claim 18, wherein the aqueous central region comprises a plurality of magnetic particles.

* * * * *